US012296435B2

(12) United States Patent
Scott et al.

(10) Patent No.: US 12,296,435 B2
(45) Date of Patent: May 13, 2025

(54) LEACHED SUPERABRASIVE ELEMENTS AND SYSTEMS, METHODS AND ASSEMBLIES FOR PROCESSING SUPERABRASIVE MATERIALS

(71) Applicant: US Synthetic Corporation, Orem, UT (US)

(72) Inventors: Daniel Marin Scott, Laie, HI (US); Daren Nathaniel Heaton, Spanish Fork, UT (US); Jeremy Brett Lynn, Nephi, UT (US); Mark Pehrson Chapman, Provo, UT (US); Oakley D. Bond, Nephi, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 18/371,298

(22) Filed: Sep. 21, 2023

(65) Prior Publication Data

US 2024/0009808 A1    Jan. 11, 2024

Related U.S. Application Data

(63) Continuation of application No. 16/993,055, filed on Aug. 13, 2020, now Pat. No. 11,766,761, which is a
(Continued)

(51) Int. Cl.
*B24D 3/00* (2006.01)
*B24D 3/10* (2006.01)
(Continued)

(52) U.S. Cl.
CPC .............. *B24D 3/005* (2013.01); *B24D 3/10* (2013.01); *B24D 18/00* (2013.01);
(Continued)

(58) Field of Classification Search
CPC ........ B24D 3/0005; B24D 3/10; B24D 18/00; B24D 18/0009; B24D 99/005;
(Continued)

(56) References Cited

U.S. PATENT DOCUMENTS 3,136,615 A    6/1964    Bovenkerk
3,141,746 A    7/1964    De Lai
(Continued)

FOREIGN PATENT DOCUMENTS

EP    0196777 A1    10/1986
EP    0300699 A2    1/1989
(Continued)

OTHER PUBLICATIONS

Hong, S. et al.; "Dissolution Behavior of Fine Particles of Diamond Under High Pressure Sintering Conditions;" Journal of Material Science Letters 10; pp. 164-166; 1991.
(Continued)

*Primary Examiner* — James E McDonough
(74) *Attorney, Agent, or Firm* — BKRIP LLC

(57) ABSTRACT

A method of processing a superabrasive element includes providing a superabrasive element including a polycrystalline diamond table that includes a metallic material disposed in interstitial spaces defined within the polycrystalline diamond table. The method also includes leaching the metallic material from at least a volume of the polycrystalline diamond table to produce a leached volume in the polycrystalline diamond table.

20 Claims, 31 Drawing Sheets

Related U.S. Application Data continuation-in-part of application No. 16/020,751, filed on Jun. 27, 2018, now Pat. No. 11,253,971, which is a continuation of application No. 14/864,152, filed on Sep. 24, 2015, now Pat. No. 10,011,000.

(60) Provisional application No. 62/062,553, filed on Oct. 10, 2014.

(51) Int. Cl.
| | |
|---|---|
| *B24D 18/00* | (2006.01) |
| *B24D 99/00* | (2010.01) |
| *C25F 3/02* | (2006.01) |
| *C25F 7/00* | (2006.01) |
| *F16C 33/04* | (2006.01) |
| *F16C 33/26* | (2006.01) |
| *F16C 17/02* | (2006.01) |
| *F16C 17/04* | (2006.01) |

(52) U.S. Cl.
CPC ....... *B24D 18/0009* (2013.01); *B24D 99/005* (2013.01); *C25F 3/02* (2013.01); *C25F 7/00* (2013.01); *F16C 33/043* (2013.01); *F16C 33/26* (2013.01); *B22F 2999/00* (2013.01); *F16C 17/02* (2013.01); *F16C 17/04* (2013.01)

(58) Field of Classification Search
CPC ........ F16C 33/043; F16C 33/26; F16C 17/04; B22F 2999/00
USPC .......................................... 51/293, 307, 309
See application file for complete search history.

(56) References Cited

U.S. PATENT DOCUMENTS

| | | |
|---|---|---|
| 3,233,988 A | 2/1966 | Wentorf, Jr. |
| 3,458,421 A | 7/1969 | Dahms |
| 3,745,623 A | 7/1973 | Wentorf |
| 4,108,614 A | 8/1978 | Mitchell |
| 4,151,686 A | 5/1979 | Lee |
| 4,224,380 A | 9/1980 | Bovenkerk |
| 4,255,165 A | 3/1981 | Dennis |
| 4,268,276 A | 5/1981 | Bovenkerk |
| 4,288,248 A | 9/1981 | Bovenkerk |
| 4,303,442 A | 12/1981 | Hara |
| 4,311,490 A | 1/1982 | Bovenkerk |
| 4,373,593 A | 2/1983 | Phaal |
| 4,387,287 A | 6/1983 | Marazzi |
| 4,410,054 A | 10/1983 | Nagel |
| 4,412,980 A | 11/1983 | Tsuji |
| 4,468,138 A | 8/1984 | Nagel |
| 4,481,016 A | 11/1984 | Campbell |
| 4,486,286 A | 12/1984 | Lewin |
| 4,504,519 A | 3/1985 | Zelez |
| 4,522,633 A | 6/1985 | Dyer |
| 4,525,179 A | 6/1985 | Gigl |
| 4,534,773 A | 8/1985 | Phaal |
| 4,556,403 A | 12/1985 | Almond |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall |
| 4,605,343 A | 8/1986 | Hibbs, Jr. |
| 4,606,738 A | 8/1986 | Hayden |
| 4,621,031 A | 11/1986 | Scruggs |
| 4,636,253 A | 1/1987 | Nakai |
| 4,645,977 A | 2/1987 | Kurokawa |
| 4,662,348 A | 5/1987 | Hall |
| 4,664,705 A | 5/1987 | Horton |
| 4,670,025 A | 6/1987 | Pipkin |
| 4,707,384 A | 11/1987 | Schachner |
| 4,726,718 A | 2/1988 | Meskin |
| 4,731,296 A | 3/1988 | Kikuchi |
| 4,738,322 A | 4/1988 | Hall |
| 4,766,040 A | 8/1988 | Hillert |
| 4,776,861 A | 10/1988 | Frushour |
| 4,784,023 A | 11/1988 | Dennis |
| 4,792,001 A | 12/1988 | Zijsling |
| 4,793,828 A | 12/1988 | Burnand |
| 4,797,241 A | 1/1989 | Peterson |
| 4,802,539 A | 2/1989 | Hall |
| 4,807,402 A | 2/1989 | Rai |
| 4,811,801 A | 3/1989 | Salesky |
| 4,828,582 A | 5/1989 | Frushour |
| 4,844,185 A | 7/1989 | Newton, Jr. |
| 4,854,405 A | 8/1989 | Stroud |
| 4,861,350 A | 8/1989 | Phaal |
| 4,871,377 A | 10/1989 | Frushour |
| 4,899,922 A | 2/1990 | Slutz |
| 4,913,247 A | 4/1990 | Jones |
| 4,919,220 A | 4/1990 | Fuller |
| 4,940,180 A | 7/1990 | Martell |
| 4,943,488 A | 7/1990 | Sung |
| 4,944,772 A | 7/1990 | Cho |
| 4,976,324 A | 12/1990 | Tibbitts |
| 5,011,514 A | 4/1991 | Cho |
| 5,016,718 A | 5/1991 | Tandberg |
| 5,027,912 A | 7/1991 | Juergens |
| 5,030,276 A | 7/1991 | Sung |
| 5,092,687 A | 3/1992 | Hall |
| 5,096,465 A | 3/1992 | Chen |
| 5,116,568 A | 5/1992 | Sung |
| 5,120,327 A | 6/1992 | Dennis |
| 5,127,923 A | 7/1992 | Bunting |
| 5,135,061 A | 8/1992 | Newton, Jr. |
| 5,154,245 A | 10/1992 | Waldenstrom |
| 5,176,720 A | 1/1993 | Martell |
| 5,186,725 A | 2/1993 | Martell |
| 5,199,832 A | 4/1993 | Meskin |
| 5,205,684 A | 4/1993 | Meskin |
| 5,213,248 A | 5/1993 | Horton |
| 5,238,074 A | 8/1993 | Tibbitts |
| 5,264,283 A | 11/1993 | Waldenstrom |
| 5,337,844 A | 8/1994 | Tibbitts |
| 5,355,969 A | 10/1994 | Hardy |
| 5,364,192 A | 11/1994 | Damm |
| 5,368,398 A | 11/1994 | Damm |
| 5,370,195 A | 12/1994 | Keshavan |
| 5,379,853 A | 1/1995 | Lockwood |
| 5,439,492 A | 8/1995 | Anthony |
| 5,447,208 A | 9/1995 | Lund |
| 5,460,233 A | 10/1995 | Meany |
| 5,464,068 A | 11/1995 | Najafi-Sani |
| 5,468,268 A | 11/1995 | Tank |
| 5,480,233 A | 1/1996 | Cunningham |
| 5,496,638 A | 3/1996 | Waldenstrom et al. |
| 5,496,639 A | 3/1996 | Connell |
| 5,505,748 A | 4/1996 | Tank |
| 5,510,193 A | 4/1996 | Cerutti |
| 5,523,121 A | 6/1996 | Anthony |
| 5,524,719 A | 6/1996 | Dennis |
| 5,544,713 A | 8/1996 | Dennis |
| 5,560,716 A | 10/1996 | Tank |
| 5,607,024 A | 3/1997 | Keith |
| 5,620,302 A | 4/1997 | Garrison |
| 5,620,382 A | 4/1997 | Cho |
| 5,624,068 A | 4/1997 | Waldenstrom |
| 5,645,617 A | 7/1997 | Frushour |
| 5,653,300 A | 8/1997 | Lund |
| 5,667,028 A | 9/1997 | Truax |
| 5,718,948 A | 2/1998 | Ederyd |
| 5,722,497 A | 3/1998 | Gum |
| 5,722,499 A | 3/1998 | Nguyen |
| 5,759,216 A | 6/1998 | Kanada |
| 5,776,615 A | 7/1998 | Wong |
| 5,833,021 A | 11/1998 | Mensa-Wilmot |
| 5,875,862 A | 3/1999 | Jurewicz |
| 5,897,942 A | 4/1999 | Karner |
| 5,944,129 A | 8/1999 | Jensen |
| 5,954,147 A | 9/1999 | Overstreet |
| 5,967,250 A | 10/1999 | Lund |
| 5,979,578 A | 11/1999 | Packer |
| 6,009,963 A | 1/2000 | Chaves |

(56) References Cited

U.S. PATENT DOCUMENTS

| | | | |
|---|---|---|---|
| 6,063,333 A | 5/2000 | Dennis |
| 6,123,612 A | 9/2000 | Goers |
| 6,126,741 A | 10/2000 | Jones |
| 6,145,608 A | 11/2000 | Lund |
| 6,193,001 B1 | 2/2001 | Eyre |
| 6,234,261 B1 | 5/2001 | Evans |
| 6,248,447 B1 | 6/2001 | Griffin |
| 6,269,894 B1 | 8/2001 | Griffin |
| 6,290,726 B1 | 9/2001 | Pope |
| 6,315,065 B1 | 11/2001 | Yong |
| 6,332,503 B1 | 12/2001 | Pessier |
| 6,344,149 B1 | 2/2002 | Oles |
| 6,367,568 B2 | 4/2002 | Steinke |
| 6,410,085 B1 | 6/2002 | Griffin |
| 6,435,058 B1 | 8/2002 | Matthias |
| 6,481,511 B2 | 11/2002 | Matthias |
| 6,528,159 B1 | 3/2003 | Kanada |
| 6,544,308 B2 | 4/2003 | Griffin |
| 6,550,556 B2 | 4/2003 | Middlemiss |
| 6,562,462 B2 | 5/2003 | Griffin |
| 6,585,064 B2 | 7/2003 | Griffin |
| 6,589,640 B2 | 7/2003 | Griffin |
| 6,592,985 B2 | 7/2003 | Griffin |
| 6,601,662 B2 | 8/2003 | Matthias |
| 6,739,214 B2 | 5/2004 | Griffin |
| 6,749,033 B2 | 6/2004 | Griffin |
| 6,793,681 B1 | 9/2004 | Pope |
| 6,797,326 B2 | 9/2004 | Griffin |
| 6,861,098 B2 | 3/2005 | Griffin |
| 6,878,447 B2 | 4/2005 | Griffin |
| 6,892,836 B1 | 5/2005 | Eyre |
| 6,904,984 B1 | 6/2005 | Estes |
| 6,935,444 B2 | 8/2005 | Lund |
| 6,962,214 B2 | 11/2005 | Hughes |
| 6,991,049 B2 | 1/2006 | Eyre |
| 7,350,601 B2 | 4/2008 | Belnap |
| 7,377,341 B2 | 5/2008 | Middlemiss |
| 7,493,973 B2 | 2/2009 | Keshavan |
| 7,506,698 B2 | 3/2009 | Eyre |
| 7,517,589 B2 | 4/2009 | Eyre |
| 7,568,534 B2 | 8/2009 | Griffin |
| 7,608,333 B2 | 10/2009 | Eyre |
| 7,730,977 B2 | 6/2010 | Achilles |
| 7,740,673 B2 | 6/2010 | Eyre |
| 7,754,333 B2 | 7/2010 | Eyre |
| 7,757,785 B2 | 7/2010 | Zhang |
| 7,757,791 B2 | 7/2010 | Belnap |
| 7,866,418 B2 | 1/2011 | Bertagnolli |
| 7,972,395 B1 | 7/2011 | Dadson |
| 8,020,642 B2 | 9/2011 | Lancaster |
| 8,147,572 B2 | 4/2012 | Eyre |
| 8,172,012 B2 | 5/2012 | Achilles |
| 8,297,382 B2 | 10/2012 | Bertagnolli |
| 8,309,050 B2 | 11/2012 | Keshavan |
| 8,323,367 B1 | 12/2012 | Bertagnolli |
| 8,328,891 B2 | 12/2012 | Zhang |
| 8,469,121 B2 | 6/2013 | Lancaster |
| 8,596,387 B1 | 12/2013 | Sani |
| 10,260,162 B1 | 4/2019 | Heaton |
| 10,610,999 B1 | 4/2020 | Heaton |
| 2005/0115744 A1 | 6/2005 | Griffin |
| 2005/0129950 A1 | 6/2005 | Griffin |
| 2005/0139397 A1 | 6/2005 | Achilles |
| 2005/0230156 A1 | 10/2005 | Belnap |
| 2005/0263328 A1 | 12/2005 | Middlemiss |
| 2006/0060390 A1 | 3/2006 | Eyre |
| 2006/0060391 A1 | 3/2006 | Eyre |
| 2006/0086540 A1 | 4/2006 | Griffin |
| 2006/0162969 A1 | 7/2006 | Belnap |
| 2007/0039762 A1 | 2/2007 | Achilles |
| 2007/0181348 A1 | 8/2007 | Lancaster |
| 2007/0187155 A1 | 8/2007 | Middlemiss |
| 2009/0152016 A1 | 6/2009 | Eyre |
| 2009/0152017 A1 | 6/2009 | Shen |
| 2010/0266816 A1 | 10/2010 | Eyre |
| 2011/0023375 A1* | 2/2011 | Sani ........................ B22F 3/24 51/297 |
| 2011/0056141 A1 | 3/2011 | Miess |
| 2012/0247029 A1 | 10/2012 | Eyre |
| 2013/0001100 A1 | 1/2013 | Thigpen |
| 2013/0291447 A1 | 11/2013 | Mazyar |
| 2014/0166371 A1 | 6/2014 | Whittaker |
| 2014/0352228 A1 | 12/2014 | Sithebe |
| 2016/0339561 A1 | 11/2016 | Vail |

FOREIGN PATENT DOCUMENTS

| | | |
|---|---|---|
| EP | 0329954 A2 | 8/1989 |
| EP | 0500253 A1 | 8/1992 |
| EP | 0585631 A1 | 3/1994 |
| EP | 0595630 A1 | 5/1994 |
| EP | 0612868 A1 | 8/1994 |
| EP | 0617207 A2 | 9/1994 |
| EP | 0787820 A2 | 8/1997 |
| EP | 0860515 A1 | 8/1998 |
| EP | 1190791 A2 | 3/2002 |
| GB | 1349385 A | 4/1974 |
| GB | 2048927 A | 12/1980 |
| GB | 2268768 A | 1/1994 |
| GB | 2323398 A | 9/1998 |
| GB | 2418215 A | 3/2006 |
| GB | 2422394 A | 7/2006 |
| JP | S5935066 A | 2/1984 |
| JP | S59219500 A | 12/1984 |
| JP | S6167740 A | 4/1986 |
| JP | S61125739 A | 6/1986 |
| JP | S6355161 A | 3/1988 |
| JP | S6369971 A | 3/1988 |
| JP | H0762468 A | 3/1995 |
| JP | H07156003 A | 6/1995 |
| JP | H11245103 A | 9/1999 |
| JP | 2000087112 A | 3/2000 |
| RU | 2034937 C1 | 5/1995 |
| RU | 566439 | 7/2000 |
| WO | 1993023204 A1 | 11/1993 |
| WO | 1996034131 A1 | 10/1996 |
| WO | 2000028106 A1 | 5/2000 |
| WO | 2004040095 A1 | 5/2004 |
| WO | 2004106003 A1 | 12/2004 |
| WO | 2004106004 A1 | 12/2004 |
| WO | 2012145586 A1 | 10/2012 |

OTHER PUBLICATIONS

Nakamura, T. et al.; Study on th eHeat Deterioration Mechanism of Sintered Diamond; Program and Abstracts of the 27th High Pressure Conference of Japan; Oct. 13-15, 1986; Sapporo.

USPTO Office Action for U.S. Appl. No. 16/020,751, dated Aug. 2, 2021, 10 pages.

USPTO Office Action for U.S. Appl. No. 16/020,751, dated May 6, 2021, 10 pages.

* cited by examiner

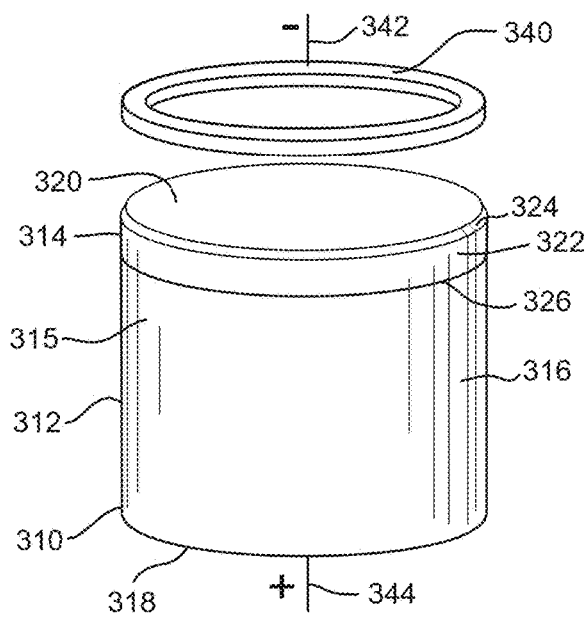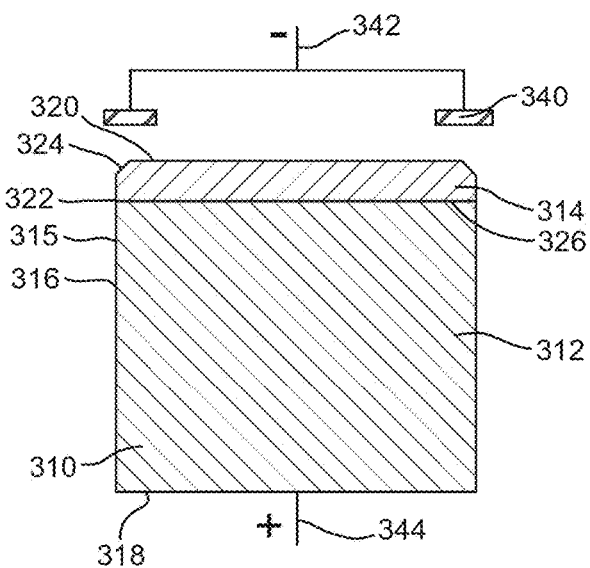
FIG. 11    FIG. 12
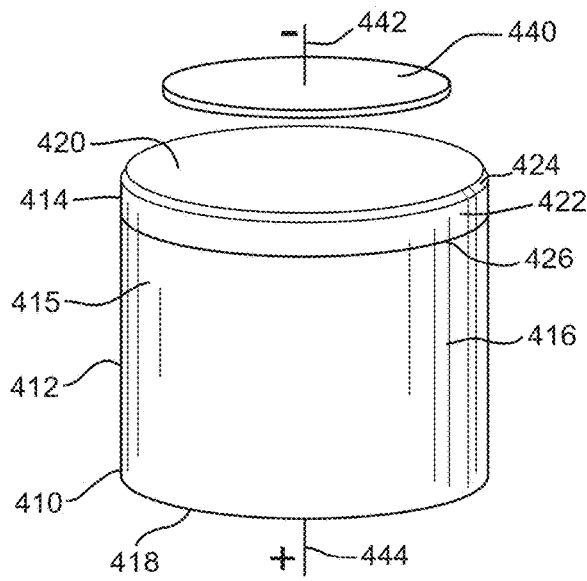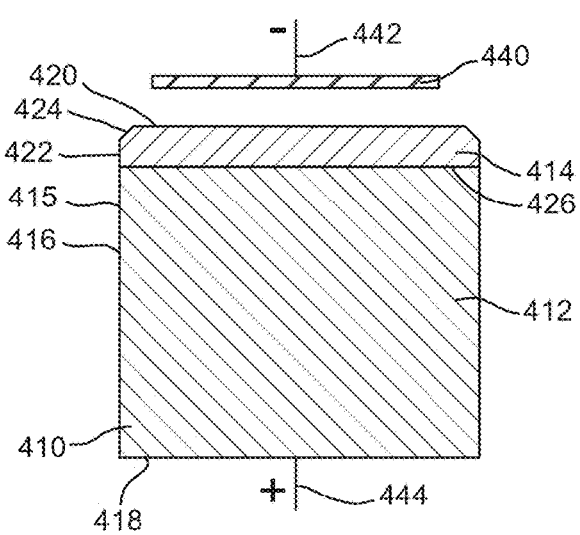
FIG. 13    FIG. 14

LEACHED SUPERABRASIVE ELEMENTS AND SYSTEMS, METHODS AND ASSEMBLIES FOR PROCESSING SUPERABRASIVE MATERIALS

CROSS REFERENCE TO RELATED APPLICATIONS

This application is a continuation of U.S. patent application Ser. No. 16/993,055, entitled "GROUP II METAL SALTS IN ELECTROLYTIC LEACHING OF SUPERABRASIVE MATERIALS" and filed on Aug. 13, 2020, which application is a continuation-in-part of U.S. patent application Ser. No. 16/020,751, entitled "LEACHED SUPERABRASIVE ELEMENTS AND SYSTEMS, METHODS AND ASSEMBLIES FOR PROCESSING SUPERABRASIVE MATERIALS" and filed on Jun. 27, 2018, which is a continuation of U.S. patent application Ser. No. 14/864,152, titled "LEACHED SUPERABRASIVE ELEMENTS AND SYSTEMS, METHODS AND ASSEMBLIES FOR PROCESSING SUPERABRASIVE MATERIALS" and filed 24 Sep. 2015, which claims the benefit of U.S. Provisional Patent Application No. 62/062,553, titled "LEACHED SUPERABRASIVE ELEMENTS AND SYSTEMS, METHODS AND ASSEMBLIES FOR PROCESSING SUPERABRASIVE MATERIALS" and filed 10 Oct. 2014, each of which is hereby incorporated by reference in its entirety.

BACKGROUND

Wear-resistant, superabrasive materials are traditionally utilized for a variety of mechanical applications. For example, polycrystalline diamond ("PCD") materials are often used in drilling tools (e.g., cutting elements, gage trimmers, etc.), machining equipment, bearing apparatuses, wire-drawing machinery, and in other mechanical systems. Conventional superabrasive materials have found utility as superabrasive cutting elements in rotary drill bits, such as roller cone drill bits and fixed-cutter drill bits. A conventional cutting element may include a superabrasive layer or table, such as a PCD table. The cutting element may be brazed, press-fit, or otherwise secured into a preformed pocket, socket, or other receptacle formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

As mentioned above, conventional superabrasive materials have found utility as bearing elements, which may include bearing elements utilized in thrust bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, or through other suitable methods of attachment. Typically, bearing elements mounted to a bearing rotor have superabrasive faces configured to contact corresponding superabrasive faces of bearing elements mounted to an adjacent bearing stator.

Cutting elements having a PCD table may be formed and bonded to a substrate using an ultra-high pressure, ultra-high temperature ("HPHT") sintering process. Often, cutting elements having a PCD table are fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into a HPHT press. The substrates and diamond particle volumes may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, and/or iron, that facilitates intergrowth and bonding of the diamond crystals.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt may act as a catalyst to facilitate the formation of bonded diamond crystals. A metal-solvent catalyst may also be mixed with a volume of diamond particles prior to subjecting the diamond particles and substrate to the HPHT process.

The metal-solvent catalyst may dissolve carbon from the diamond particles and portions of the diamond particles that graphitize due to the high temperatures used in the HPHT process. The solubility of the stable diamond phase in the metal-solvent catalyst may be lower than that of the metastable graphite phase under HPHT conditions. As a result of the solubility difference, the graphite tends to dissolve into the metal-solvent catalyst and the diamond tends to deposit onto existing diamond particles to form diamond-to-diamond bonds. Accordingly, diamond grains may become mutually bonded to form a matrix of polycrystalline diamond, with interstitial regions defined between the bonded diamond grains being occupied by the metal-solvent catalyst. In addition to dissolving carbon and graphite, the metal-solvent catalyst may also carry tungsten, tungsten carbide, and/or other materials from the substrate into the PCD layer of the cutting element.

The presence of the metal-solvent catalyst and/or other materials in the diamond table may reduce the thermal stability of the diamond table at elevated temperatures. For example, the difference in thermal expansion coefficient between the diamond grains and the solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. Further, portions of diamond grains may transform to carbon monoxide, carbon dioxide, graphite, or combinations thereof, thereby degrading the mechanical properties of the PCD material.

Accordingly, it is desirable to remove metallic materials, such as metal-solvent catalysts, from a PCD material in situations where the PCD material may be exposed to high temperatures. Chemical leaching is often used to dissolve and remove various materials from the PCD layer. For example, chemical leaching may be used to remove metal-solvent catalysts, such as cobalt, from regions of a PCD layer that may experience elevated temperatures during drilling, such as regions adjacent to the working surfaces of the PCD layer.

During conventional leaching of a PCD table, exposed surface regions of the PCD table are immersed in a leaching solution until interstitial components, such as a metal-solvent catalyst, are removed to a desired depth from the exposed surface regions. The process of chemical leaching often involves the use of highly concentrated and/or corrosive solutions, such as aqua regia and mixtures including hydrofluoric acid (HF), to dissolve and remove metal-solvent catalysts from polycrystalline diamond materials. Moreover, in addition to dissolving metal-solvent catalysts from a PCD material, leaching solutions may be difficult to control, may take a long time, and may dissolve any accessible portions of a substrate to which the PCD material is attached. Therefore, improved methods for leaching PCD materials that reduce or mitigate difficulties with conventional leaching are desired.

SUMMARY

The instant disclosure is directed to exemplary methods and assemblies for processing superabrasive elements. In some examples, the method may comprise exposing at least a portion of a polycrystalline diamond material to a processing solution, exposing an electrode to the processing solution, applying a positive charge to the polycrystalline diamond material, and applying a negative charge to the electrode. The polycrystalline diamond material may comprise a metallic material (e.g., cobalt, nickel, iron, and/or tungsten) disposed in interstitial spaces defined within the polycrystalline diamond material.

The processing solution may comprise a suitable solution that leaches the metallic material from interstitial spaces within at least a volume of the polycrystalline diamond material. According to at least one embodiment, the rate at which the processing solution leaches the metallic material from the interstitial spaces within at least the volume of the polycrystalline diamond material is increased in the presence of an electrical current between the polycrystalline diamond material and the electrode. According to various embodiments, the electrode may be disposed near at least the portion of the polycrystalline diamond material. The electrode may be disposed such that the electrode does not directly contact the polycrystalline diamond material.

The processing solution may at least partially oxidize the metallic material when the polycrystalline diamond material is processed. According to at least one embodiment, the processing solution may comprise an aqueous solution. According to some embodiments, the processing solution may comprise a buffered or a non-buffered electrolyte solution. In various embodiments, the processing solution may comprise at least one of acetic acid, ammonium chloride, arsenic acid, ascorbic acid, citric acid, formic acid, hydrobromic acid, hydrofluoric acid, hydroiodic acid, lactic acid, malic acid, nitric acid, oxalic acid, phosphoric acid, propionic acid, pyruvic acid, succinic acid, tartaric acid, and/or any suitable carboxylic acid (e.g., monocarboxylic acid, polycarboxylic acid, etc.); the processing solution may additionally or alternatively comprise at least one of an ion, a salt, and an ester of at least one of the foregoing. The electrode may comprise at least one of copper, tungsten carbide, cobalt, zinc, iron, platinum, palladium, niobium, graphite, graphene, nichrome, gold, and silver. According to various embodiments, a masking layer may be disposed over at least a portion of the polycrystalline diamond material.

In one embodiment, the processing solution may include a combination of an organic acid, which can be a naturally occurring food acid, and a divalent metal salt, which can be a Group II metal salt. Such combinations not only benefit the environment and the workers by eliminating the safety issues associated with highly corrosive inorganic acids such as hydrofluoric acid, but also improve the performance (especially the leaching depth) achieved with the use of individual acids without the Group II metal salt. Suitable organic acids include without limitation food acids such as acetic acid, succinic acid, citric acid, tartaric acid, malic acid, folic acid, fumaric acid, lactic acid and combinations thereof. Suitable divalent metal salts include without limitation Group II metal salts, including without limitation the fluoride, chloride, bromide and iodide salts of alkaline earth metals beryllium, magnesium, calcium, strontium and barium, and combinations of the foregoing.

In one embodiment, the processing solution may include one or more foregoing combinations of an organic acid, e.g., a naturally occurring food acid, and a divalent metal salt, e.g., a Group II metal salt, further combined with a third ingredient which is a weak organic or inorganic acid. Examples of weak inorganic acids include without limitation sulfurous acid, phosphoric acid, nitrous acid, hydrogen peroxide, and combinations thereof. Examples of weak organic acids include without limitation carbonic acid, trichloroacetic acid, methanoic acid, benzoic acid, and combinations thereof.

In some embodiments, a cation of the metallic material may be present in the processing solution following application of the positive charge to the polycrystalline diamond material and application of the negative charge to the electrode. The cation of the metallic material may be reduced and electrodeposited on the electrode. The processing solution may comprise a first processing solution and the method may further comprise exposing at least the portion of the polycrystalline diamond material to a second processing solution (e.g., a more acidic solution than the first processing solution). At least a portion of the polycrystalline diamond material may be exposed to the second processing solution following exposure of at least the portion of the polycrystalline diamond material to the first processing solution. Additionally, at least the portion of the polycrystalline diamond material may be exposed to the second processing solution prior to exposure of at least the portion of the polycrystalline diamond material to the first processing solution. In some embodiments, an electrode for applying the positive charge abuts the polycrystalline diamond material.

According to some embodiments, a method of processing a superabrasive element may include providing a superabrasive element, exposing at least a portion of the superabrasive element to a processing solution, exposing an electrode to the processing solution, applying a first charge to the polycrystalline diamond table, and applying a second charge to the electrode. The polycrystalline diamond element may comprise a substrate and a polycrystalline diamond table bonded to the substrate, the polycrystalline diamond table comprising a metallic material disposed in interstitial spaces defined within the polycrystalline diamond table. According to various embodiments, the first charge may be applied to the polycrystalline diamond table via the substrate. In some examples, a masking layer may be disposed over at least a portion of the polycrystalline diamond table.

According to at least one embodiment, an assembly for processing a polycrystalline diamond body may include a volume of processing solution, a polycrystalline diamond body, an electrode, and a power source configured to apply a positive charge to the polycrystalline diamond body and a negative charge to the electrode. The polycrystalline diamond body and the electrode may both be in electrical communication with the processing solution. The polycrystalline diamond body may comprise a metallic material disposed in interstitial spaces defined within the polycrystalline diamond body. At least a portion of the polycrystalline diamond body and the electrode may be exposed to the volume of processing solution. The assembly may additionally include a first wire electrically connecting the power source to the polycrystalline diamond body and a second wire electrically connecting the power source to the electrode. The assembly may further include a substrate bonded to the polycrystalline diamond body, the first wire being electrically connected to the substrate by an electrode disposed on a surface portion of the substrate.

With the foregoing in mind, it is an embodiment of the invention to provide a method of processing a polycrystalline diamond material, which method may include one or more of the following:
- exposing at least a portion of a polycrystalline diamond material to a processing solution, the polycrystalline diamond material including a metallic material disposed in interstitial spaces defined within the polycrystalline diamond material;
- exposing an electrode to the processing solution;
- applying a positive charge to the polycrystalline diamond material; and
- applying a negative charge to the electrode;
- wherein the processing solution includes an organic acid and a divalent metal salt.

It is also an embodiment of the invention to provide a method of processing a superabrasive element, which method may include one or more of the following:
- providing a superabrasive element including a polycrystalline diamond table that comprises a metallic material disposed in interstitial spaces defined within the polycrystalline diamond table, the polycrystalline diamond table including a superabrasive face and a superabrasive side surface extending around an outer periphery of the superabrasive face; and
- leaching the metallic material from at least a volume of the polycrystalline diamond table to produce a leached volume in the polycrystalline diamond table by:
  - exposing at least a portion of the polycrystalline diamond table to a processing solution;
  - exposing an electrode to the processing solution; and
  - applying a charge to the electrode such that a voltage is generated between the polycrystalline diamond table and the electrode and the voltage is applied to the processing solution;
- wherein the processing solution includes an organic acid and a divalent metal salt.

It is also an embodiment of the invention to provide a method of processing a polycrystalline diamond body to remove a metallic material disposed in interstitial spaces in the polycrystalline diamond body, which method may include one or more of the following:
- positioning an electrode near a polycrystalline diamond body;
- exposing at least a portion of the polycrystalline diamond body to a processing solution; and
- applying a current to the processing solution;
- wherein the electrode acts as an anode or cathode and the polycrystalline body acts as an opposing cathode or anode; and
- the processing solution includes an organic acid and a divalent metal salt.

Features from any of the disclosed embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 11 is a perspective view of an exemplary superabrasive element and an exemplary electrode according to at least one embodiment.

FIG. 12 is a cross-sectional side view of an exemplary superabrasive element and an exemplary electrode according to at least one embodiment.

FIG. 13 is a perspective view of an exemplary superabrasive element and an exemplary electrode according to at least one embodiment.

FIG. 14 is a cross-sectional side view of an exemplary superabrasive element and an exemplary electrode according to at least one embodiment.

Figure 1:
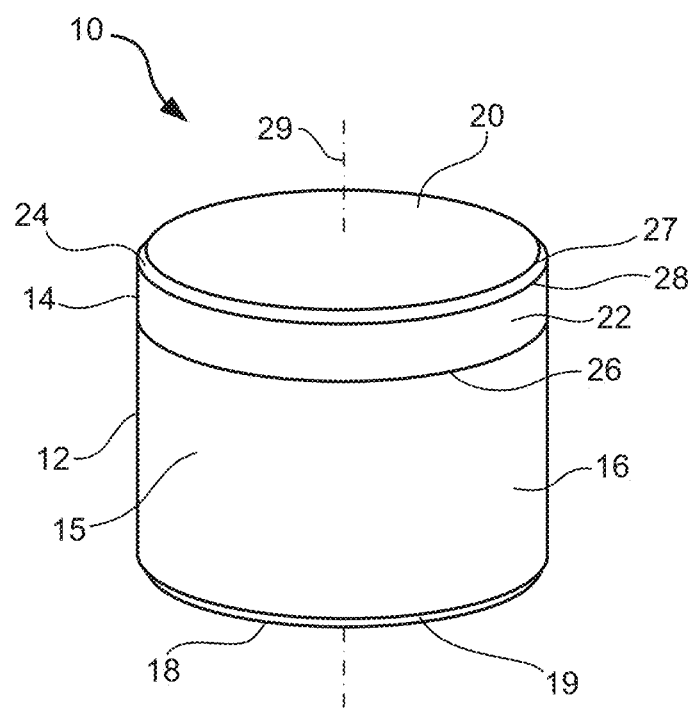
FIG. 1 is a perspective view of an exemplary superabrasive element according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to exemplary leached superabrasive elements and leaching systems, methods, and assemblies for processing superabrasive elements. Such superabrasive elements may be used as cutting elements for use in a variety of applications, such as drilling tools, machining equipment, cutting tools, and other apparatuses, without limitation. Superabrasive elements, as disclosed herein, may also be used as bearing elements in a variety of bearing applications, such as thrust bearings, radial bearings, and other bearing apparatuses, without limitation.

The terms "superabrasive" and "superhard," as used herein, may refer to any material having a hardness that is at least equal to a hardness of tungsten carbide. For example, a superabrasive article may represent an article of manufacture, at least a portion of which may exhibit a hardness that is equal to or greater than the hardness of tungsten carbide. Additionally, the term "solvent," as used herein, may refer to a single solvent compound, a mixture of two or more solvent compounds, and/or a mixture of one or more solvent compounds and one or more dissolved compounds. The term "molar concentration," as used herein, may refer to a concentration in units of mol/L at a temperature of approximately 25° C. For example, a solution comprising solute A at a molar concentration of 1 M may comprise 1 mol of solute A per liter of solution. Moreover, the term "cutting," as used herein, may refer to machining processes, drilling processes, boring processes, and/or any other material removal process utilizing a cutting element and/or other cutting apparatus, without limitation.

Figure 2:
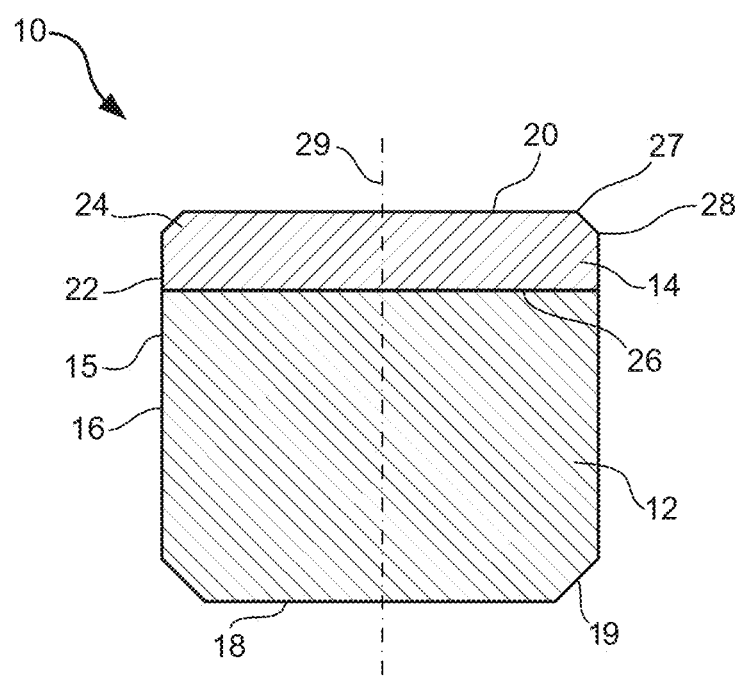
FIG. 2 is a cross-sectional side view of an exemplary superabrasive element according to at least one embodiment.

FIGS. 1 and 2 illustrate an exemplary superabrasive element 10 according to at least one embodiment. As illustrated in FIGS. 1 and 2, superabrasive element 10 may comprise a superabrasive table 14 affixed to or formed upon a substrate 12. Superabrasive table 14 may be affixed to substrate 12 at interface 26, which may be a planar or non-planar interface. Superabrasive element 10 may comprise a rear surface 18, a superabrasive face 20, and an element side surface 15. In some embodiments, element side surface 15 may include a substrate side surface 16 formed by substrate 12 and a superabrasive side surface 22 formed by superabrasive table 14. Rear surface 18 may be formed by substrate 12.

Superabrasive element 10 may also comprise a chamfer 24 (i.e., sloped or angled) formed by superabrasive table 14. Chamfer 24 may comprise an angular and/or rounded edge formed at the intersection of superabrasive side surface 22 and superabrasive face 20. Any other suitable surface shape may also be formed at the intersection of superabrasive side surface 22 and superabrasive face 20, including, without limitation, an arcuate surface (e.g., a radius, an ovoid shape, or any other rounded shape), a sharp edge, multiple chamfers/radii, a honed edge, and/or combinations of the foregoing. At least one edge may be formed at the intersection of chamfer 24 and superabrasive face 20 and/or at the intersection of chamfer 24 and superabrasive side surface 22. For example, cutting element 10 may comprise one or more cutting edges, such as an edge 27 and/or or an edge 28. Edge 27 and/or edge 28 may be formed adjacent to chamfer 24 and may be configured to be exposed to and/or in contact with a mining formation during drilling.

In some embodiments, superabrasive element 10 may be utilized as a cutting element for a drill bit, in which chamfer 24 acts as a cutting edge. The phrase "cutting edge" may refer, without limitation, to a portion of a cutting element that is configured to be exposed to and/or in contact with a subterranean formation during drilling. In at least one embodiment, superabrasive element 10 may be utilized as a bearing element (e.g., with superabrasive face 20 acting as a bearing surface) configured to contact oppositely facing bearing elements.

According to various embodiments, superabrasive element 10 may also comprise a substrate chamfer 13 formed by substrate 12. For example, a chamfer comprising an angular and/or rounded edge may be formed by substrate 12 at the intersection of substrate side surface 16 and rear surface 18. Any other suitable surface shape may also be formed at the intersection of substrate side surface 16 and rear surface 18, including, without limitation, an arcuate surface (e.g., a radius, an ovoid shape, or any other rounded shape), a sharp edge, multiple chamfers/radii, a honed edge, and/or combinations of the foregoing.

Superabrasive element 10 may comprise any suitable size, shape, and/or geometry, without limitation. According to at least one embodiment, at least a portion of superabrasive element 10 may have a substantially cylindrical shape. For example, superabrasive element 10 may comprise a substantially cylindrical outer surface surrounding a central axis 29 of superabrasive element 10, as illustrated in FIGS. 1 and 2. Substrate side surface 16 and superabrasive side surface 22 may, for example, be substantially cylindrical and may have any suitable diameters relative to central axis 29, without limitation. According to various embodiments, substrate side surface 16 and superabrasive side surface 22 may have substantially the same outer diameter relative to central axis 29. Superabrasive element 10 may also comprise any other suitable shape, including, for example, an oval, ellipsoid, triangular, pyramidal, square, cubic, rectangular, and/or composite shape, and/or a combination of the foregoing, without limitation.

According to various embodiments, superabrasive element 10 may also comprise a rear chamfer 19. For example, a rear chamfer 19 comprising an angular and/or rounded edge may be formed by superabrasive element 10 at the intersection of substrate side surface 16 and rear surface 18. Any other suitable surface shape may also be formed at the intersection of substrate side surface 16 and rear surface 18, including, without limitation, an arcuate surface (e.g., a radius, an ovoid shape, or any other rounded shape), a sharp edge, multiple chamfers/radii, a honed edge, and/or combinations of the foregoing.

Substrate 12 may comprise any suitable material on which superabrasive table 14 may be formed. In at least one embodiment, substrate 12 may comprise a cemented carbide material, such as a cobalt-cemented tungsten carbide material and/or any other suitable material. In some embodiments, substrate 12 may include a suitable metal-solvent catalyst material, such as, for example, cobalt, nickel, iron, and/or alloys thereof. Substrate 12 may also include any suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof. Superabrasive table 14 may be formed of any suitable superabrasive and/or superhard material or combination of materials, including, for example PCD. According to additional embodiments, superabrasive table 14 may comprise cubic boron nitride, silicon carbide, polycrystalline diamond, and/or mixtures or composites including one or more of the foregoing materials, without limitation.

Superabrasive table 14 may be formed using any suitable technique. According to some embodiments, superabrasive table 14 may comprise a PCD table fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., $sp^3$-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution. Polycrystalline diamond elements, such as those disclosed in U.S. Pat. Nos. 7,866,418 and 8,297,382, the disclosure of each of which is incorporated herein, in its entirety, by this reference, may have magnetic properties in at least some regions as disclosed therein and leached regions in other regions as disclosed herein.

Following sintering, various materials, such as a metal-solvent catalyst, remaining in interstitial regions within the as-sintered PCD body may reduce the thermal stability of superabrasive table 14 at elevated temperatures. In some examples, differences in thermal expansion coefficients between diamond grains in the as-sintered PCD body and a metal-solvent catalyst in interstitial regions between the diamond grains may weaken portions of superabrasive table 14 that are exposed to elevated temperatures, such as temperatures developed during drilling and/or cutting operations. The weakened portions of superabrasive table 14 may be excessively worn and/or damaged during the drilling and/or cutting operations.

Removing the metal-solvent catalyst and/or other materials from the as-sintered PCD body may improve the heat resistance and/or thermal stability of superabrasive table 14, particularly in situations where the PCD material may be exposed to elevated temperatures. A metal-solvent catalyst and/or other materials may be removed from the as-sintered PCD body using any suitable technique, including, for example, electrochemical leaching. In at least one embodiment, a metal-solvent catalyst, such as cobalt, may be removed from regions of the as-sintered PCD body, such as regions adjacent to the working surfaces of superabrasive table 14. Removing a metal-solvent catalyst from the as-sintered PCD body may reduce damage to the PCD material of superabrasive table 14 caused by expansion of the metal-solvent catalyst.

At least a portion of a metal-solvent catalyst, such as cobalt, as well as other materials, may be removed from at least a portion of the as-sintered PCD body using any suitable technique, without limitation. For example, electrochemical, chemical and/or gaseous leaching may be used to remove a metal-solvent catalyst from the as-sintered PCD body up to a desired depth from a surface thereof. The as-sintered PCD body may be electrochemically leached by immersion in an acid or acid solution, such as a solution including acetic acid, ammonium chloride, arsenic acid, ascorbic acid, citric acid, formic acid, hydrobromic acid, hydrofluoric acid, hydroiodic acid, lactic acid, malic acid, nitric acid, oxalic acid, phosphoric acid, propionic acid, pyruvic acid, succinic acid, tartaric acid, and/or any suitable carboxylic acid (e.g., monocarboxylic acid, polycarboxylic acid, etc.), in the presence of an electrode, such as copper, tungsten carbide, cobalt, zinc, iron, platinum, palladium, niobium, graphite, graphene, nichrome, gold, and/or silver electrode, wherein a charge is applied to the as-sintered PCD body and an opposite charge is applied to the electrode or subjected to another suitable process to remove at least a portion of the metal-solvent catalyst from the interstitial regions of the PCD body and form superabrasive table 14 comprising a PCD table. For example, the as-sintered PCD body may be immersed in an acid solution in the presence of an electrode, a positive charge may be applied to the as-sintered PCD body and a negative charge may be applied to the electrode for a selected amount of time. For example, a PCD body may be positively charged and an electrode may be negatively charged for more than 4 hours, more than 10 hours, between 24 hours to 48 hours, about 2 to about 7 days (e.g., about 3, 5, or 7 days), for a few weeks (e.g., about 4 weeks), or for 1-2 months, depending on the process employed.

Even after leaching, a residual, detectable amount of the metal-solvent catalyst may be present in the at least partially leached superabrasive table 14. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may be at least partially removed by the selected leaching process or may be relatively unaffected by the selected leaching process.

In some embodiments, only selected portions of the as-sintered PCD body may be leached, leaving remaining portions of resulting superabrasive table 14 unleached. For example, some portions of one or more surfaces of the as-sintered PCD body may be masked or otherwise protected from exposure to a processing solution and/or gas mixture while other portions of one or more surfaces of the as-sintered PCD body may be exposed to the processing solution and/or gas mixture. Other suitable techniques may be used for removing a metal-solvent catalyst and/or other materials from the as-sintered PCD body or may be used to accelerate an electrochemical leaching process, as will be described in greater detail below. For example, exposing the as-sintered PCD body to heat, pressure, microwave radiation, and/or ultrasound may be employed to leach or to accelerate an electrochemical leaching process, without limitation. Following leaching, superabrasive table 14 may comprise a volume of PCD material that is at least partially free or substantially free of a metal-solvent catalyst.

The plurality of diamond particles used to form superabrasive table 14 comprising the PCD material may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 15 µm, 12 µm, 10 µm, 8 µm, 4 µm, 2 µm, 1 µm, 0.5 µm, less than 0.5 µm, 0.1 µm, less than 0.1 µm). In another embodiment, the plurality of diamond particles may include a portion exhibiting a relatively larger size between about 40 µm and about 15 µm and another portion exhibiting a relatively smaller size between about 12 µm and 2 µm. Of course, the plurality of diamond particles may also include three or more different sizes (e.g., one relatively larger size and two or more relatively smaller sizes), without limitation. Different sizes of diamond particle may be disposed in different locations within a polycrystalline diamond volume, without limitation. According to at least one embodiment, disposing different sizes of diamond particles in different locations may facilitate control of a leach depth, as will be described in greater detail below.

Figure 3:
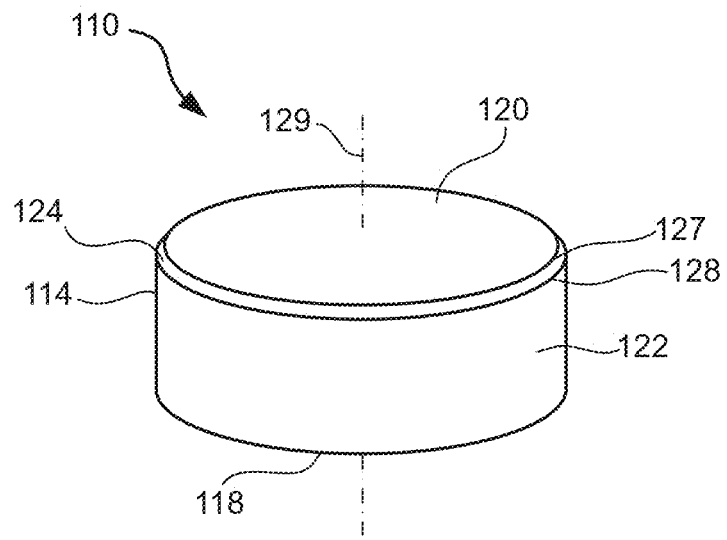
FIG. 3 is a perspective view of an exemplary superabrasive element according to at least one embodiment.
Figure 4:
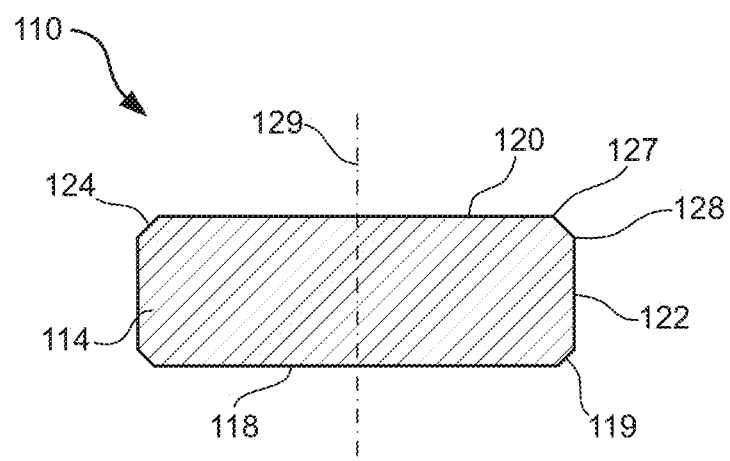
FIG. 4 is a cross-sectional side view of an exemplary superabrasive element according to at least one embodiment.

FIGS. 3 and 4 illustrate an exemplary superabrasive element 110 according to various embodiments. Superabrasive element 110 may comprise a superabrasive table 114 that is not attached to a substrate. As shown in FIGS. 3 and 4, superabrasive element 110 may include a rear surface 118, a superabrasive face 120, and an element side surface 122 formed by superabrasive table 114. Superabrasive element 110 may also comprise a chamfer 124 (i.e., sloped or angled) and/or any other suitable surface shape at the intersection of element side surface 122 and superabrasive face 120, including, without limitation, an arcuate surface (e.g., a radius, an ovoid shape, or any other rounded shape), a sharp edge, multiple chamfers/radii, a honed edge, and/or combinations of the foregoing. At least one edge, such as an edge 127 and/or or an edge 128, may be formed at the intersection of chamfer 124 and each of superabrasive face 120 and element side surface 122, respectively. Element side surface 122 of superabrasive element 110 may radially surround a central axis 129 of superabrasive element 110.

According to various embodiments, superabrasive element 110 may also comprise a rear chamfer 119. For example, a rear chamfer 119 comprising an angular and/or rounded edge may be formed by superabrasive element 110 at the intersection of element side surface 122 and rear surface 118. Any other suitable surface shape may also be formed at the intersection of element side surface 122 and rear surface 118, including, without limitation, an arcuate surface (e.g., a radius, an ovoid shape, or any other rounded shape), a sharp edge, multiple chamfers/radii, a honed edge, and/or combinations of the foregoing.

Superabrasive element 110 may be formed using any suitable technique, including, for example, HPHT sintering, as described above. In some examples, superabrasive element 110 may be created by first forming a superabrasive element 10 that includes a substrate 12 and a superabrasive table 14, as detailed above in reference to FIGS. 1 and 2. Once superabrasive element 10 has been produced, superabrasive table 14 may be separated from substrate 12 to form superabrasive element 110. For example, prior to or following leaching, superabrasive table 14 may be separated from substrate 12 using any suitable process, including a lapping process, a grinding process, a wire-electrical-discharge machining ("wire EDM") process, or any other suitable material-removal process, without limitation.

According to some embodiments, superabrasive element 110 may be processed and utilized either with or without an attached substrate. For example, following leaching, superabrasive element may be secured directly to a cutting tool, such as a drill bit, or to a bearing component, such as a rotor or stator. In various embodiments, following processing, superabrasive element 110 may be attached to a substrate. For example, rear surface 118 of superabrasive element 110 may be brazed, welded, soldered, threadedly coupled, and/or otherwise adhered and/or fastened to a substrate, such as tungsten carbide substrate or any other suitable substrate, without limitation. Polycrystalline diamond elements having pre-sintered polycrystalline diamond bodies including an infiltrant, such as those disclosed in U.S. Pat. No. 8,323,367, the disclosure of which is incorporated herein, in its entirety, by this reference, may be leached a second time according to the processes disclosed herein after reattachment of the pre-sintered polycrystalline diamond bodies.

Figure 5:
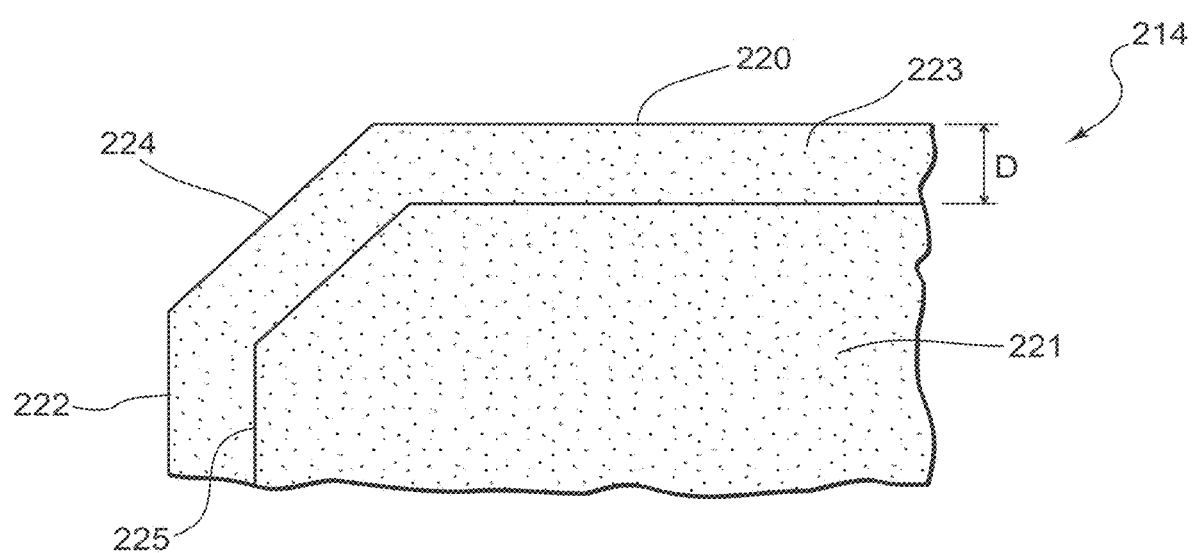
FIG. 5 is a cross-sectional side view of a portion of a superabrasive table according to at least one embodiment.

FIG. 5 is a cross-sectional side view of a portion of an exemplary superabrasive table 214, such as the superabrasive tables 14 and 114 illustrated in FIGS. 1-4. Superabrasive table 14 may comprise a composite material, such as a PCD material. A PCD material may include a matrix of bonded diamond grains and interstitial regions defined between the bonded diamond grains. Such interstitial regions may be at least partially filled with various materials. In some embodiments, a metal-solvent catalyst may be disposed in interstitial regions in superabrasive table 14. Tungsten and/or tungsten carbide may also be present in the interstitial regions.

According to various embodiments, materials may be deposited in interstitial regions during processing of superabrasive table 14. For example, material components of substrate 12 may migrate into a mass of diamond particles used to form a superabrasive table 14 during HPHT sintering. As the mass of diamond particles is sintered, a metal-solvent catalyst may melt and flow from substrate 12 into the mass of diamond particles. As the metal-solvent flows into superabrasive table 14, it may dissolve and/or carry additional materials, such as tungsten and/or tungsten carbide, from substrate 12 into the mass of diamond particles. As the metal-solvent catalyst flows into the mass of diamond particles, the metal-solvent catalyst, and any dissolved and/or undissolved materials, may at least partially fill spaces between the diamond particles. The metal-solvent catalyst may facilitate bonding of adjacent diamond particles to form a PCD layer. Following sintering, any materials, such as, for example, the metal-solvent catalyst, tungsten, and/or tungsten carbide, may remain in interstitial regions within superabrasive table 14.

To improve the performance and heat resistance of a surface of superabrasive table 14, at least a portion of a metal-solvent catalyst, such as cobalt, may be removed from at least a portion of superabrasive table 14. Optionally, tungsten and/or tungsten carbide may be removed from at least a portion of superabrasive table 14. A metal-solvent catalyst, as well as other materials, may be removed from superabrasive table 14 using any suitable technique, without limitation.

For example, electrochemical leaching may be used to remove a metal-solvent catalyst from superabrasive table 214 up to a depth D from a surface of superabrasive table 214, as illustrated in FIG. 5. As shown in FIG. 5, depth D may be measured relative to an external surface of superabrasive table 214, such as superabrasive face 220, superabrasive side surface 222, and/or chamfer 224. In some examples, a metal-solvent catalyst may be removed from superabrasive table 214 up to a depth D of approximately 2500 µm. In additional examples, a metal-solvent catalyst may be removed from superabrasive table 214 up to a depth D of between approximately 100 and 1000 µm.

Following leaching, superabrasive table 214 may comprise a first volume 221 and a second volume 223. Following leaching, superabrasive table 214 may comprise, for example, a first volume 221 that contains a metal-solvent catalyst. An amount of metal-solvent catalyst in first volume 221 may be substantially the same prior to and following leaching. In various embodiments, first volume 221 may be remote from one or more exposed surfaces of superabrasive table 214.

Second volume 223 may comprise a volume of superabrasive table 214 having a lower concentration of the interstitial material than first volume 221. For example, second volume 223 may be substantially free of a metal-solvent catalyst. However, small amounts of catalyst may remain within interstices that are inaccessible to the leaching process. Second volume 223 may extend from one or more surfaces of superabrasive table 214 (e.g., superabrasive face 220, superabrasive side surface 222, and/or chamfer 224) to a depth D from the one or more surfaces. Second volume 223 may be located adjacent one or more surfaces of superabrasive table 214. An amount of metal-solvent catalyst in first volume 221 and/or second volume 223 may vary at different depths in superabrasive table 214.

In at least one embodiment, superabrasive table 214 may include a transition region 225 between first volume 221 and second volume 223. Transition region 225 may include amounts of metal-solvent catalyst varying between an amount of metal-solvent catalyst in first volume 221 and an amount of metal-solvent catalyst in second volume 223. In various examples, transition region 225 may comprise a relatively narrow region between first volume 221 and second volume 223.

Figure 6A:
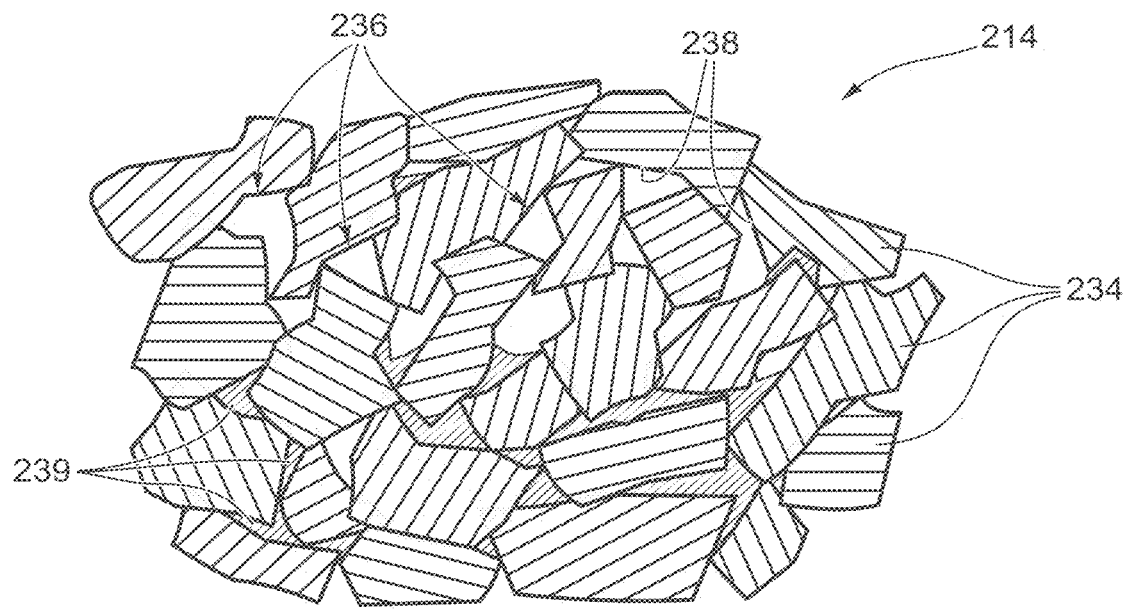
FIG. 6A is a magnified cross-sectional side view of a portion of a superabrasive table according to at least one embodiment.
Figure 6B:
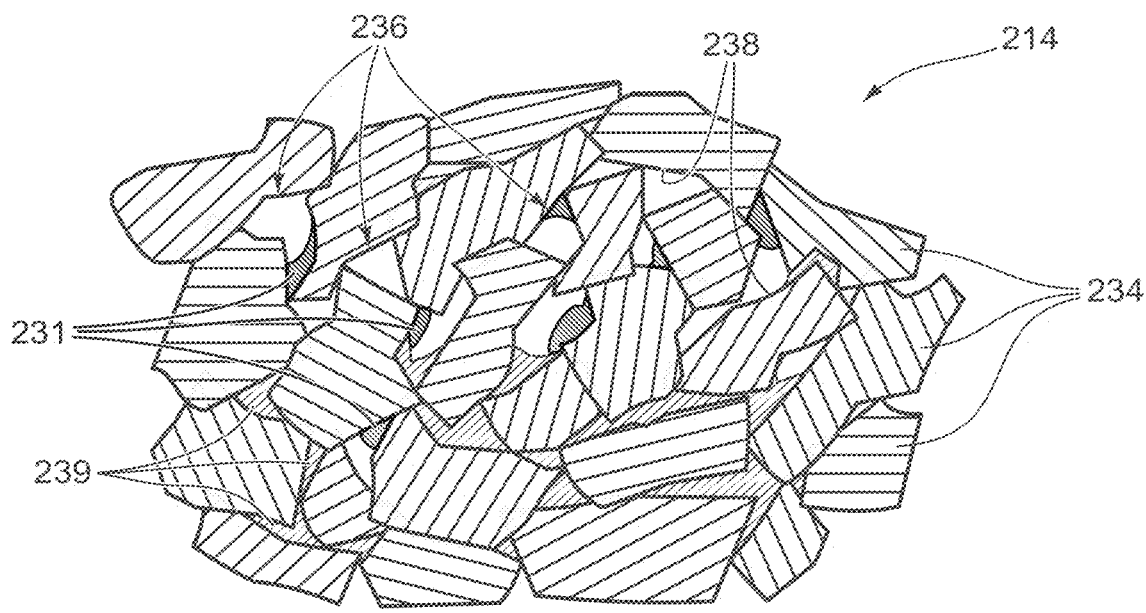
FIG. 6B is a magnified cross-sectional side view of a portion of a superabrasive table according to at least one embodiment.

FIGS. 6A and 6B are magnified cross-sectional side views of a portion of the superabrasive table 214 illustrated in FIG. 5 according to various embodiments. As shown in FIGS. 6A and 6B, superabrasive table 214 may comprise grains 234 and interstitial regions 236 between grains 234 defined by grain surfaces 238. Grains 234 may comprise grains formed of any suitable superabrasive material, including, for example, diamond grains. At least some of grains 234 may be bonded to one or more adjacent grains 234, forming a polycrystalline diamond matrix.

Interstitial material 239 may be disposed in at least some of interstitial regions 236. Interstitial material 239 may comprise any suitable material, such as, for example, a metal-solvent catalyst, tungsten, and/or tungsten carbide. As shown in FIG. 6A, interstitial material 239 may not be present in at least some of interstitial regions 236. At least a portion of interstitial material 239 may be removed from at least some of interstitial regions 236 during a leaching procedure. For example, a substantial portion of interstitial material 239 may be removed from second volume 223 during a leaching procedure. Additionally interstitial material 239 may remain in a first volume 221 following a leaching procedure. In some embodiments, as shown in FIG. 6B, at least some of interstitial regions 236 may be partially filled with interstitial material 231 that is not removed by leaching. For example, in one embodiment, cobalt may be substantially removed from at least some of interstitial regions 236 of first volume 221 and/or second volume 223, while tungsten and/or tungsten carbide may remain in the at least some of interstitial regions 236 of first volume 221 and/or second volume 223.

In some examples, interstitial material 239 may be removed from table 214 to a depth that improves the performance and/or heat resistance of a surface of superabrasive table 214 to a desired degree. In some embodiments, interstitial material 239 may be removed from superabrasive table 214 to a practical limit. In order to remove interstitial material 239 from superabrasive table 214 to a depth beyond the practical limit, for example, significantly more time, temperature, and/or other process parameter may be required. In some embodiments, interstitial material 239 may be removed from superabrasive table 214 to a practical limit or desired degree where interstitial material remains in at least a portion of superabrasive table 214. In various embodiments, superabrasive table 214 may be fully leached so that interstitial material 239 is substantially removed from a substantial portion of superabrasive table 214.

In at least one embodiment, as will be described in greater detail below, interstitial material 239 may be leached from a superabrasive material, such as a PCD material in superabrasive table 214, by exposing the superabrasive material to a suitable processing solution in the presence of an electrode and applying a charge (e.g., a positive charge) to the superabrasive material and an opposite charge (e.g., a negative charge) to the electrode. Interstitial material 239 may include a metal-solvent catalyst, such as cobalt, nickel, iron, and/or alloys thereof.

FIGS. 7-28 show exemplary configurations of superabrasive elements and electrodes for leaching the superabrasive elements. The configurations illustrated in these figures may enable selective leaching of portions of the superabrasive elements to form desired leach profiles within the superabrasive elements. While certain configurations of superabrasive elements are shown and described herein for purposes of illustration, the apparatuses and methods described herein may be applied to any superabrasive article having any suitable material, shape, and configuration, without limitation.

Figure 7:
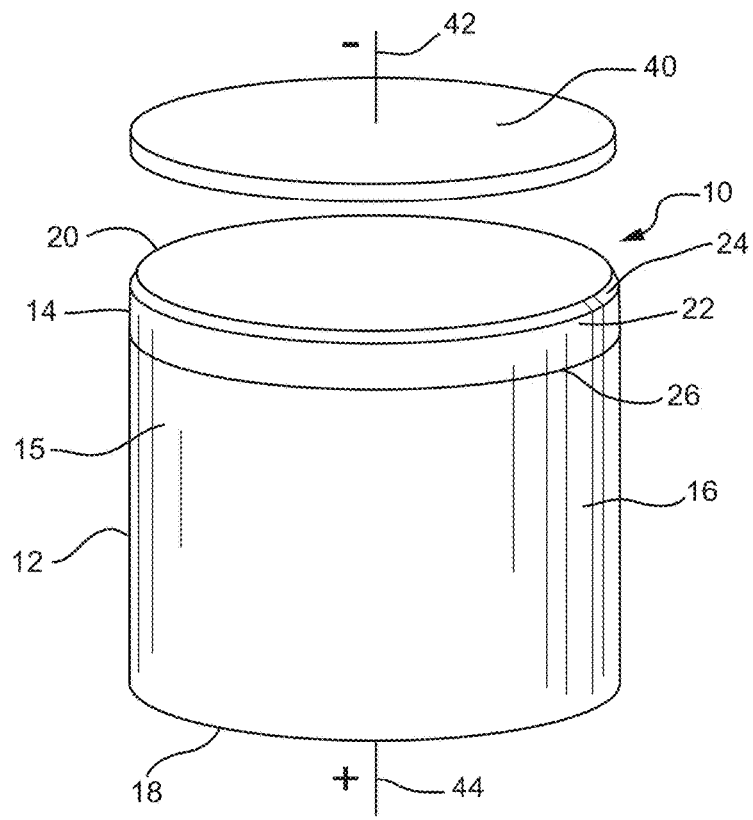
FIG. 7 is a perspective view of an exemplary superabrasive element disposed near an exemplary electrode according to at least one embodiment.
Figure 8:
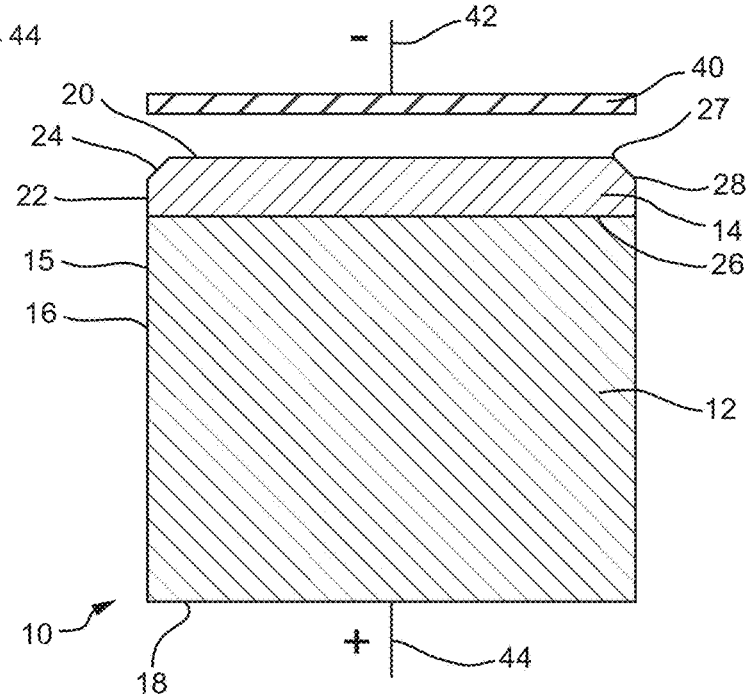
FIG. 8 is a cross-sectional side view of an exemplary superabrasive element disposed near an exemplary electrode according to at least one embodiment.

FIGS. 7 and 8 illustrate an exemplary superabrasive element 10 disposed near an exemplary electrode 40 according to at least one embodiment. As illustrated in FIGS. 7 and 8, superabrasive element 10 may comprise a superabrasive table 14 affixed to or formed upon a substrate 12. Superabrasive table 14 may be affixed to substrate 12 at interface 26, which may be a planar or non-planar interface. Superabrasive element 10 may comprise a rear surface 18, a superabrasive face 20, and an element side surface 15. In some embodiments, element side surface 15 may include a substrate side surface 16 formed by substrate 12 and a superabrasive side surface 22 formed by superabrasive table 14. Rear surface 18 may be formed by substrate 12.

Superabrasive element 10 may also comprise a chamfer 24 (i.e., sloped or angled) formed by superabrasive table 14. Chamfer 24 may comprise an angular and/or rounded edge formed at the intersection of superabrasive side surface 22 and superabrasive face 20. Any other suitable surface shape may also be formed at the intersection of superabrasive side surface 22 and superabrasive face 20, including, without limitation, an arcuate surface (e.g., a radius, an ovoid shape, or any other rounded shape), a sharp edge, multiple chamfers/radii, a honed edge, and/or combinations of the foregoing.

Electrode 40 may comprise any suitable size, shape, and/or geometry, without limitation. According to at least one embodiment, at least a portion of electrode 40 may have a substantially cylindrical shape. For example, electrode 40 may comprise a substantially cylindrical outer surface surrounding a central axis of electrode 40, as illustrated in FIGS. 7 and 8. Electrode 40 may comprise any suitable material that may conduct electricity. Electrode 40 may have an outer diameter that is substantially the same as the outer diameter of element side surface 15 of superabrasive element 10. In at least one embodiment, electrode 40 may comprise copper. Electrode 40 may comprise any suitable electrically conductive material, such as, for example, copper, tungsten carbide, cobalt, zinc, iron, platinum, palladium, niobium, graphite, graphene, nichrome, gold, silver, alloys thereof, any suitable metallic material, and/or any other suitable electrically conductive material, without limitation.

According to various embodiments, a charge may be applied to superabrasive element 10 and electrode 40 through electrical conductors (e.g., wires or any suitable electrical conductor) 44 and 42, respectively. For example, in order to apply a current to processing solution for processing superabrasive element 10, superabrasive element 10 and electrical conductor 44 may be positioned in the processing solution (e.g., optionally, with a leaching cup 30 or other protective covering) and a charge (e.g., a positive charge) may be applied to at least a portion of substrate 12 (e.g., rear surface 18) of superabrasive element 10 through electrical conductor 44 and an opposite charge (e.g., a negative charge) may be applied to electrode 40 through electrical conductor 42. In at least one embodiment, electrical conductor 44 may be electrically connected to substrate 12 by an electrode electrically connected to (e.g., positioned abutting) substrate 12. In some embodiments, electrical conductor 44 may be directly connected to superabrasive table 14 by an electrode electrically connected to (e.g., positioned abutting) superabrasive table 14.

When superabrasive element 10 is disposed in a processing solution such that at least a portion of superabrasive table 14 and electrode 40 are exposed to the processing solution when a voltage is applied to the processing solution via electrode 40 and superabrasive table 14, interstitial materials may be removed from at least a portion of superabrasive table 14 of superabrasive element 10 near electrode 40.

Figure 9A:
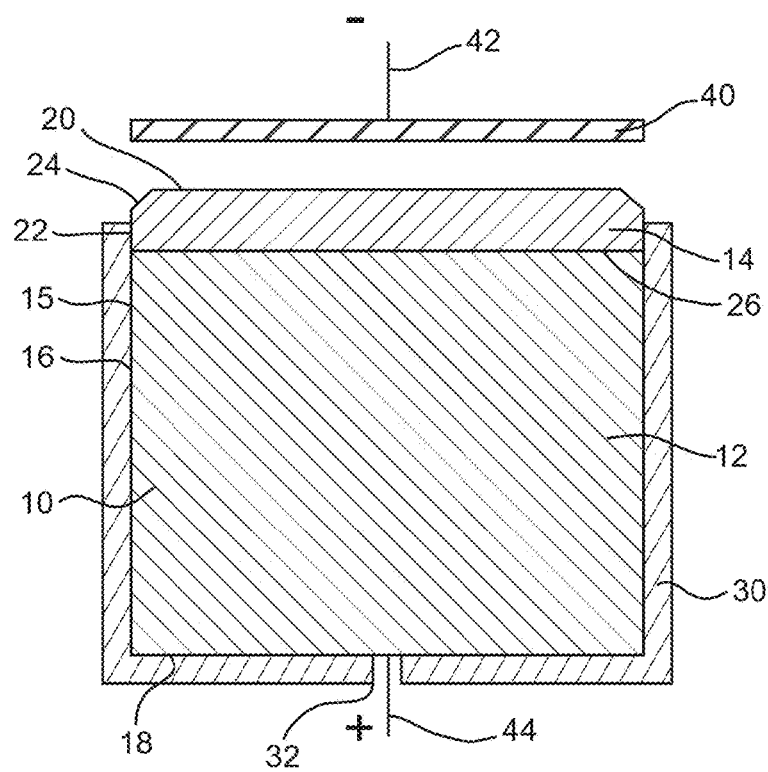
FIG. 9A is a cross-sectional side view of an exemplary superabrasive element disposed near an exemplary electrode and positioned within a protective leaching cup according to at least one embodiment.
Figure 9B:
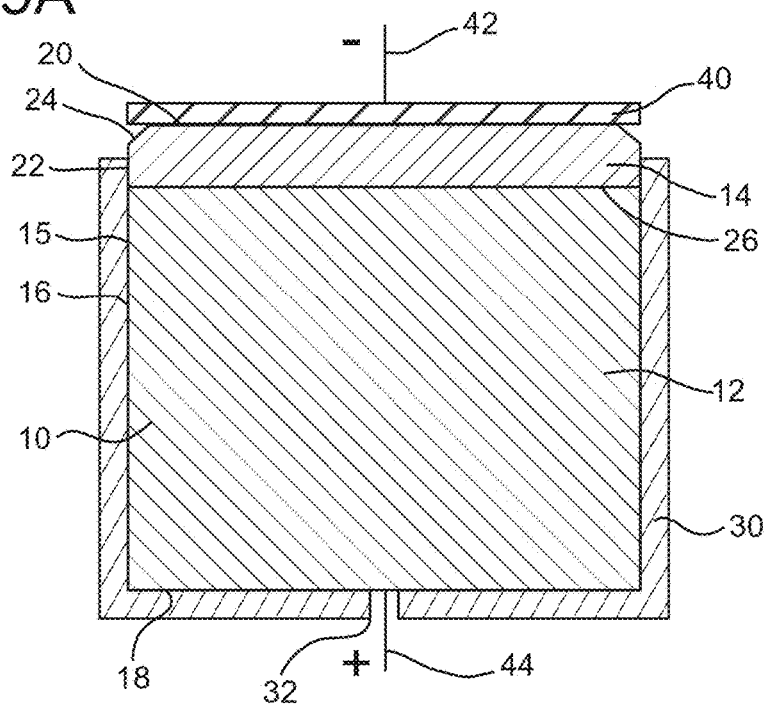
FIG. 9B is a cross-sectional side view of an exemplary superabrasive element disposed adjacent to an exemplary electrode and positioned within a protective leaching cup according to at least one embodiment.

FIGS. 9A and 9B illustrate an exemplary superabrasive element 10 disposed near an exemplary electrode 40 and positioned within a protective leaching cup 30 according to at least one embodiment. As illustrated in FIGS. 9A and 9B, superabrasive element 10 may comprise a superabrasive table 14 affixed to or formed upon a substrate 12. Superabrasive table 14 may be affixed to substrate 12 at interface 26, which may be a planar or non-planar interface. Superabrasive element 10 may comprise a rear surface 18, a superabrasive face 20, and an element side surface 15. In some embodiments, element side surface 15 may include a substrate side surface 16 formed by substrate 12 and a superabrasive side surface 22 formed by superabrasive table 14. Rear surface 18 may be formed by substrate 12. Superabrasive element 10 may also comprise a chamfer 24 formed by superabrasive table 14. Chamfer 24 may comprise an angular and/or rounded edge formed between superabrasive side surface 22 and superabrasive face 20.

As shown in FIGS. 9A and 9B, superabrasive element 10 may be positioned within protective leaching cup 30 such that protective leaching cup 30 surrounds at least a portion of superabrasive element 10, including substrate 12. When superabrasive element 10 is positioned within protective leaching cup 30, at least a portion of superabrasive element 10, such as superabrasive table 14 and/or substrate 12, may be positioned adjacent to and/or contacting a portion of protective leaching cup 30. For example, protective leaching cup 30 may be configured to contact at least a portion of element side surface 15 of superabrasive element 10, forming a seal between protective leaching cup 30 and superabrasive element 10, where the leaching cup 30 is partially or fully impermeable to various fluids, such as a leaching material (e.g., a leaching solution).

Protective leaching cup 30 may be formed of any suitable material, without limitation. For example, protective leaching cup 30 may comprise a flexible, elastic, malleable, and/or otherwise deformable material configured to surround and/or contact at least a portion of superabrasive element 10. Protective leaching cup 30 may prevent damage to superabrasive element 10 when at least a portion of superabrasive element 10 is exposed to various reactive agents. For example, protective leaching cup 30 may prevent a leaching solution from chemically damaging certain portions of superabrasive element 10, such as portions of substrate 12, portions of superabrasive table 14, or both, during leaching. Protective leaching cup 30 may be formed with an opening 32 configured to allow electrical conductor 44 to contract rear surface 18 of superabrasive element 10. Optionally, opening 32 may be sealed with a sealant (e.g., silicone, epoxy, etc.) to prevent the leaching solution from damaging substrate 12, if necessary.

In various embodiments, protective layer 30 may comprise one or more materials that are substantially inert and/or otherwise resistant to acids, bases, and/or other reactive components present in a leaching solution used to leach superabrasive element 10. In some embodiments, protective layer 30 may comprise one or more materials exhibiting significant stability at various temperatures and/or pressures, including selected temperatures and/or pressures used in leaching and/or otherwise processing superabrasive element 10. In some embodiments, protective leaching cup 30 may include one or more polymeric materials, such as, for example, nylon, polytetrafluoroethylene (PTFE), polyethylene, polypropylene, rubber, silicone, and/or other polymers, and/or a combination of any of the foregoing, without limitation. For example, protective leaching cup 30 may comprise PTFE blended with one or more other polymeric materials.

Electrode 40 may be disposed near and/or abutting superabrasive element 10. For example, as shown in FIG. 9A, electrode 40 may be disposed near, but separated from, superabrasive table 14 of superabrasive element 10. Electrode 40 may be disposed any suitable distance away from superabrasive element 10. Optionally, as illustrated in FIG. 9B, electrode 40 may be disposed adjacent to at least a portion of superabrasive element 10. For example, electrode may be electrically connected to (e.g., positioned abutting) a portion of superabrasive table 14, such as superabrasive face 20. Although not shown, electrode 40 may be disposed adjacent to any other suitable portion of superabrasive table 14, such as, for example, superabrasive side surface 22 and/or chamfer 24.

Figure 9C:
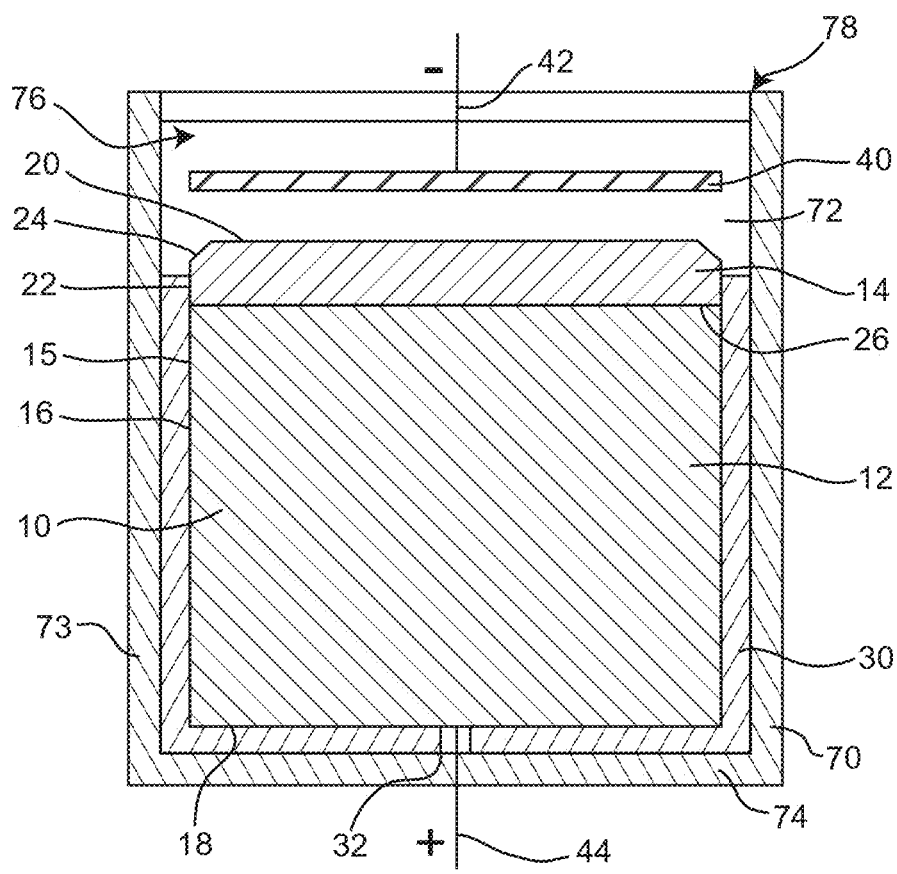
FIG. 9C is a cross-sectional side view of an exemplary leaching assembly according to at least one embodiment.

FIG. 9C is a cross-sectional side view of an exemplary leaching assembly according to at least one embodiment. As illustrated in FIG. 9C, superabrasive element 10 may be positioned within a protective leaching cup 30 and disposed near electrode 40. Superabrasive element 10, electrode 40, and protective leaching cup 30 may further be positioned within a processing vessel 70.

As shown in FIG. 9C, processing vessel 70 may have a rear wall 74 and a side wall 73 defining a cavity 76. Rear wall 74 and side wall 73 may have any suitable shape, without limitation. Processing vessel 70 may include an opening 78 opposite rear wall 74. Cavity 76 may contain a processing solution 72 such that at least a portion of superabrasive element 10 is exposed to processing solution 72.

Superabrasive element 10 may be positioned in cavity 76 so that superabrasive element 10 is positioned adjacent to or near rear wall 74 of processing vessel 70. In some embodiments, superabrasive element 10 may be positioned and/or secured within processing vessel 70 using any suitable mechanism, without limitation. Processing vessel 70 may be larger than leaching cup 30, so that there are gaps between leaching cup 30 and processing vessel 70. In other embodiments, more than one superabrasive element 10 and protective leaching cup 30 (e.g., 10 or more, 20 or more, etc.) may be placed within a single processing vessel 70 for loading.

According to some embodiments, processing solution 72 may comprise a conductive solution (e.g., a conductive aqueous solution, a conductive non-aqueous solution, etc.). Solvents in such processing solution 72 may comprise water and/or any other suitable solvent, without limitation. Processing solution 72 may also comprise dissolved electrolytes. Such electrolytes may comprise any suitable electrolyte compounds, including, without limitation, acetic acid, ammonium chloride, arsenic acid, ascorbic acid, citric acid, formic acid, hydrobromic acid, hydrofluoric acid, hydroiodic acid, lactic acid, malic acid, nitric acid, oxalic acid, phosphoric acid, propionic acid, pyruvic acid, succinic acid, tartaric acid, and/or any suitable carboxylic acid (e.g., monocarboxylic acid, polycarboxylic acid, etc.), and/or ions, salts, and/or esters of any of the foregoing, and/or any combination of the foregoing. Such electrolytes may be present in processing solution 72 at any suitable concentration, without limitation. For example, one or more electrolytes may be present in processing solution 72 at a concentration of, for example, less than approximately 5 M. In certain embodiments, one or more electrolytes may be present in processing solution 72 at a concentration of, for example, less than approximately 0.01 M. In at least one embodiment, one or more electrolytes may be present in processing solution 72 at a concentration of, for example, between approximately 0.01 M and approximately 3 M. In some embodiments, one or more electrolytes may be present in processing solution 72 at a concentration of, for example, between approximately 0.1 M and approximately 1 M. In additional embodiments, one or more electrolytes may be present in processing solution 72 at a concentration of, for example, between approximately 0.2 M and approximately 0.4 M. In at least one embodiment, one or more electrolytes may be present in processing solution 72 at a concentration of, for example, approximately 0.3 M.

Processing solution 72 may have a pH of between approximately 1 and approximately 12. In certain embodiments, processing solution 72 may have a pH below approximately 1. In some embodiments, processing solution 72 may have a pH of between approximately 1 and approximately 7. In at least one embodiment, for example, processing solution 72 may have a pH approximately 2.0.

In some embodiments, processing solution 72 may include metal salts, such as cobalt salts, iron salts, nickel salts, copper salts, and/or any other suitable transition metal salts, and/or any other suitable metal ion salts, without limitation. Such metal salts may include, for example, cobalt chloride, cobalt nitrate, iron chloride, and/or any other suitable metal salts, without limitation. One or more metal salts may be present in processing solution 72 at any suitable concentration, including, for example, a concentration of less than approximately 2 M. In at least one embodiment, one or more metal salts may be present in processing solution 72 at a concentration of, for example, between approximately 0.01 M and approximately 1 M. In some embodiments, one or more metal salts may be present in processing solution 72 at a concentration of, for example, between approximately 0.03 M and approximately 0.5 M. In additional embodiments, one or more metal salts may be present in processing solution 72 at a concentration of, for example, between approximately 0.05 M and approximately 0.3 M. In at least one embodiment, for example, one or more compounds may be dissolved in processing solution 72 at a concentration of, for example, approximately 0.1 M.

Processing solution 72 may further include any other suitable components, without limitation, including, for example, a buffering agent (e.g., boric acid, an amine compound such as ethylenediamine, triethanolamine, ethanolamine, etc.), a pH control agent (e.g., sodium hydroxide, etc.), and/or a conducting agent (e.g., sodium sulfate, ammonium citrate, etc.). In some examples, processing solution 72 may comprise an acid (e.g., a mineral acid) suitable for increasing the solubility of a metallic material, such as cobalt or any other material, with respect to processing solution 72, including, for example, nitric acid, hydrochloric acid, phosphoric acid, sulfuric acid, boric acid, hydrofluoric acid, and/or any combination of the foregoing mineral acids. The acid may be selected for its ability to attack and/or dissolve a metallic material within superabrasive table 14. Processing solution 72 may then carry the dissolved metallic material out of superabrasive table 14. In some examples, a suitable acid may be configured to increase the solubility of a metallic material, such as cobalt, in the processing mixture, thereby facilitating leaching of the metallic material from superabrasive table 14 using the processing mixture. In additional examples, an acid may be configured to increase the solubility of iron, tungsten, and/or nickel in the processing mixture.

Processing solution 72 may comprise a complexing agent dissolved in the solvent. The complexing agent may comprise a compound suitable for forming metal complexes with various interstitial materials, including, for example, tungsten and/or tungsten carbide. The complexing agent may form metal complexes with tungsten and/or tungsten carbide present in a superabrasive material, thereby inhibiting or preventing the formation and/or build-up of tungsten oxides, such as $WO_2$, $W_2O_5$, and $WO_3$, in the superabrasive material. Metal complexes formed between the complexing agent and tungsten and/or tungsten carbide may be soluble in processing solution 72, thereby enabling the metal complexes to be easily removed from superabrasive table 14. Accordingly, the complexing agent may facilitate the removal of tungsten and/or tungsten carbide from a leached portion of superabrasive table 14, thereby reducing the amount of residual tungsten, tungsten carbide, and/or tungsten oxide present in a leached region of superabrasive table 14. The complexing agent may also facilitate removal of additional metal compounds that may be present in superabrasive table 14. Examples of suitable compounds that may function as complexing agents include, without limitation, phosphoric acid, citric acid, tartaric acid, oxalic acid, ammonium chloride, and/or any combination of the foregoing.

In various embodiments, processing solution 72 may optionally include one or more of an electrolyte (e.g., acetic acid, ammonium chloride, arsenic acid, ascorbic acid, citric acid, formic acid, hydrobromic acid, hydrofluoric acid, hydroiodic acid, lactic acid, malic acid, nitric acid, oxalic acid, phosphoric acid, propionic acid, pyruvic acid, succinic acid, tartaric acid, carboxylic acid, etc.), an acid (e.g., nitric acid, hydrochloric acid, phosphoric acid, sulfuric acid, boric acid, hydrofluoric acid, etc.), a metal salt (e.g., cobalt salts, iron salts, etc.), a buffering agent (e.g., boric acid, an amine compound such as ethylenediamine, triethanolamine, ethanolamine, etc.), a pH control agent (e.g., sodium hydroxide, etc.), a conducting agent (e.g., sodium sulfate, ammonium citrate, etc.), a complexing agent (e.g., phosphoric acid, citric acid, tartaric acid, oxalic acid, ammonium chloride, etc.), and/or combinations of the foregoing, without limitation.

In one embodiment, a processing solution can include a combination of an organic acid and a metal salt, such as a divalent metal salt.

The divalent metal salt can be but is not limited to a Group II metal salt. The organic acid can be but is not limited to a naturally occurring food acid. Such a processing solution can exhibit a synergistic effect by exhibiting better leaching properties, including a deeper leaching depth, than the organic acid used alone. Moreover, such a processing solution can also benefit the environment and the workers by avoiding safety issues associated with the use of highly corrosive mineral acids or strong acids (e.g., acids with a pH around 0 to 1) such as hydrochloric acid, nitric acid, and/or hydrofluoric acid.

Suitable organic acids comprising a processing solution may include, without limitation, acetic acid, succinic acid, citric acid, tartaric acid, malic acid, folic acid, fumaric acid, and combinations thereof. One suitable organic acid is citric acid. In one embodiment, these acids may exhibit a relatively high pH (e.g., greater than 3, greater than 4 pH, greater than 5 pH, or greater than 6 pH), they may be both environmentally friendly and pose little or no safety risk to the workers. An organic acid can be provided in a solvent, such as an aqueous solution, which may also contain the divalent, e.g., Group II metal salt and any additional ingredient(s). In one embodiment, an organic acid can be present in the aqueous processing solution at a concentration of about 0.01M to about 5M, suitably about 0.05M to about 2.5M, or about 0.1M to about 1M, or about 0.3M to about 0.8M.

Suitable divalent metal salts comprising a processing solution may include, without limitation, divalent metal halides. Examples include, without limitation, the fluoride, chloride, bromide and iodide salts of beryllium; the fluoride, chloride, bromide and iodide salts of magnesium; the fluoride, chloride, bromide and iodide salts of calcium; the fluoride, chloride, bromide and iodide salts of strontium; the fluoride, chloride, bromide and iodide salts of barium; and combinations thereof. For example, a suitable divalent metal salt may comprise magnesium (e.g., magnesium chloride, magnesium fluoride, magnesium bromide, and/or magnesium iodide). In one embodiment, the Group II metal salt or a divalent metal salt can be included in the solvent-based (e.g., aqueous-based) processing solution in a concentration of about 0.005M to about 2M, suitably about 0.01M to about 1M, or about 0.01M to about 0.1M, or about 0.01M to about 0.05M.

In one embodiment, an organic acid and a divalent (e.g., Group II) metal salt can also be combined with a weak inorganic acid and/or a weak organic acid, which may facilitate the electrolytic properties of the processing solution without causing undue corrosion or safety risk to the workers. Suitable weak inorganic acids include, without limitation, sulfurous acid, phosphoric acid, nitrous acid, hydrogen peroxide, any other weak inorganic acids, and combinations thereof. Suitable weak organic acids include, without limitation, carbonic acid, trichloroacetic acid, methanoic acid, benzoic acid, any other weak organic acids, and combinations thereof. One suitable weak acid, which is a weak inorganic acid, is phosphoric acid. In one embodiment, a weak organic acid can be present in the solvent-based (e.g., aqueous) processing solution at about 0.1% to about 15% by weight, about 1% to about 10% by weight, or about 2% to about 7% by weight.

Electrode 40 may comprise any suitable size, shape, and/or geometry, without limitation. According to at least one embodiment, at least a portion of electrode 40 may be substantially disk shaped. For example, electrode 40 may comprise a disk shape having a circular or non-circular periphery. Electrode 40 may comprise a suitable electrically conductive material, such as, for example, a metallic, semi-metallic, and/or graphitic material. For example electrode may include, without limitation, copper, tungsten carbide, cobalt, zinc, iron, platinum, palladium, niobium, graphite, graphene, nichrome, gold, silver, alloys thereof, any suitable metallic material, and/or any other suitable electrically conductive material, without limitation.

According to various embodiments, a charge may be applied to superabrasive element 10 and electrode 40 through electrical conductors 44 and 42, respectively. For example, in order to apply a current to processing solution 72 for processing superabrasive element 10, at least a portion of superabrasive element 10 may be positioned in processing solution 72 and a charge may be applied to at least a portion of superabrasive element 10 (e.g., rear surface 18 of substrate 12) through electrical conductor 44. For example, a positive charge may be applied to substrate 12 such that at least a portion of superabrasive element 10 acts as an anode. An opposite charge may be applied to electrode 40 through electrical conductor 42. For example, a negative charge may be applied to electrode 40 such that electrode 40 acts as a cathode. In at least one embodiment, electrical conductor 44 may be electrically connected to substrate 12 by an electrode electrically connected to (e.g., positioned abutting) substrate 12. In some embodiments, electrical conductor 44 may be directly connected to superabrasive table 14 by an electrode electrically connected to (e.g., positioned abutting and/or disposed at least partially within) superabrasive table 14.

According to some embodiments, a voltage of less than approximately 10 V may be applied to processing solution 72 via electrode 40 and superabrasive element 10. In some embodiments, a voltage of between approximately 0.01 V and approximately 5 V may be applied to processing solution 72. In some embodiments, a voltage of between approximately 0.5 V and approximately 3 V may be applied to processing solution 72. In some embodiments, a voltage of between approximately 0.1 V and approximately 3 V may be applied to processing solution 72. In additional embodiments, a voltage of between approximately 0.4 V and approximately 2.4 V may be applied to processing solution 72. In some embodiments, a voltage of approximately 0.5 V, 0.6 V, 0.7 V, 0.8 V, 0.9 V, or 1.0 V may be applied to processing solution 72.

In various embodiments, a voltage applied to processing solution 72 may be changed one or more times while superabrasive element 10 is exposed to processing solution 72. For example, the electrical conductivity of processing solution 72 may change during processing of superabrasive element 10 such that different voltages are required over time to maintain a desired current flow between superabrasive element 10 and electrode 40. In at least one embodiment, for example, materials removed from superabrasive element 10 and dissolved in processing solution 72 during processing may cause processing solution 72 to decrease in electrical conductivity and increase in electrical resistance. The voltage between superabrasive element 10 and electrode 40 may be increased in conjunction with the decrease in electrical conductivity/increase in electrical resistance so as to maintain a desired current flow through superabrasive element 10 and/or processing solution 72.

When superabrasive element 10 and electrode 40 are disposed in the processing solution 72 such that at least a portion of superabrasive table 14 and electrode 40 are exposed to processing solution 72 and a voltage is applied to processing solution 72 via electrode 40 and superabrasive table 14, interstitial materials may be removed from at least a portion of superabrasive table 14 and electrodeposited onto a portion of electrode 40 exposed to electroplating solution 72. For example, a metallic material, such as cobalt, present in at least a portion of superabrasive table 14 may be electrolytically oxidized in the presence of a current flowing between superabrasive element 10 and electrode 40. The oxidized metallic material may then be leached into processing solution 72 as dissolved metal cations. Dissolved metal cations (e.g., cobalt cations) present in processing solution 72 may then be reduced at electrode 40 to form a metal coating on a surface portion of electrode 40. Accordingly, a metallic material, such as cobalt, may be effectively transferred from at least a portion of superabrasive table 14 of superabrasive element 10 to a surface portion of electrode 40 through electrodeposition of the metallic material onto the surface portion of electrode 40.

In additional embodiments, a negative charge may be applied to superabrasive element 10 such that at least a portion of superabrasive element 10 acts as a cathode and a positive charge may be applied to electrode 40 such that electrode 40 acts as an anode. A metallic material present in superabrasive table 14 may be reduced to form metal anions that are dissolved in processing solution 72 and the dissolved metallic anions may then be electrodeposited through oxidation onto a surface portion of electrode 40.

According to various embodiments, superabrasive table 14 may be exposed to processing solution 72 at a desired temperature and/or pressure prior to and/or during leaching. Exposing superabrasive table 14 to a selected temperature and/or pressure during leaching may increase the depth to which the superabrasive table 14 may be leached. Exposing superabrasive table 14 to a selected temperature and/or pressure during leaching may decrease an amount of time required to leach superabrasive table 14 to a desired degree.

In various examples, at least a portion of superabrasive element 10 and processing solution 72 may be heated to a temperature of between approximately 15° C. and approximately 280° C. during leaching. According to additional embodiments, at least a portion of a superabrasive element 10 and processing solution 72 may be heated to a temperature of between approximately 20° C. and approximately 95° C. during leaching. For example, at least a portion of a superabrasive element 10 and processing solution 72 may be heated to a temperature of approximately 25° C.

In various embodiments, at least a portion of superabrasive element 10 and processing solution 72 may be exposed to a pressure of between approximately 0 bar and approximately 100 bar during leaching. In additional embodiments, at least a portion of superabrasive element 10 and processing solution 72 may be exposed to a pressure of between approximately 20 bar and approximately 80 bar during leaching. In at least one example, at least a portion of superabrasive element 10 and processing solution 72 may be exposed to a pressure of approximately 50 bar during leaching.

According to additional embodiments, at least a portion of superabrasive element 10 and processing solution 72 may be exposed to at least one of microwave radiation, and/or ultrasonic energy. By exposing at least a portion of superabrasive element 10 to microwave radiation, induction heating, and/or ultrasonic energy as superabrasive element 10 is exposed to processing solution 72, the rate at which superabrasive table 14 is leached may be increased.

Figure 10A:
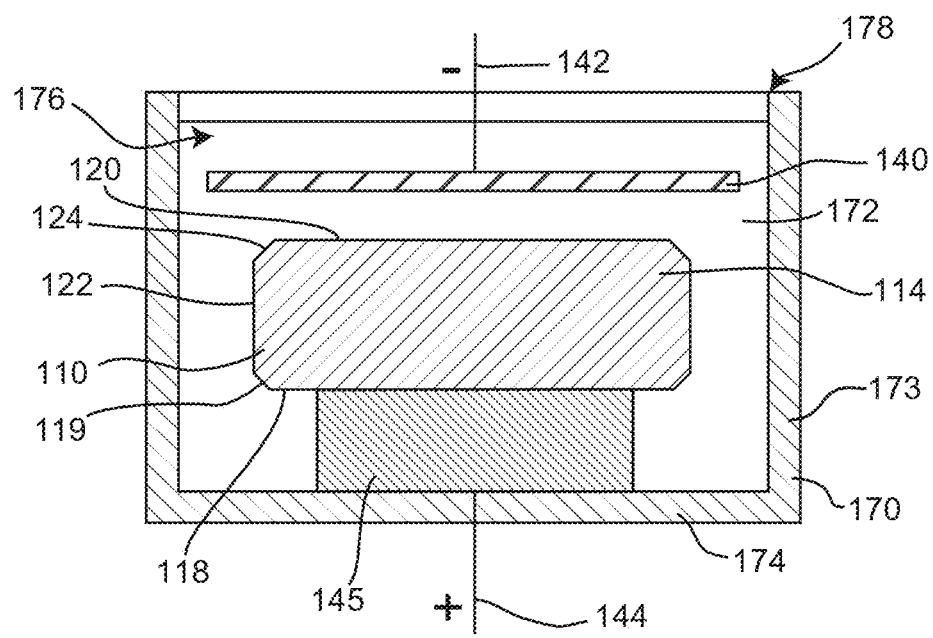
FIG. 10A is a cross-sectional side view of an exemplary leaching assembly according to at least one embodiment.

FIGS. 10A-10E show exemplary superabrasive elements 110 and assemblies for leaching superabrasive elements 110. FIG. 10A is a cross-sectional side view of an exemplary leaching assembly according to at least one embodiment. As shown in FIG. 10A, superabrasive element 110 may be disposed near an electrode 140. Superabrasive element 110 may comprise a superabrasive table 114 that is not affixed to or formed upon a substrate (see superabrasive element 110 illustrated in FIGS. 3 and 4). Superabrasive element 110 may comprise a rear surface 118, a superabrasive face 120, and an element side surface 122. Superabrasive element 110 may also comprise a chamfer 124 formed by superabrasive table 114. Chamfer 124 may comprise an angular and/or rounded edge formed between superabrasive side surface 122 and superabrasive face 120. Superabrasive element 110 may also comprise a rear chamfer 119 formed by superabrasive table 114 at the intersection of element side surface 122 and rear surface 118.

In some embodiments, as illustrated in FIG. 10A, superabrasive element 110 may not be surrounded by a protective covering, such as a leaching cup. Optionally, superabrasive element 110 may be at least partially covered by a protective layer, such as a leaching cup and/or a masking layer. Superabrasive element 110 and electrode 140 may be positioned within a processing vessel 170. Processing vessel 170 may have a rear wall 174 and a side wall 173 defining a cavity 176. Rear wall 174 and side wall 173 may have any suitable shape, without limitation. Processing vessel 170 may include an opening 178 opposite rear wall 174. Cavity 176 may contain a suitable processing solution 172 such that at least a portion of superabrasive element 110 is exposed to processing solution 172. Superabrasive element 110 may be positioned in cavity 176 so that superabrasive element 110 is disposed near and/or electrically connected to (e.g., abutting) electrode 140.

Electrode 140 may comprise any suitable size, shape, and/or geometry, without limitation. According to at least one embodiment, at least a portion of electrode 140 may be substantially disk shaped. For example, electrode 140 may comprise a disk shape having a circular or non-circular periphery. Electrode 140 may comprise a suitable electrically conductive material, such as, for example, a metallic, semi-metallic, and/or graphitic material. For example electrode 140 may include, without limitation, copper, tungsten carbide, cobalt, zinc, iron, platinum, palladium, niobium, graphite, graphene, nichrome, gold, silver, alloys thereof, any suitable metallic material, and/or any other suitable electrically conductive material, without limitation.

According to various embodiments, a charge may be applied to superabrasive element 110 and electrode 140 through electrical conductors 144 and 142, respectively. For example, in order to apply a current to processing solution 172 for processing superabrasive element 110, at least a portion of superabrasive element 110 may be positioned in processing solution 172 and a charge may be applied to at least a portion of superabrasive element 110 (e.g., rear surface 118 of substrate 112) through electrical conductor 144 and an opposite charge may be applied to electrode 140 through electrical conductor 142. In some embodiments, as shown in FIG. 10A, superabrasive element 110 may be disposed on an electrode 145, which electrically connects electrical conductor 144 to superabrasive element 110. Electrode 145 may separate superabrasive element 110 from processing vessel 170, thereby facilitating contact between a greater surface area of superabrasive element 110 and processing solution 172. Additionally, electrode 145 may facilitate positioning of superabrasive element 110 near electrode 140. Optionally, superabrasive element 110 may be positioned near rear wall 174 of processing vessel 170 and/or may be connected to electrical conductor 144 without electrode 145.

In some embodiments, superabrasive element 110 may be coupled to electrode 145, or optionally, to electrical conductor 144, through brazing, welding, soldering, adhesive bonding, mechanical fastening, and/or any other suitable bonding technique. For example, superabrasive element 110 may be bonded to electrode 145 or electrical conductor 144 by a braze joint (e.g., a carbide forming braze such as a titanium-based braze, etc.). In at least one embodiment, such a braze joint may be coated with a protective layer (e.g., paint layer, epoxy layer, etc.).

In at least one embodiment, a positive charge may be applied to superabrasive element 110, which acts as an anode, via electrical conductor 144 and electrode 145. An opposite charge may be applied to electrode 140 through electrical conductor 142. For example, a negative charge may be applied to electrode 140 such that electrode 140 acts as a cathode. When superabrasive element 110 and electrode 140 are disposed in the processing solution 172 such that at least a portion of superabrasive table 114 and electrode 140 are exposed to processing solution 172 and a voltage is applied to processing solution 172 via electrode 140 and superabrasive table 114, interstitial materials may be removed from at least a portion of superabrasive table 114 and electrodeposited onto a portion of electrode 140 exposed to electroplating solution 172. Superabrasive element 110 may be exposed to processing solution 172 and/or a charge may be applied to processing solution 172 until a desired level of leaching is obtained.

Figure 10B:
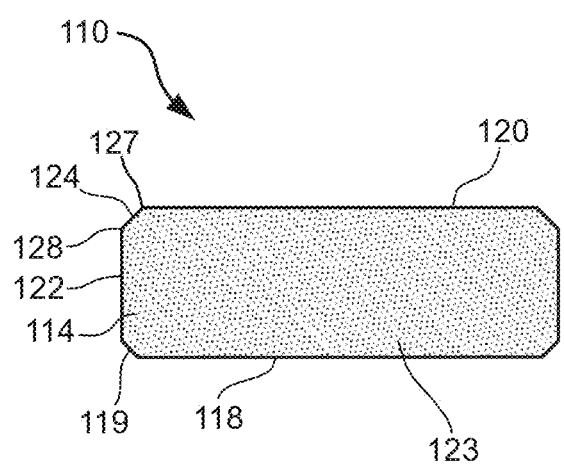
FIG. 10B is a cross-sectional side view of an exemplary leached superabrasive element according to at least one embodiment.
Figure 10C:
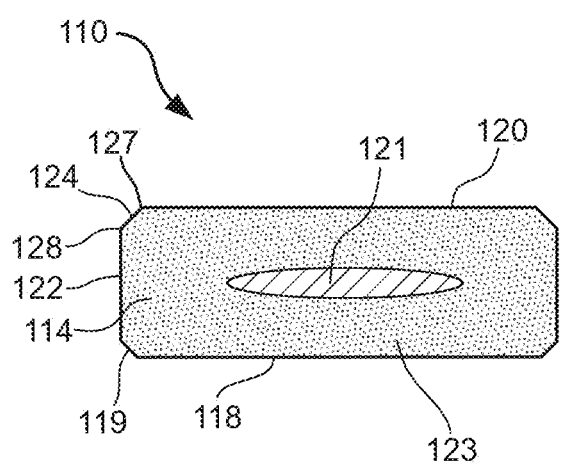
FIG. 10C is a cross-sectional side view of an exemplary leached superabrasive element according to at least one embodiment.

FIGS. 10B and 10C illustrate superabrasive elements that have been leached to different extents. FIG. 10B shows a superabrasive element 110 that has been leached substantially throughout superabrasive table 114. Accordingly, superabrasive table 114 may have a leached volume 123 that substantially occupies the entire volume of superabrasive table 114. According to various embodiments, at least some of interstitial regions in leached volume 123 may be at least partially filled with interstitial material that is not removed by leaching.

FIG. 10C shows a superabrasive element 110 that has been partially leached. Superabrasive table 114 may include a first volume 121 comprising an interstitial material and a second volume 123 having a lower concentration of the interstitial material than first volume 121. As shown in FIG. 10B, first volume 121 may be surrounded by second volume 123 such that substantially all surface portions (i.e., superabrasive face 120, element side surface 122, chamfer 124, chamfer 119) of superabrasive table 114 are defined by second volume 123, from which the interstitial material has been substantially removed.

Figure 10D:
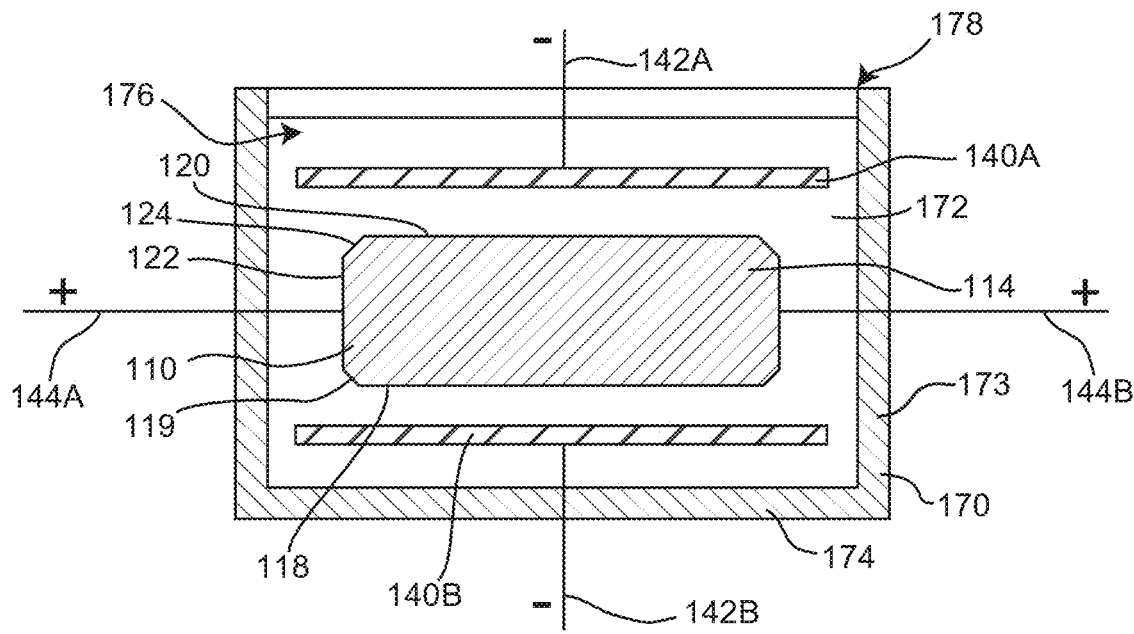
FIG. 10D is a cross-sectional side view of an exemplary leaching assembly according to at least one embodiment.
Figure 10E:
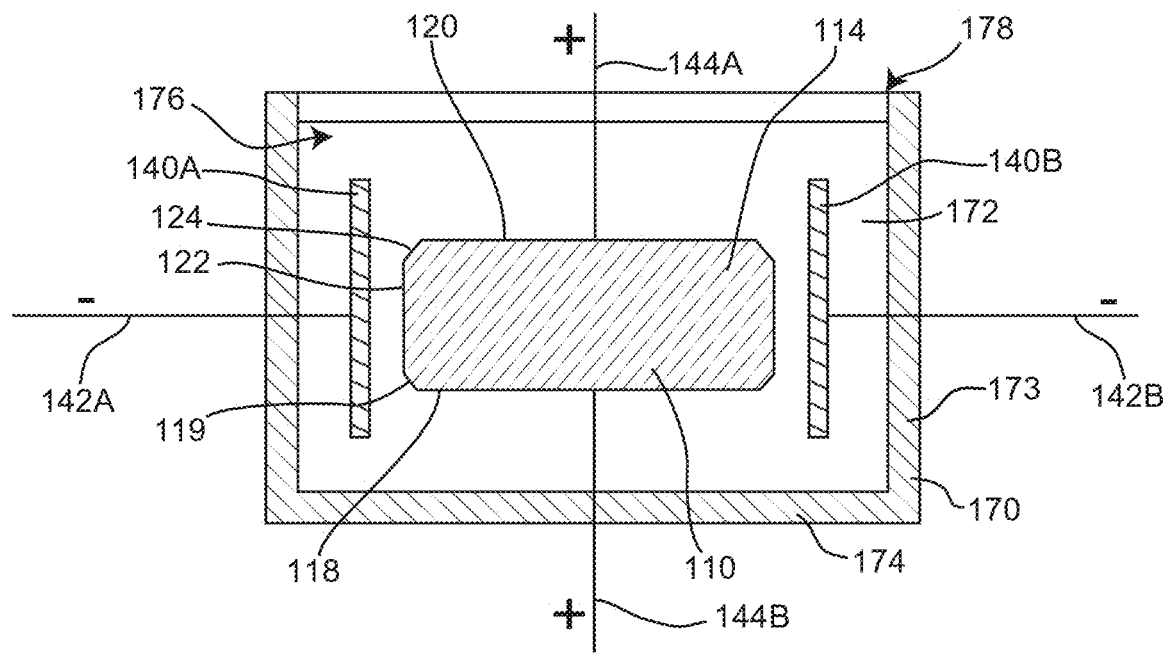
FIG. 10E is a cross-sectional side view of an exemplary leaching assembly according to at least one embodiment.

FIGS. 10D and 10E show cross-sectional side views of exemplary leaching assemblies according to various embodiments. As shown in FIGS. 10D and 10E, superabrasive element 110 may be disposed near a plurality of electrodes, including at least electrodes 140A and 140B. Superabrasive element 110 may comprise a superabrasive table 114 that is not affixed to or formed upon a substrate (see superabrasive element 110 illustrated in FIGS. 3 and 4). Superabrasive element 110 may comprise a rear surface 118, a superabrasive face 120, an element side surface 122, a chamfer 124 between superabrasive side surface 122 and superabrasive face 120, and a rear chamfer 119 between element side surface 122 and rear surface 118.

In some embodiments, as illustrated in FIGS. 10D and 10E, superabrasive element 110 may not be surrounded by a protective covering, such as a leaching cup. Optionally, superabrasive element 110 may be at least partially covered by a protective layer, such as a leaching cup and/or a masking layer. Superabrasive element 110 and electrodes 140A and 140B may be positioned within a processing vessel 170. Processing vessel 170 may have a rear wall 174 and a side wall 173 defining a cavity 176. Rear wall 174 and side wall 173 may have any suitable shape, without limitation. Processing vessel 170 may include an opening 178 opposite rear wall 174. Cavity 176 may contain a suitable processing solution 172 such that at least a portion of superabrasive element 110 is exposed to processing solution 172. Superabrasive element 110 may be positioned in cavity 176 so that superabrasive element 110 is disposed near and/or electrically connected to (e.g., abutting) electrode 140.

Electrodes 140A and 140B may comprise any suitable size, shape, and/or geometry, without limitation. According to at least one embodiment, at least a portion of each of electrode 140A and/or electrode 140B may be substantially disk shaped. For example, electrode 140A and/or electrode 140B may comprise a disk shape having a circular or non-circular periphery. In some embodiments, electrode 140A and/or electrode 140B may have a suitable concave and/or convex surface shape. Electrode 140 may comprise a suitable electrically conductive material, such as, for example, a metallic, semi-metallic, and/or graphitic material.

Electrodes 140A and 140B may be disposed at any suitable locations with respect to superabrasive element 110 and each other. For example, electrode 140A and electrode 140B may be disposed on opposite sides of superabrasive element 110. For example, as illustrated in FIG. 10D, electrode 140A may be positioned near superabrasive face 120 and electrode 140B may be positioned near rear surface 118. As illustrated in FIG. 10E, electrode 140A may be positioned near a portion of element side surface 122 and electrode 140B may be positioned near another portion element side surface 122. Optionally, electrodes 140A and 140B may be disposed near the same and/or adjacent sides of superabrasive element 110. In certain embodiments, electrode 140A and/or electrode 140B may be electrically connected to (e.g., positioned abutting) at least a portion of superabrasive element 110.

In some embodiments, electrodes 140A and 140B may represent portions of an annular or ring-shaped electrode peripherally surrounding superabrasive element 110, and electrical conductor 142A and/or electrical conductor 142B may be electrically connected to the annular or ring-shaped electrode at one or more locations. For example, electrodes 140A and 140B may comprise sections or portions of an annular or ring-shaped body, and electrical conductors 142A and 142B may be electrically connected to each section.

According to various embodiments, a charge may be applied to superabrasive element 110 through one or more electrical connections. For example, a charge may be applied to superabrasive element 110 through electrical conductor 144A and/or electrical conductor 144B. A charge may be applied to electrode 140A and/or electrode 140B through electrical conductor 142A and/or electrical conductor 142B, respectively. In order to apply a current to processing solution 172 for processing superabrasive element 110, at least a portion of superabrasive element 110 may be positioned in processing solution 172 and a charge may be applied to at least a portion of superabrasive element 110 through electrical conductor 144A and/or electrical conductor 144B and an opposite charge may be applied to electrode 140A and/or electrode 140B through electrical conductor 142A and/or electrical conductor 142B.

In some embodiments, superabrasive element 110 may be coupled to electrical conductor 144A and/or electrical conductor 144B at any suitable location (e.g., element side surface 122 as shown in FIG. 10D, or superabrasive face 120 and/or rear surface 118 as shown in FIG. 10E) through brazing, welding, soldering, adhesive bonding, mechanical fastening, and/or any other suitable bonding technique. For example, superabrasive element 110 may be bonded to electrode 145 or electrical conductor 144 by a braze joint (e.g., a carbide forming braze such as a titanium-based braze, etc.). In at least one embodiment, such a braze joint may be coated with a protective layer (e.g., paint layer, epoxy layer, etc.).

As shown in FIGS. 10D and 10E, a positive charge may be applied to superabrasive element 110, which acts as an anode, via electrical conductor 144A and/or electrical conductor 144B. A negative charge may be applied to electrode 140A and/or 140B through electrical conductor 142A and/or electrical conductor 142B, respectively, such that electrode 140A and/or 140B acts as a cathode. When superabrasive element 110 and electrodes 140A and 140B are disposed in the processing solution 172 such that at least a portion of superabrasive table 114 and electrodes 140A and 140B are exposed to processing solution 172 and a voltage is applied to processing solution 172 via superabrasive table 114 and electrode 140A and/or electrode 140B, interstitial materials may be removed from at least a portion of superabrasive table 114 and electrodeposited onto at least a portion of electrode 140A and/or electrode 140B exposed to electroplating solution 172. Superabrasive element 110 may be exposed to processing solution 172 and/or a charge may be applied to processing solution 172 until a desired level of leaching is obtained.

According to some embodiments, once interstitial materials have been removed from a substantial portion of superabrasive table or once interstitial materials have been removed from superabrasive element 110 to a selected leach depth, a material coupling electrical conductor 144A and/or electrical conductor 144B to superabrasive element 110 may be at least partially degraded by processing solution 172. For example, a braze joint bonding electrical conductor 144A and/or electrical conductor 144B to superabrasive table 114 may have a more positive reduction potential than an interstitial material (e.g., cobalt) within superabrasive table 114. Accordingly, the interstitial material may be preferentially degraded by processing solution 172 prior to substantial degradation of the braze joint. Once the interstitial material is substantially removed from superabrasive table 114 during leaching, processing solution 172 may more aggressively degrade the braze joint such that electrical conductor 144A and/or electrical conductor 144B are electrically and/or physically disconnected from superabrasive element 110.

FIGS. 11 and 12 illustrate an exemplary superabrasive element 310 positioned near an exemplary electrode 340 according to at least one embodiment. Electrode 340 may comprise any suitable size, shape and/or geometry, without limitation. As illustrated in FIGS. 11 and 12, superabrasive element 310 may comprise a superabrasive table 314 affixed to or formed upon a substrate 312. Superabrasive table 314 may be affixed to substrate 312 at interface 326, which may be a planar or non-planar interface. Superabrasive element 310 may comprise a rear surface 318, a superabrasive face 320, and an element side surface 315. In some embodiments, element side surface 315 may include a substrate side surface 316 formed by substrate 312 and a superabrasive side surface 322 formed by superabrasive table 314. Rear surface 318 may be formed by substrate 312. Superabrasive element 310 may also comprise a chamfer 324 formed by superabrasive table 314.

According to various embodiments, a charge may be applied to superabrasive element 310 and electrode 340 through electrical conductors (e.g., wires or any suitable electrical conductor) 344 and 342, respectively. For example, in order to apply a current to a processing solution (e.g., processing solution 72 illustrated in FIG. 9C) for processing superabrasive element 310, superabrasive element 310 and electrical conductor 344 may be positioned in the processing solution (e.g., optionally, with a leaching cup 30 or other protective covering) and a charge may be applied to at least a portion of substrate 312 (e.g., rear surface 318) of superabrasive element 310 through electrical conductor 344 and an opposite charge may be applied to electrode 340 through electrical conductor 342. In at least one embodiment, electrical conductor 344 may be electrically connected to substrate 312 by an electrode electrically connected to (e.g., positioned abutting) substrate 312. In some embodiments, electrical conductor 344 may be directly connected to superabrasive table 314 by an electrode electrically connected to (e.g., positioned abutting) superabrasive table 314.

According to at least one embodiment, at least a portion of electrode 340 may comprise a substantially annular or ring-shaped body. For example, electrode 340 may comprise a substantially annular ring surrounding a central axis (e.g., central axis 29 shown in FIGS. 1-2), as illustrated in FIGS. 11 and 12. When superabrasive element 310 and electrode 340 are disposed in a processing solution such that at least a portion of superabrasive table 314 and electrode 340 are exposed to the processing solution and a voltage is applied to the processing solution via electrode 340 and superabrasive table 314, interstitial materials may be removed from at least a portion of superabrasive table 314 of superabrasive element 310 exposed to the processing solution. In some embodiments, interstitial materials may be removed to greater depths from surface portions of superabrasive table 314 disposed in relatively closer proximity to electrode 340 than other surface portions of superabrasive table 314. Accordingly, a peripheral region of superabrasive table 314 defining chamfer 324 may be leached to a greater depth than a central region of superabrasive table 314.

FIGS. 13 and 14 illustrate an exemplary superabrasive element 410 positioned near an exemplary electrode 440 according to at least one embodiment. As illustrated in FIGS. 13 and 14, superabrasive element 410 may comprise a superabrasive table 414 affixed to or formed upon a substrate 412. Superabrasive element 410 may comprise a rear surface 418, a superabrasive face 420, and an element side surface 415. In some embodiments, element side surface 415 may include a substrate side surface 416 formed by substrate 412 and a superabrasive side surface 422 formed by superabrasive table 414. Rear surface 418 may be formed by substrate 412. Superabrasive element 410 may also comprise a chamfer 424 formed by superabrasive table 414.

According to various embodiments, a charge may be applied to superabrasive element 410 and electrode 440 through electrical conductors (e.g., wires or any suitable electrical conductor) 444 and 442, respectively. For example, in order to apply a current to a processing solution (e.g., processing solution 72 illustrated in FIG. 9C) for processing superabrasive element 410, superabrasive element 410 and electrical conductor 444 may be positioned in the processing solution (e.g., optionally, with a leaching cup 30 or other protective covering) and a charge may be applied to at least a portion of substrate 412 (e.g., rear surface 418) of superabrasive element 410 through electrical conductor 444 and an opposite charge may be applied to electrode 440 through electrical conductor 442. In at least one embodiment, electrical conductor 444 may be electrically connected to substrate 412 by an electrode electrically connected to (e.g., positioned abutting) substrate 412. In some embodiments, electrical conductor 444 may be directly connected to superabrasive table 414 by an electrode electrically connected to (e.g., positioned abutting) superabrasive table 414.

According to at least one embodiment, at least a portion of electrode 440 may comprise a disk shape. For example, electrode 440 may comprise a disk having a substantially circular outer periphery surface surrounding a central axis (e.g., central axis 29 shown in FIGS. 1-2), as illustrated in FIGS. 13 and 14. In some embodiments, electrode 440 may have an outer diameter that is smaller than the outer diameter of element side surface 415 of superabrasive element 410 and/or smaller than an inner diameter of chamfer 424. When superabrasive element 410 and electrode 440 are disposed in a processing solution such that at least a portion of superabrasive table 414 and electrode 440 are exposed to the processing solution and a voltage is applied to the processing solution via electrode 440 and superabrasive table 414, interstitial materials may be removed from at least a portion of superabrasive table 414 of superabrasive element 410 exposed to the processing solution. In some embodiments, interstitial materials may be removed to greater depths from surface portions of superabrasive table 414 disposed in relatively closer proximity to electrode 440 than other surface portions of superabrasive table 414. Accordingly, an axially central region of superabrasive table 414 may be leached to a greater depth than an outer peripheral region.

FIGS. 15-21 illustrate superabrasive elements and electrodes in cross-sectional views. The electrodes illustrated in these figures are intended to be disk-shaped and/or ring-shaped (see, e.g., electrodes 340 and 440 respectively shown in FIGS. 11 and 13).

Figure 15:
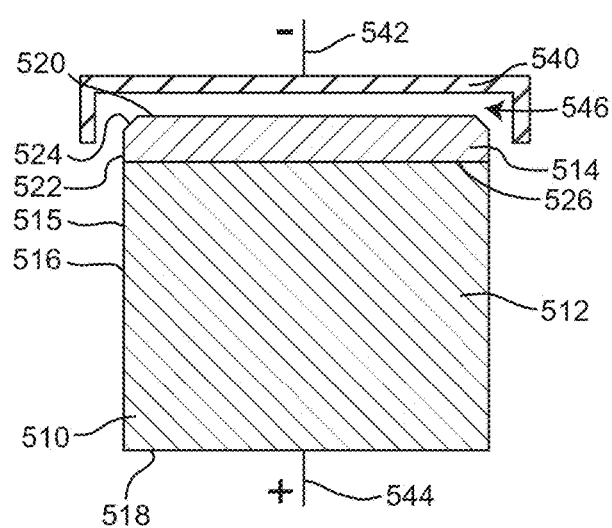
FIG. 15 is a cross-sectional side view of an exemplary superabrasive element and an exemplary electrode according to at least one embodiment.

FIG. 15 shows a cross-sectional side view of an exemplary superabrasive element 510 and an exemplary electrode 540 according to at least one embodiment. As illustrated in FIG. 15, superabrasive element 510 may comprise a superabrasive table 514 affixed to or formed upon a substrate 512. Superabrasive table 514 may be affixed to substrate 512 at interface 526. Superabrasive element 510 may comprise a rear surface 518, a superabrasive face 520, and an element side surface 515, which may include a substrate side surface 516 formed by substrate 512 and a superabrasive side surface 522 formed by superabrasive table 514. Superabrasive element 510 may also comprise a chamfer 524 formed by superabrasive table 514.

According to various embodiments, a charge may be applied to superabrasive element 510 and electrode 540 through electrical conductors (e.g., wires or any suitable electrical conductor) 544 and 542, respectively. For example, in order to apply a current to a processing solution (e.g., processing solution 72 illustrated in FIG. 9C) for processing superabrasive element 510, superabrasive element 510 and electrical conductor 544 may be positioned in the processing solution (e.g., optionally, with a leaching cup 30 or other protective covering) and a charge may be applied to at least a portion of substrate 512 (e.g., rear surface 518) of superabrasive element 510 through electrical conductor 544 and an opposite charge may be applied to electrode 540 through electrical conductor 542.

According to at least one embodiment, at least a portion of electrode 540 may comprise a substantially cylindrical shape defining a recess 546. For example, electrode 540 may comprise a substantially cylindrical outer surface, as illustrated in FIG. 15. Recess 546 may be defined within electrode 540 and may have a diameter that is greater than the outer diameter of element side surface 515 of superabrasive element 510. Electrode 540 may be disposed such that at least a portion of recess 546 surrounds at least a portion of superabrasive table 514 of superabrasive element 510, as shown in FIG. 15. When superabrasive element 510 and electrode 540 are disposed in the processing solution such that at least a portion of superabrasive table 514 and electrode 540 are exposed to the processing solution and a voltage is applied to the processing solution via electrode 540 and superabrasive table 514, interstitial materials may be removed from at least a portion of superabrasive table 514 exposed to the processing solution.

Figure 16:
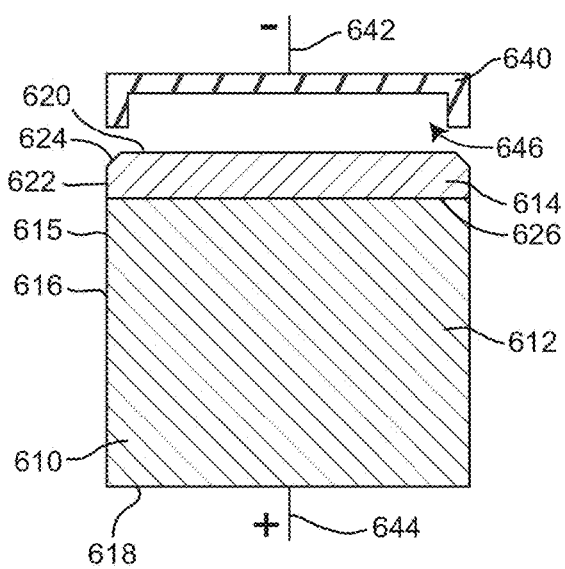
FIG. 16 is a cross-sectional side view of an exemplary superabrasive element and an exemplary electrode according to at least one embodiment.

FIG. 16 shows a cross-sectional side view of an exemplary superabrasive element 610 positioned near an exemplary electrode 640 according to at least one embodiment. As illustrated in FIG. 16, superabrasive element 610 may comprise a superabrasive table 614 affixed to or formed upon a substrate 612. Superabrasive table 614 may be affixed to substrate 612 at interface 626. Superabrasive element 610 may comprise a rear surface 618, a superabrasive face 620, and an element side surface 615, which may include a substrate side surface 616 formed by substrate 612 and a superabrasive side surface 622 formed by superabrasive table 614. Superabrasive element 610 may also comprise a chamfer 624 formed by superabrasive table 614.

According to various embodiments, a charge may be applied to superabrasive element 610 and electrode 640 through electrical conductors (e.g., wires or any suitable electrical conductor) 644 and 642, respectively. For example, in order to apply a current to a processing solution (e.g., processing solution 72 illustrated in FIG. 9C) for processing superabrasive element 610, superabrasive element 610 and electrical conductor 644 may be positioned in the processing solution (e.g., optionally, with a leaching cup 30 or other protective covering) and a charge may be applied to at least a portion of substrate 612 (e.g., rear surface 618) of superabrasive element 610 through electrical conductor 644 and an opposite charge may be applied to electrode 640 through electrical conductor 642.

According to at least one embodiment, at least a portion of electrode 640 may comprise a substantially cylindrical shape defining a recess 646. For example, electrode 640 may comprise a substantially cylindrical outer surface, as illustrated in FIG. 16. Recess 646 may be defined within electrode 640 and may have a diameter that is substantially the same as or smaller than the outer diameter of element side surface 615 of superabrasive element 610. When superabrasive element 610 and electrode 640 are disposed in the processing solution such that at least a portion of superabrasive table 614 and electrode 640 are exposed to the processing solution and a voltage is applied to the processing solution via electrode 640 and superabrasive table 614, interstitial materials may be removed from at least a portion of superabrasive table 614 of superabrasive element 610 exposed to the processing solution.

Figure 17:
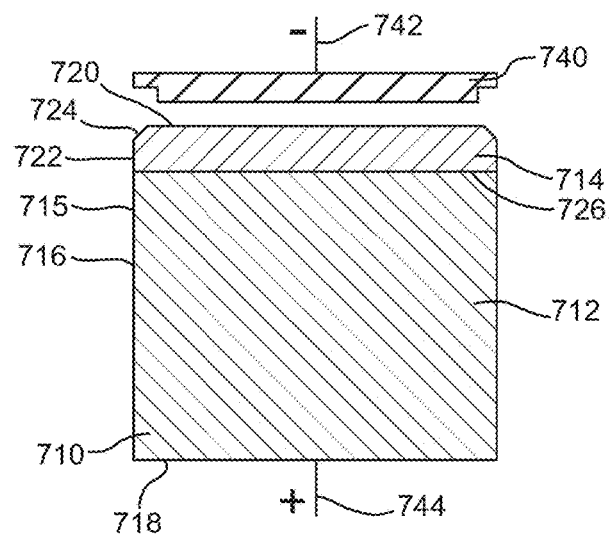
FIG. 17 is a cross-sectional side view of an exemplary superabrasive element and an exemplary electrode according to at least one embodiment.

FIG. 17 shows a cross-sectional side view of an exemplary superabrasive element 710 positioned near an exemplary electrode 740 according to at least one embodiment. As illustrated in FIG. 17, superabrasive element 710 may comprise a superabrasive table 714 affixed to or formed upon a substrate 712. Superabrasive table 714 may be affixed to substrate 712 at interface 726. Superabrasive element 710 may comprise a rear surface 718, a superabrasive face 720, and an element side surface 715, which may include a substrate side surface 716 formed by substrate 712 and a superabrasive side surface 722 formed by superabrasive table 714. Superabrasive element 710 may also comprise a chamfer 724 formed by superabrasive table 714.

According to various embodiments, a charge may be applied to superabrasive element 710 and electrode 740 through electrical conductors (e.g., wires or any suitable electrical conductor) 744 and 742, respectively. For example, in order to apply a current to a processing solution (e.g., processing solution 72 illustrated in FIG. 9C) for processing superabrasive element 710, superabrasive element 710 and electrical conductor 744 may be positioned in the processing solution (e.g., optionally, with a leaching cup 30 or other protective covering) and a charge may be applied to at least a portion of substrate 712 (e.g., rear surface 718) of superabrasive element 710 through electrical conductor 744 and an opposite charge may be applied to electrode 740 through electrical conductor 742.

According to at least one embodiment, at least a portion of electrode 740 may comprise a substantially cylindrical shape with a peripheral recess 748 defined therein and extending circumferentially around at least a peripheral portion of electrode 740. For example, peripheral recess 748 may be defined between a face of electrode 740 located nearest superabrasive element 710 and an outer peripheral surface of electrode 740, as illustrated in FIG. 17. When superabrasive element 710 and electrode 740 are disposed in a processing solution such that at least a portion of superabrasive table 714 and electrode 740 are exposed to the processing solution and a voltage is applied to the processing solution via electrode 740 and superabrasive table 714, interstitial materials may be removed from at least a portion of superabrasive table 714 of superabrasive element 710 exposed to the processing solution.

Figure 18:
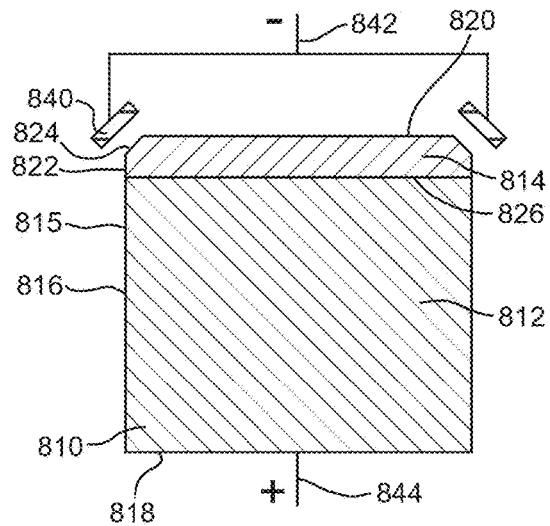
FIG. 18 is a cross-sectional side view of an exemplary superabrasive element and an exemplary electrode according to at least one embodiment.

FIG. 18 shows a cross-sectional side view of an exemplary superabrasive element 810 and an exemplary electrode 840 according to at least one embodiment. As illustrated in FIG. 18, superabrasive element 810 may comprise a superabrasive table 814 affixed to or formed upon a substrate 812. Superabrasive table 814 may be affixed to substrate 812 at interface 826. Superabrasive element 810 may comprise a rear surface 818, a superabrasive face 820, and an element side surface 815, which may include a substrate side surface 816 formed by substrate 812 and a superabrasive side surface 822 formed by superabrasive table 814. Superabrasive element 810 may also comprise a chamfer 824 formed by superabrasive table 814.

According to various embodiments, a charge may be applied to superabrasive element 810 and electrode 840 through electrical conductors (e.g., wires or any suitable electrical conductor) 844 and 842, respectively. For example, in order to apply a current to a processing solution (e.g., processing solution 72 illustrated in FIG. 9C) for processing superabrasive element 810, superabrasive element 810 and electrical conductor 844 may be positioned in the processing solution (e.g., optionally, with a leaching cup 30 or other protective covering) and a charge may be applied to at least a portion of substrate 812 (e.g., rear surface 818) of superabrasive element 810 through electrical conductor 844 and an opposite charge may be applied to electrode 840 through electrical conductor 842.

Electrode 840 may be annular or ring-shaped and electrical conductor 842 may be electrically connected to electrode 840 at one or more locations. For example, electrode 840 may comprise sections or portions of an annular or ring-shaped body, and electrical conductor 842 may be electrically connected to each section. In at least one embodiment, electrical conductor 844 may be electrically connected to substrate 812 by an electrode electrically connected to (e.g., positioned abutting) substrate 812. In some embodiments, electrical conductor 844 may be directly connected to superabrasive table 814 by an electrode electrically connected to (e.g., positioned abutting) superabrasive table 814.

According to at least one embodiment, at least a portion of electrode 840 may comprise a substantially tilted annular or ring-shaped body. For example, electrode 840 may comprise an annular ring surrounding a central axis (e.g., central axis 29 shown in FIGS. 1-2) and tilted at an angle, as illustrated in FIG. 18. Electrode 840 may be disposed in a position such that at least a portion of electrode 840 surrounds at least a portion of superabrasive table 814 of superabrasive element 810, such as chamfer 824, as shown in FIG. 18. In some embodiments, electrode 840 may be tilted at substantially the same angle as chamfer 824. When superabrasive element 810 and electrode 840 are disposed in the processing solution such that at least a portion of superabrasive table 814 and electrode 840 are exposed to the processing solution and a voltage is applied to the processing solution via electrode 840 and superabrasive table 814, interstitial materials may be removed from at least a portion of superabrasive table 814 of superabrasive element 810 exposed to the processing solution. In some embodiments, interstitial materials may be removed to greater depths from surface portions of superabrasive table 814 disposed in relatively closer proximity to electrode 840 than other surface portions of superabrasive table 814. Accordingly, a peripheral region of superabrasive table 814 defining chamfer 824 may be leached to a greater depth than a central region of superabrasive table 814.

Figure 19:
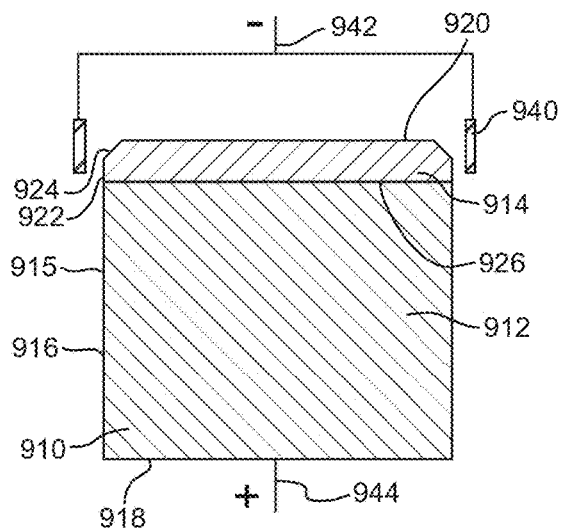
FIG. 19 is a cross-sectional side view of an exemplary superabrasive element and an exemplary electrode according to at least one embodiment.

FIG. 19 shows a cross-sectional side view of an exemplary superabrasive element 910 and an exemplary electrode 940 according to at least one embodiment. As illustrated in FIG. 19, superabrasive element 910 may comprise a superabrasive table 914 affixed to or formed upon a substrate 912. Superabrasive table 914 may be affixed to substrate 912 at interface 926. Superabrasive element 910 may comprise a rear surface 918, a superabrasive face 920, and an element side surface 915, which may include a substrate side surface 916 formed by substrate 912 and a superabrasive side surface 922 formed by superabrasive table 914. Superabrasive element 910 may also comprise a chamfer 924 formed by superabrasive table 914.

According to various embodiments, a charge may be applied to superabrasive element 910 and electrode 940 through electrical conductors (e.g., wires or any suitable electrical conductor) 944 and 942, respectively. For example, in order to apply a current to a processing solution (e.g., processing solution 72 illustrated in FIG. 9C) for processing superabrasive element 910, superabrasive element 910 and electrical conductor 944 may be positioned in the processing solution (e.g., optionally, with a leaching cup 30 or other protective covering) and a charge may be applied to at least a portion of substrate 912 (e.g., rear surface 918) of superabrasive element 910 through electrical conductor 944 and an opposite charge may be applied to electrode 940 through electrical conductor 942.

Electrode 940 may be annular or ring-shaped and electrical conductor 942 may be electrically connected to electrode 940 at one or more locations. For example, electrode 940 may comprise sections or portions of an annular or ring-shaped body, and electrical conductor 942 may be electrically connected to each section. In at least one embodiment, electrical conductor 944 may be electrically connected to substrate 912 by an electrode electrically connected to (e.g., positioned abutting) substrate 912. In some embodiments, electrical conductor 944 may be directly connected to superabrasive table 914 by an electrode electrically connected to (e.g., positioned abutting) superabrasive table 914.

According to at least one embodiment, at least a portion of electrode 940 may comprise a substantially annular or ring-shaped body. For example, electrode 940 may comprise a substantially annular ring surrounding a central axis (e.g., central axis 29 shown in FIGS. 1-2), as illustrated in FIG. 19. In at least one embodiment, electrode 940 may have an inner diameter that is greater than the outer diameter of element side surface 915 of superabrasive element 910. Electrode 940 may be disposed in a position such that at least a portion of electrode 940 surrounds at least a portion of superabrasive table 914 of superabrasive element 910, as shown in FIG. 19. When superabrasive element 910 and electrode 940 are disposed in the processing solution such that at least a portion of superabrasive table 914 and electrode 940 are exposed to the processing solution and a voltage is applied to the processing solution via electrode 940 and superabrasive table 914, interstitial materials may be removed from at least a portion of superabrasive table 914 of superabrasive element 910 exposed to the processing solution. In some embodiments, interstitial materials may be removed to greater depths from surface portions of superabrasive table 914 disposed in relatively closer proximity to electrode 940 than other surface portions of superabrasive table 914. Accordingly, a peripheral region of superabrasive table 914 defining chamfer 924 and/or superabrasive side surface 922 may be leached to a greater depth than a central region of superabrasive table 914.

Figure 20:
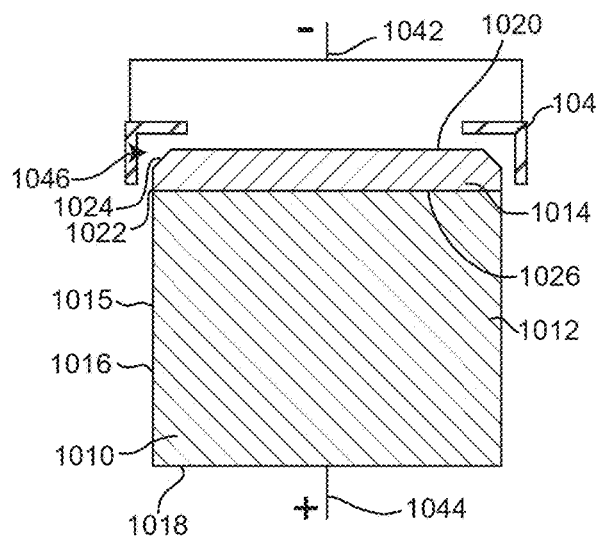
FIG. 20 is a cross-sectional side view of an exemplary superabrasive element and an exemplary electrode according to at least one embodiment.

FIG. 20 shows a cross-sectional side view of an exemplary superabrasive element 1010 and an exemplary electrode 1040 according to at least one embodiment. As illustrated in FIG. 20, superabrasive element 1010 may comprise a superabrasive table 1014 affixed to or formed upon a substrate 1012. Superabrasive table 1014 may be affixed to substrate 1012 at interface 1026. Superabrasive element 1010 may comprise a rear surface 1018, a superabrasive face 1020, and an element side surface 1015, which may include a substrate side surface 1016 formed by substrate 1012 and a superabrasive side surface 1022 formed by superabrasive table 1014. Superabrasive element 1010 may also comprise a chamfer 1024 formed by superabrasive table 1014.

According to various embodiments, a charge may be applied to superabrasive element 1010 and electrode 1040 through electrical conductors (e.g., wires or any suitable electrical conductor) 1044 and 1042, respectively. For example, in order to apply a current to a processing solution (e.g., processing solution 72 illustrated in FIG. 9C) for processing superabrasive element 1010, superabrasive element 1010 and electrical conductor 1044 may be positioned in the processing solution (e.g., optionally, with a leaching cup 30 or other protective covering) and a charge may be applied to at least a portion of substrate 1012 (e.g., rear surface 1018) of superabrasive element 1010 through electrical conductor 1044 and an opposite charge may be applied to electrode 1040 through electrical conductor 1042.

Electrode 1040 may be annular or ring-shaped and electrical conductor 1042 may be electrically connected to electrode 1040 at one or more locations. For example, electrode 1040 may comprise sections or portions of an annular or ring-shaped body, and electrical conductor 1042 may be electrically connected to each section. In at least one embodiment, electrical conductor 1044 may be electrically connected to substrate 1012 by an electrode electrically connected to (e.g., positioned abutting) substrate 1012. In some embodiments, electrical conductor 1044 may be directly connected to superabrasive table 1014 by an electrode electrically connected to (e.g., positioned abutting) superabrasive table 1014.

According to at least one embodiment, at least a portion of electrode 1040 may comprise a substantially annular or ring-shaped body and may define a recess 1046, as illustrated in FIG. 20. In at least one embodiment, a surface of electrode 1040 defining recess 1046 may have a diameter that is greater than the outer diameter of element side surface 1015 of superabrasive element 1010. Electrode 1040 may be disposed in a position such that at least a portion of recess 1046 surrounds at least a portion of superabrasive table 1014 of superabrasive element 1010, as shown in FIG. 20. When superabrasive element 1010 and electrode 1040 are disposed in the processing solution such that at least a portion of superabrasive table 1014 and electrode 1040 are exposed to the processing solution and a voltage is applied to the processing solution via electrode 1040 and superabrasive table 1014, interstitial materials may be removed from at least a portion of superabrasive table 1014 of superabrasive element 1010 exposed to the processing solution. In some embodiments, interstitial materials may be removed to greater depths from surface portions of superabrasive table 1014 disposed in relatively closer proximity to electrode 1040 than other surface portions of superabrasive table 1014. Accordingly, a peripheral region of superabrasive table 1014 defining chamfer 1024 and/or superabrasive side surface 1022 may be leached to a greater depth than a central region of superabrasive table 1014.

Figure 21:
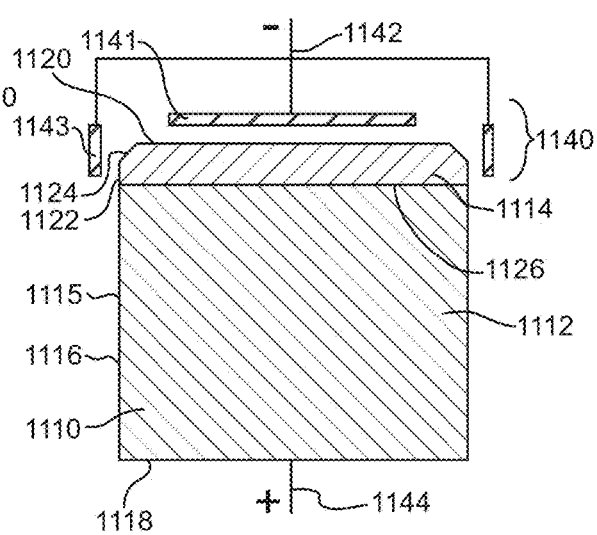
FIG. 21 is a cross-sectional side view of an exemplary superabrasive element and an exemplary electrode according to at least one embodiment.

FIG. 21 shows a cross-sectional side view of an exemplary superabrasive element 1110 and an exemplary electrode assembly 1140 comprising a first electrode 1141 and a second electrode 1143 according to at least one embodiment. As illustrated in FIG. 21, superabrasive element 1110 may comprise a superabrasive table 1114 affixed to or formed upon a substrate 1112. Superabrasive table 1114 may be affixed to substrate 1112 at interface 1126. Superabrasive element 1110 may comprise a rear surface 1118, a superabrasive face 1120, and an element side surface 1115, which may include a substrate side surface 1116 formed by substrate 1112 and a superabrasive side surface 1122 formed by superabrasive table 1114. Superabrasive element 1110 may also comprise a chamfer 1124 formed by superabrasive table 1114.

According to various embodiments, a charge may be applied to superabrasive element 1110 and electrode assembly 1140 through electrical conductors (e.g., wires or any suitable electrical conductor) 1144 and 1142, respectively. For example, in order to apply a current to a processing solution (e.g., processing solution 72 illustrated in FIG. 9C) for processing superabrasive element 1110, superabrasive element 1110 and electrical conductor 1144 may be positioned in the processing solution (e.g., optionally, with a leaching cup 30 or other protective covering) and a charge may be applied to at least a portion of substrate 1112 (e.g., rear surface 1118) of superabrasive element 1110 through electrical conductor 1144 and an opposite charge may be applied to electrode assembly 1140 through electrical conductor 1142.

At least a portion of electrode assembly 1140 may be annular or ring-shaped and electrical conductor 1142 may be electrically connected to electrode assembly 1140 at one or more locations. For example, second electrode 1143 may comprise sections or portions of an annular or ring-shaped body, and electrical conductor 1142 may be electrically connected to each section. In at least one embodiment, electrical conductor 1144 may be electrically connected to substrate 1112 by an electrode electrically connected to (e.g., positioned abutting) substrate 1112. In some embodiments, electrical conductor 1144 may be directly connected to superabrasive table 1114 by an electrode electrically connected to (e.g., positioned abutting) superabrasive table 1114.

According to at least one embodiment, first electrode 1141 may comprise a disk-shaped electrode positioned near superabrasive face 1120 of superabrasive table 1114. Second electrode 1143 may comprise a substantially annular or ring-shaped body with an inner diameter that is greater than an outer diameter of element side surface 1115 of superabrasive element 1110. Second electrode 1143 of electrode assembly 1140 may be disposed in a position such that at least a portion of second electrode 1143 surrounds at least a portion of superabrasive table 1114 of superabrasive element 1110, as shown in FIG. 21. When superabrasive element 1110 and electrode assembly 1140 are disposed in the processing solution such that at least a portion of superabrasive table 1114, first electrode 1141, and second electrode 1143 are exposed to the processing solution and a voltage is applied to the processing solution via electrode assembly 1140 and superabrasive table 1114, interstitial materials may be removed from at least a portion of superabrasive table 1114 of superabrasive element 1110 exposed to the processing solution. In some embodiments, interstitial materials may be removed to greater depths from surface portions of superabrasive table 1114 disposed in relatively closer proximity to first electrode 1141 and/or second electrode 1143 of electrode assembly 1140 than other surface portions of superabrasive table 1114.

Figure 22:
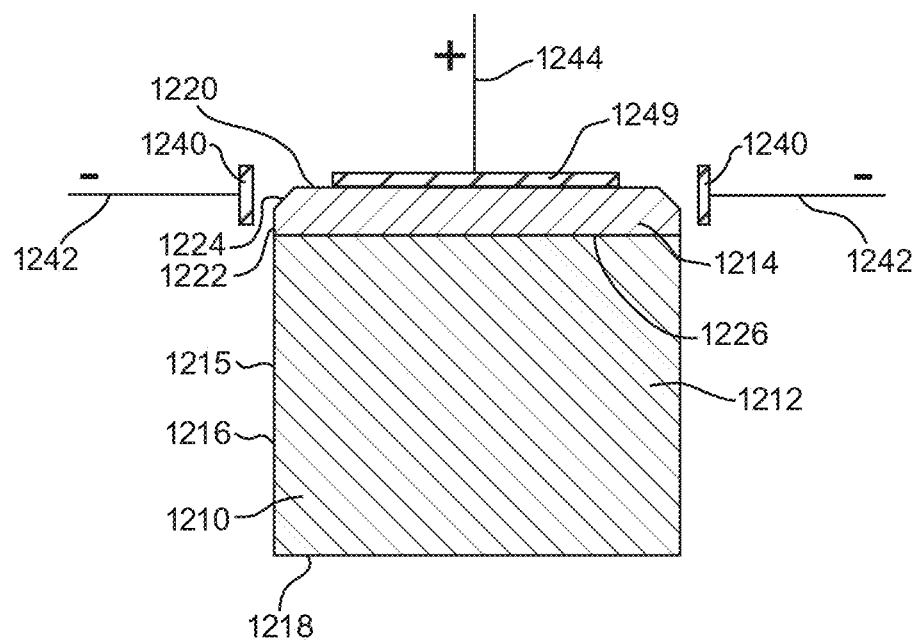
FIG. 22 is a cross-sectional side view of an exemplary superabrasive element and exemplary electrodes according to at least one embodiment.

FIG. 22 shows a cross-sectional side view of an exemplary superabrasive element 1210 and exemplary electrodes 1240 and 1249 according to at least one embodiment. As illustrated in FIG. 22, superabrasive element 1210 may comprise a superabrasive table 1214 affixed to or formed upon a substrate 1212. Superabrasive table 1214 may be affixed to substrate 1212 at interface 1226. Superabrasive element 1210 may comprise a rear surface 1218, a superabrasive face 1220, and an element side surface 1215, which may include a substrate side surface 1216 formed by substrate 1212 and a superabrasive side surface 1222 formed by superabrasive table 1214. Superabrasive element 1210 may also comprise a chamfer 1224 formed by superabrasive table 1214.

As shown in FIG. 22, electrode 1249 may be disposed adjacent to at least portion of superabrasive table 1214. For example, electrode 1249 may be electrically connected to (e.g., positioned abutting) superabrasive face 1220 and/or any other suitable surface of superabrasive table 1214. According to various embodiments, a charge may be applied to electrode 1240 and electrode 1249, and likewise to superabrasive table 1214, through electrical conductors (e.g., wires or any suitable electrical conductor) 1242 and 1244, respectively. For example, in order to apply a current to a processing solution (e.g., processing solution 72 illustrated in FIG. 9C) for processing superabrasive element 1210, superabrasive element 1210 and electrode 1249 may be positioned in the processing solution (e.g., optionally, with a leaching cup 30 or other protective covering) and a charge may be applied to at least a portion of superabrasive table 1214 through electrical conductor 1244 and electrode 1249, and an opposite charge may be applied to electrode 1240 through electrical conductor 1242.

According to at least one embodiment, electrode 1249 may comprise a disk-shaped electrode. In some embodiments, superabrasive table 1214 may be coupled to electrode 1249 through brazing, welding, soldering, adhesive bonding, mechanical fastening, and/or any other suitable bonding technique. For example, superabrasive table 1214 may be bonded to electrode 1249 by a braze joint (e.g., a carbide forming braze such as a titanium-based braze, etc.). In at least one embodiment, such a braze joint may be coated with a protective layer (e.g., paint layer, epoxy layer, etc.).

At least a portion of electrode 1240 may be annular or ring-shaped and electrical conductor 1242 may be electrically connected to electrode 1240 at one or more locations. For example, electrode 1240 may comprise sections or portions of an annular or ring-shaped body, and electrical conductor 1242 may be electrically connected to each section. Electrode 1240 may be disposed in a position such that at least a portion of electrode 1240 surrounds at least a portion of superabrasive table 1214 of superabrasive element 1210, as shown in FIG. 22. When superabrasive element 1210 and electrode 1240 are disposed in the processing solution such that at least a portion of superabrasive table 1214 and electrode 1240 are exposed to the processing solution and a voltage is applied to the processing solution via electrode 1240, electrode 1249, and/or superabrasive table 1214, interstitial materials may be removed from at least a portion of superabrasive table 1214 exposed to the processing solution. In some embodiments, interstitial materials may be removed to greater depths from surface portions of superabrasive table 1214 disposed in relatively closer proximity to electrode 1240 than other surface portions of superabrasive table 1214.

Figure 23A:
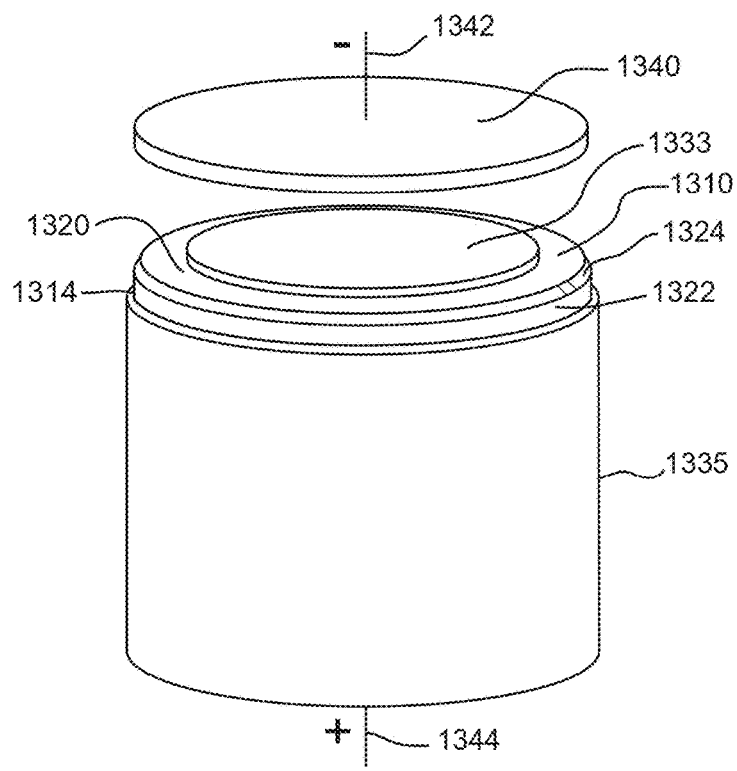
FIG. 23A is a perspective view of an exemplary superabrasive element coated with a masking layer and disposed near an exemplary electrode according to at least one embodiment.
Figure 23B:
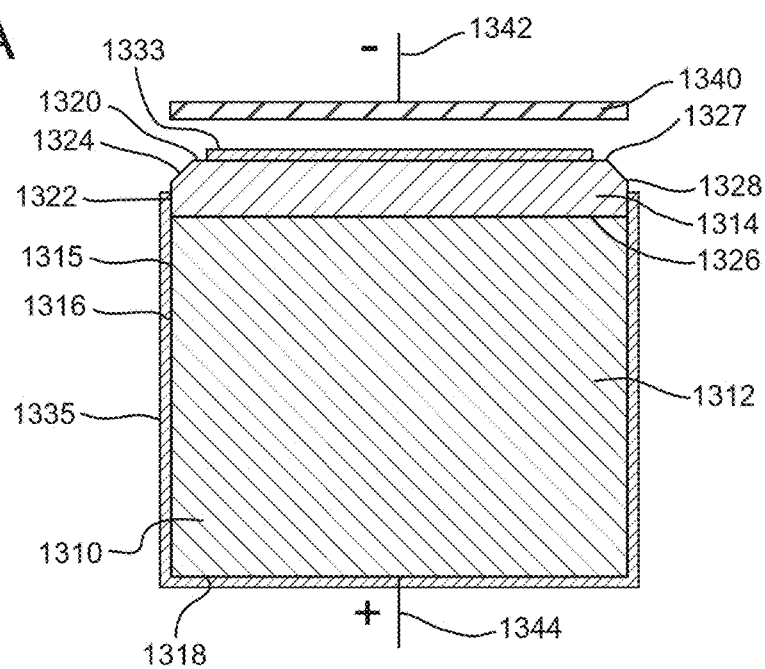
FIG. 23B is a cross-sectional side view of an exemplary superabrasive element coated with a masking layer and disposed near an exemplary electrode according to at least one embodiment.

FIGS. 23A and 23B show an exemplary superabrasive element 1310 coated with masking layers and disposed near an exemplary electrode 1340. According to various embodiments, portions of superabrasive element 1310 may be coated or otherwise covered with one or more masking layers that prevent and/or delay a leaching agent from contacting selected regions of superabrasive element 1310 during leaching. For example, a first masking layer 1333 and a second masking layer 1335 may be formed on or disposed abutting at least a portion of superabrasive element 1310.

As illustrated in FIGS. 23A and 23B, superabrasive element 1310 may comprise a superabrasive table 1314 affixed to or formed upon a substrate 1312. Superabrasive table 1314 may be affixed to substrate 1312 at interface 1326. Superabrasive element 1310 may comprise a rear surface 1318, a superabrasive face 1320, and an element side surface 1315, which may include a substrate side surface 1316 formed by substrate 1312 and a superabrasive side surface 1322 formed by superabrasive table 1314. Superabrasive element 1310 may also comprise a chamfer 1324 formed by superabrasive table 1314.

As shown in FIGS. 23A and 23B, first masking layer 1333 may be disposed on at least a portion of superabrasive face 1320, such as a central portion of superabrasive face 1320 surrounding a central axis (e.g., central axis 29 shown in FIGS. 1-2). Second masking layer 1335 may be disposed on at least a portion of element side surface 1315 and rear surface 1318 of superabrasive element 1310 so as to surround at least a portion of superabrasive table 1314 and/or substrate 1312. First masking layer 1333 and second masking layer 1335 may prevent damage to selected portions of superabrasive element 1310 and may provide a desired leach profile when superabrasive element 1310 is exposed to various leaching agents. For example, first masking layer 1333 and/or second masking layer 1335 may prevent or delay a leaching solution from contacting certain portions of superabrasive element 1310, such as portions of substrate 1312, portions of superabrasive table 1314, or both, during leaching.

In various examples, first masking layer 1333 and/or second masking layer 1335 may comprise one or more materials that are substantially inert and/or otherwise resistant and/or impermeable to acids, bases, and/or other reactive compounds present in a leaching solution used to leach superabrasive element 1310. Optionally, first masking layer 1333 and/or second masking layer 1335 may comprise a material that breaks down or degrades in the presence of a leaching agent, such as a material that is at least partially degraded (e.g., at least partially dissolved) at a selected rate during exposure to the leaching agent.

In some embodiments, first masking layer 1333 and/or second masking layer 1335 may comprise one or more materials exhibiting significant stability during exposure to a leaching agent. According to various embodiments, first masking layer 1333 and second masking layer 1335 may comprise any suitable material, including metals, alloys, polymers, carbon allotropes, oxides, carbides, glass materials, ceramics, composites, membrane materials (e.g. permeable or semi-permeable materials), and/or any combination of the foregoing, without limitation. First masking layer 1333 and second masking layer 1335 may be affixed to superabrasive element 1310 through any suitable mechanism, without limitation, including, for example, direct bonding, bonding via an intermediate layer, such as an adhesive or braze joint, mechanical attachment, such as mechanical fastening, frictional attachment, and/or interference fitting. In some embodiments, first masking layer 1333 and/or second masking layer 1335 may comprise a coating or layer of material that is formed on or otherwise adhered to at least a portion of superabrasive element 1310. In additional embodiments, first masking layer 1333 and/or second masking layer 1335 may comprise a material that is temporarily fixed to superabrasive element 1310. For example, first masking layer 1333 may comprise a polymer member (e.g., o-ring, gasket, disk) that is mechanically held in place (e.g., by clamping) during exposure to a leaching agent.

First masking layer 1333 and second masking layer 1335 may be formed over any suitable portions superabrasive element 1310. For example, as illustrated in FIGS. 23A and 23B, first masking layer 1333 may be formed over a central portion of superabrasive face 1320 about a central axis (e.g., central axis 29 shown in FIGS. 1-2). First masking layer 1333 may be separated from chamfer 1324. For example, first masking layer 1333 may not be directly adjacent to and/or in contact with edge 1327 formed at the intersection of superabrasive face 1320 and chamfer 1324. Second masking layer 1333 may be formed over at least a portion of substrate 1312 and superabrasive table 1314. For example, as shown in FIGS. 23A and 23B, second masking layer 1335 may be formed over rear surface 1318 and substrate side surface 1316 of substrate 1312 so as to substantially surround substrate 1312. Optionally, second masking layer 1335 may be formed over a portion of superabrasive side surface 1322. In some embodiments, second masking layer 1335 may also be separated from chamfer 1324. For example, second masking layer 1335 may not be directly adjacent to and/or in contact with edge 1328 formed at the intersection of superabrasive side surface 1322 and chamfer 1324.

According to various embodiments, a charge may be applied to superabrasive element 1310 and electrode 1340 through electrical conductors (e.g., wires or any suitable electrical conductor) 1344 and 1342, respectively. For example, in order to apply a current to a processing solution (e.g., processing solution 72 illustrated in FIG. 9C) for processing superabrasive element 1310, superabrasive element 1310 and electrical conductor 1344 may be positioned in the processing solution (e.g., optionally, with a leaching cup 30 or other protective covering) and a charge may be applied to at least a portion of substrate 1312 (e.g., rear surface 1318) of superabrasive element 1310 through electrical conductor 1344 and an opposite charge may be applied to electrode 1340 through electrical conductor 1342. In at least one embodiment, electrical conductor 1344 may be electrically connected to substrate 1312 by an electrode electrically connected to (e.g., positioned abutting) substrate 1312. In some embodiments, electrical conductor 1344 may be directly connected to superabrasive table 1314 by an electrode electrically connected to (e.g., positioned abutting) superabrasive table 1314.

Electrode 1340 may comprise any suitable size, shape, and/or geometry, without limitation. In some embodiments, electrode 1340 may comprise a circular or non-circular disk shape. For example, electrode 1340 may have a substantially circular outer periphery surrounding a central axis (e.g., central axis 29 shown in FIGS. 1-2). Electrode 1340 may have an outer diameter that is larger than, the same as, or smaller than the outer diameter of element side surface 1315 of superabrasive element 1310, as shown in FIGS. 23A and 23B. Electrodes and/or combinations of electrodes according to any of the configurations disclosed herein may also be utilized in addition to or in place of electrode 1340 for processing superabrasive element 1310. When superabrasive element 1310 and electrode 1340 are disposed in the processing solution (e.g., processing solution 72 as shown in FIG. 9C) such that at least a portion of superabrasive table 1314 and electrode 1340 are exposed to the processing solution and a voltage is applied to the processing solution via electrode 1340 and superabrasive table 1314, interstitial materials may be removed from at least a portion of superabrasive table 1314 of superabrasive element 1310 exposed to the processing solution and disposed near electrode 1340.

The configuration illustrated in FIGS. 23A and 23B may enable selective leaching of portions of superabrasive element 1310 to form a desired leach profile within superabrasive table 1314. For example, a volume of superabrasive table 1314 adjacent to an uncovered region between first masking layer 1333 and second masking layer 1335 may be leached to a greater depth than surrounding portions of superabrasive table 1314 covered by first masking layer 1333 and second masking layer 1335. The configurations illustrated in FIGS. 23A and 23B may result in the formation of leached volumes in portions of superabrasive table 1314 located near chamfer 1324 during leaching. In some embodiments, the leached volumes may extend from chamfer 1324 to a region adjacent to and/or abutting interface 1326.

Following exposure to a leaching solution, first masking layer 1333 and/or second masking layer 1335 may be substantially removed from superabrasive table 1314 and/or substrate 1312 using any suitable technique, including, for example, lapping, grinding, and/or removal using suitable chemical agents. According to certain embodiments, first masking layer 1333 and/or second masking layer 1335 may be peeled, cut, ground, lapped, and/or otherwise physically, thermally, or chemically removed from superabrasive element 1310. In some embodiments, following or during removal of first masking layer 1333 and/or second masking layer 1335, one or more surfaces of superabrasive table 1314 and/or substrate 1312 may be processed to form a desired surface texture and/or finish using any suitable technique, including, for example, lapping, grinding, and/or otherwise physically and/or chemically treating the one or more surfaces.

Figure 24:
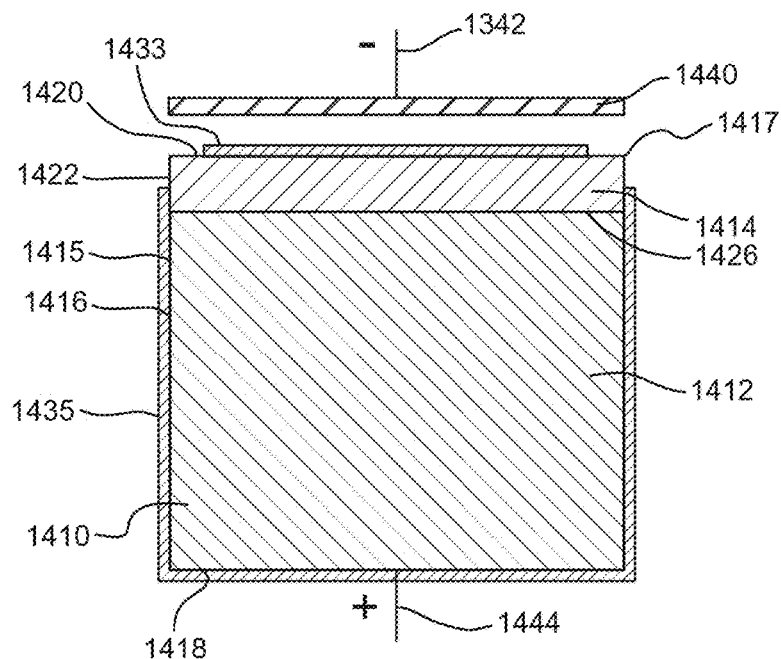
FIG. 24 is a cross-sectional side view of an exemplary superabrasive element coated with a masking layer and disposed near an exemplary electrode according to at least one embodiment.
Figure 25:
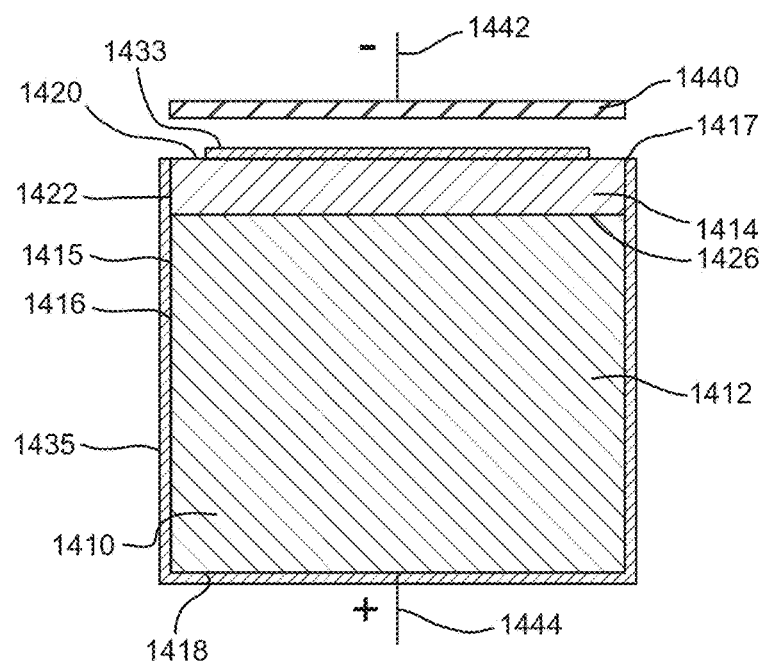
FIG. 25 is a cross-sectional side view of an exemplary superabrasive element coated with a masking layer and disposed near an exemplary electrode according to at least one embodiment.

FIGS. 24 and 25 illustrate masking layers formed over portions of a superabrasive element 1410 having an edge 1417 formed at the intersection of superabrasive face 1420 and superabrasive side surface 1422. As illustrated, for example, in FIG. 24, first masking layer 1433 may be formed over a central portion of superabrasive face 1420 about a central axis (e.g., central axis 29 shown in FIGS. 1-2). First masking layer 1433 may not be directly adjacent to and/or in contact with edge 1417. In additional embodiments, first masking layer 1433 may be formed adjacent to and/or in contact with edge 1417. Second masking layer 1435 may be formed over at least a portion of substrate 1412 and superabrasive table 1414. For example, as shown in FIG. 24, second masking layer 1435 may be formed over rear surface 1418 and substrate side surface 1416 of substrate 1412 so as to substantially surround substrate 1412. Optionally, second masking layer 1435 may be formed over a portion of superabrasive side surface 1422. In some embodiments, second masking layer 1435 may not be directly adjacent to and/or in contact with edge 1417, as shown in FIG. 24.

According to various embodiments, a charge may be applied to superabrasive element 1410 and electrode 1440 through electrical conductors (e.g., wires or any suitable electrical conductor) 1444 and 1442, respectively. For example, in order to apply a current to a processing solution (e.g., processing solution 72 illustrated in FIG. 9C) for processing superabrasive element 1410, superabrasive element 1410 and electrical conductor 1444 may be positioned in the processing solution (e.g., optionally, with a leaching cup 30 or other protective covering) and a charge may be applied to at least a portion of substrate 1412 (e.g., rear surface 1418) of superabrasive element 1410 through electrical conductor 1444 and an opposite charge may be applied to electrode 1440 through electrical conductor 1442. In at least one embodiment, electrical conductor 1444 may be electrically connected to substrate 1412 by an electrode electrically connected to (e.g., positioned abutting) substrate 1412. In some embodiments, electrical conductor 1444 may be directly connected to superabrasive table 1414 by an electrode electrically connected to (e.g., positioned abutting) superabrasive table 1414.

Electrode 1440 may comprise any suitable size, shape, and/or geometry, without limitation. In some embodiments, electrode 1440 may comprise a circular or non-circular disk shape. For example, electrode 1440 may have a substantially circular outer periphery surrounding a central axis (e.g., central axis 29 shown in FIGS. 1-2). Electrode 1440 may have an outer diameter that is larger than, the same as, or smaller than the outer diameter of element side surface 1415 of superabrasive element 1410, as shown in FIG. 24. Electrodes according to any of the configurations disclosed herein may also be utilized in addition to or in place of electrode 1440 for processing superabrasive element 1410. When superabrasive element 1410 and electrode 1440 are disposed in the processing solution such that at least a portion of superabrasive table 1414 and electrode 1440 are exposed to the processing solution and a voltage is applied to the processing solution via electrode 1440 and superabrasive table 1414, interstitial materials may be removed from at least a portion of superabrasive table 1414 of superabrasive element 1410 exposed to the processing solution and disposed near electrode 1440.

FIG. 25 illustrates masking layers formed over portions of a superabrasive element 1410 having an edge 1417 formed at the intersection of superabrasive face 1420 and superabrasive side surface 1422. As illustrated, for example, in FIG. 25, first masking layer 1433 may be formed over a central portion of superabrasive face 1420 about a central axis (e.g., central axis 29 shown in FIGS. 1-2). First masking layer 1433 may not be directly adjacent to and/or in contact with edge 1417. In additional embodiments, first masking layer 1433 may be formed adjacent to and/or in contact with edge 1417. Second masking layer 1435 may be formed over at least a portion of substrate 1412 and superabrasive table 1414. For example, as shown in FIG. 25, second masking layer 1435 may be formed over rear surface 1418 and substrate side surface 1416 of substrate 1412 so as to substantially surround substrate 1412. Optionally, second masking layer 1435 may be formed over a portion of superabrasive side surface 1422. In some embodiments, second masking layer 1435 may be disposed adjacent to and/or in contact with edge 1417, as shown in FIG. 25.

According to various embodiments, a charge may be applied to superabrasive element 1410 and electrode 1440 through electrical conductors (e.g., wires or any suitable electrical conductor) 1444 and 1442, respectively. For example, in order to apply a current to a processing solution (e.g., processing solution 72 illustrated in FIG. 9C) for processing superabrasive element 1410, superabrasive element 1410 and electrical conductor 1444 may be positioned in the processing solution (e.g., optionally, with a leaching cup 30 or other protective covering) and a charge may be applied to at least a portion of substrate 1412 (e.g., rear surface 1418) of superabrasive element 1410 through electrical conductor 1444 and an opposite charge may be applied to electrode 1440 through electrical conductor 1442. In at least one embodiment, electrical conductor 1444 may be electrically connected to substrate 1412 by an electrode electrically connected to (e.g., positioned abutting) substrate 1412. In some embodiments, electrical conductor 1444 may be directly connected to superabrasive table 1414 by an electrode electrically connected to (e.g., positioned abutting) superabrasive table 1414.

Electrode 1440 may comprise any suitable size, shape, and/or geometry, without limitation. In some embodiments, electrode 1440 may comprise a circular or non-circular disk shape. For example, electrode 1440 may have a substantially circular outer periphery surrounding a central axis (e.g., central axis 29 shown in FIGS. 1-2). Electrode 1440 may have an outer diameter that is larger than, the same as, or smaller than the outer diameter of element side surface 1415 of superabrasive element 1410, as shown in FIG. 25. When superabrasive element 1410 and electrode 1440 are disposed in the processing solution such that at least a portion of superabrasive table 1414 and electrode 1440 are exposed to the processing solution and a voltage is applied to the processing solution via electrode 1440 and superabrasive table 1414, interstitial materials may be removed from at least a portion of superabrasive table 1414 of superabrasive element 1410 exposed to the processing solution and disposed near electrode 1440.

Figure 26:
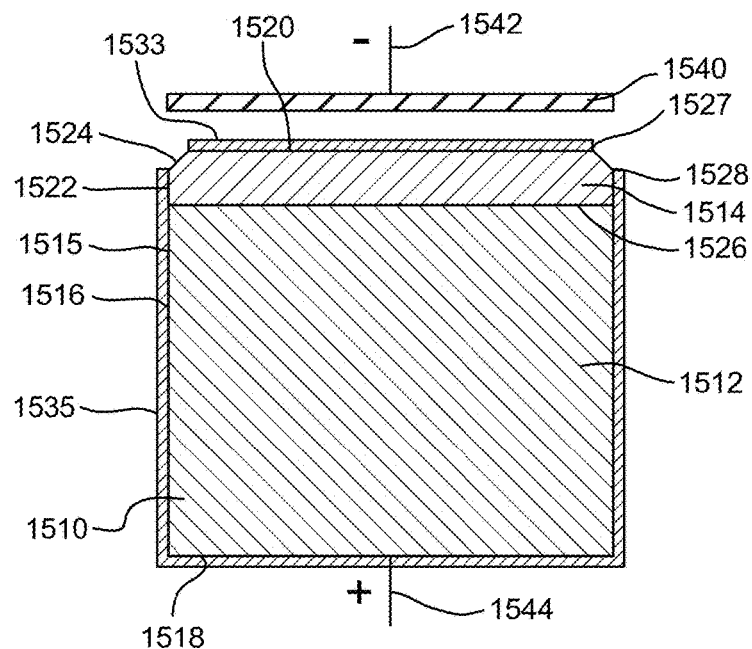
FIG. 26 is a cross-sectional side view of an exemplary superabrasive element coated with a masking layer and disposed near an exemplary electrode according to at least one embodiment.

FIG. 26 shows an exemplary superabrasive element 1510 coated with masking layers and disposed near an exemplary electrode 1540. According to various embodiments, portions of superabrasive element 1510 may be coated or otherwise covered with one or more masking layers that prevent and/or delay a leaching agent from contacting selected regions of superabrasive element 1510 during leaching. For example, a first masking layer 1533 and, optionally, a second masking layer 1535 may be formed on or disposed abutting at least a portion of superabrasive element 1510.

Superabrasive element 1510 may comprise a superabrasive table 1514 affixed to or formed upon a substrate 1512. Superabrasive table 1514 may be affixed to substrate 1512 at interface 1526. Superabrasive element 1510 may comprise a rear surface 1518, a superabrasive face 1520, and an element side surface 1515, which may include a substrate side surface 1516 formed by substrate 1512 and a superabrasive side surface 1522 formed by superabrasive table 1514. Superabrasive element 1510 may also comprise a chamfer 1524 formed by superabrasive table 1514.

According to some embodiments, first masking layer 1533 and/or second masking layer 1535 may be disposed adjacent to and/or in contact with at least a portion of chamfer 1524. For example, as illustrated in FIG. 26, first masking layer 1533 may substantially cover superabrasive face 1520 such that first masking layer 1533 is formed adjacent to edge 1527 of superabrasive table 1514. Optionally, second masking layer 1535 may substantially cover superabrasive side surface 1522 such that second masking layer 1535 is formed adjacent to edge 1528 of superabrasive table 1514. In some embodiments, first masking layer 1533 and/or second masking layer 1535 may be formed over at least a portion chamfer 1524.

According to various embodiments, a charge may be applied to superabrasive element 1510 and electrode 1540 through electrical conductors (e.g., wires or any suitable electrical conductor) 1544 and 1542, respectively. For example, in order to apply a current to a processing solution (e.g., processing solution 72 illustrated in FIG. 9C) for processing superabrasive element 1510, superabrasive element 1510 and electrical conductor 1544 may be positioned in the processing solution (e.g., optionally, with a leaching cup 30 or other protective covering) and a charge may be applied to at least a portion of substrate 1512 (e.g., rear surface 1518) of superabrasive element 1510 through electrical conductor 1544 and an opposite charge may be applied to electrode 1540 through electrical conductor 1542. In at least one embodiment, electrical conductor 1544 may be electrically connected to substrate 1512 by an electrode electrically connected to (e.g., positioned abutting) substrate 1512. In some embodiments, electrical conductor 1544 may be directly connected to superabrasive table 1514 by an electrode electrically connected to (e.g., positioned abutting) superabrasive table 1514.

Figure 27:
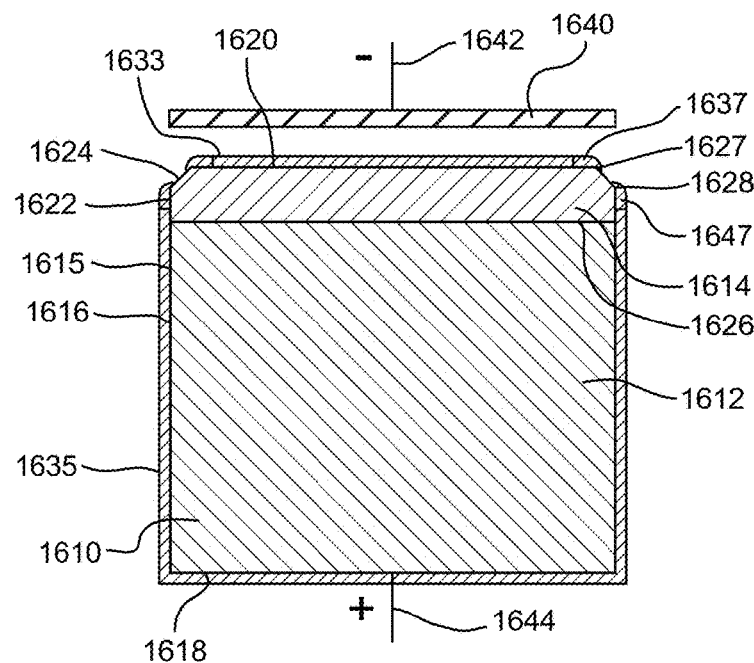
FIG. 27 is a cross-sectional side view of an exemplary superabrasive element coated with a masking layer and disposed near an exemplary electrode according to at least one embodiment.

Electrode 1540 may comprise any suitable size, shape, and/or geometry, without limitation. In some embodiments, electrode 1540 may comprise a circular or non-circular disk shape. For example, electrode 1540 may have a substantially circular outer periphery surrounding a central axis (e.g., central axis 29 shown in FIGS. 1-2). Electrode 1540 may have an outer diameter that is larger than, the same as, or smaller than the outer diameter of element side surface 1515 of superabrasive element 1510, as shown in FIG. 27. When superabrasive element 1510 and electrode 1540 are disposed in the processing solution such that at least a portion of superabrasive table 1514 and electrode 1540 are exposed to the processing solution and a voltage is applied to the processing solution via electrode 1540 and superabrasive table 1514, interstitial materials may be removed from at least a portion of superabrasive table 1514 of superabrasive element 1510 exposed to the processing solution and disposed near electrode 1540. Accordingly, a peripheral region of superabrasive table 1514 defining chamfer 1524 may be leached to a greater depth than a central region of superabrasive table 1514.

FIG. 27 is a cross-sectional side view of an exemplary superabrasive element 1610 coated with masking layers according to at least one embodiment. As shown in FIG. 27, superabrasive element 1610 may be coated with various masking layers that prevent and/or delay a leaching agent from contacting selected regions of superabrasive element 1610 during leaching. According to some embodiments, a first protective masking layer 1633 and a second protective masking layer 1635 may be formed on at least a portion of superabrasive element 1610. Optionally, a first at-least-partially-degrading masking layer 1637 and a second at-least-partially-degrading masking layer 1647 may be formed on at least a portion of superabrasive element 1610.

As illustrated in FIG. 27, superabrasive element 1610 may comprise a superabrasive table 1614 affixed to or formed upon a substrate 1612. Superabrasive table 1614 may be affixed to substrate 1612 at interface 1626. Superabrasive element 1610 may comprise a rear surface 1618, a superabrasive face 1620, and an element side surface 1615, which may include a substrate side surface 1616 formed by substrate 1612 and a superabrasive side surface 1622 formed by superabrasive table 1614. Superabrasive element 1610 may also comprise a chamfer 1624 formed by superabrasive table 1614.

As shown in FIG. 27, first protective masking layer 1633 may be formed on at least a portion of superabrasive face 1620, such as a central portion of superabrasive face 1620 surrounding a central axis (e.g., central axis 29 shown in FIGS. 1-2). Second protective masking layer 1635 may be formed on at least a portion of element side surface 1615 and rear surface 1618 of superabrasive element 1610 so as to surround at least a portion of superabrasive table 1614 and/or substrate 1612. First protective masking layer 1633 and second protective masking layer 1635 may prevent damage to selected portions of superabrasive element 10 and may provide a desired leach profile when superabrasive element 1610 is exposed to various reactive agents. For example, first protective masking layer 1633 and/or second protective masking layer 1635 may prevent or delay a leaching solution from contacting certain portions of superabrasive element 1610, such as portions of substrate 1612, portions of superabrasive table 1614, or both, during leaching. In various examples, first protective masking layer 1633 and/or second protective masking layer 1635 may comprise one or more materials that are substantially inert and/or otherwise resistant and/or impermeable to acids, bases, and/or other reactive compounds present in a leaching solution used to leach superabrasive element 1610.

First at-least-partially-degrading masking layer 1637 may be formed on at least a portion of superabrasive element 1610 adjacent to first protective masking layer 1633. For example, first at-least-partially-degrading masking layer 1637 may be formed on portions of superabrasive face 1620 and/or chamfer 1624. Second at-least-partially-degrading masking layer 1647 may be formed on at least a portion of superabrasive element 1610 adjacent to second protective masking layer 1635. For example, second at-least-partially-degrading masking layer 1647 may be formed on portions of superabrasive side surface 1622 and/or chamfer 1624. As shown in FIG. 27, first at-least-partially-degrading masking layer 1637 may be separated from second at-least-partially-degrading masking layer 1647. For example, a space between first at-least-partially-degrading masking layer 1637 and second at-least-partially-degrading masking layer 1647 may be formed over at least a portion of superabrasive table 1614, such as, for example, at least a portion of chamfer 1624. Optionally, a space between first at-least-partially-degrading masking layer 1637 and second at-least-partially-degrading masking layer 1647 may also be formed over a portion of superabrasive face 1620 and/or superabrasive side surface 1622.

According to at least one embodiment, first at-least-partially-degrading masking layer 1637 and/or second at-least-partially-degrading masking layer 1647 may comprise a material that breaks down in the presence of a leaching agent. First at-least-partially-degrading masking layer 1637 and/or second at-least-partially-degrading masking layer 1647 may comprise, for example, a polymeric material that breaks down at a desired rate during exposure to the leaching agent. As first at-least-partially-degrading masking layer 1637 and second at-least-partially-degrading masking layer 1647 disintegrate during leaching, portions of superabrasive element 1610 that were covered by first at-least-partially-degrading masking layer 1637 and second at-least-partially-degrading masking layer 1647 may become exposed to the leaching agent. According to additional embodiments, first at-least-partially-degrading masking layer 1637 and/or second at-least-partially-degrading masking layer 1647 may comprise a material that is more permeable to a leaching agent than first protective masking layer 1633 and/or second protective masking layer 1635. In at least one embodiment, first at-least-partially-degrading masking layer 1637 and/or second at-least-partially-degrading masking layer 1647 may be not substantially degrade when exposed to a leaching agent but may be semi-permeable or permeable to the leaching agent.

First protective masking layer 1633, second protective masking layer 1635, first at-least-partially-degrading masking layer 1637, and second at-least-partially-degrading masking layer 1647 may each comprise any suitable material, including metals, alloys, polymers, carbon allotropes, oxides, carbides, glass materials, ceramics, composites, membrane materials (e.g. permeable or semi-permeable materials), and/or any combination of the foregoing, without limitation. Further, first protective masking layer 1633, second protective masking layer 1635, first at-least-partially-degrading masking layer 1637, and second at-least-partially-degrading masking layer 1647 may be affixed to superabrasive element 1610 through any suitable mechanism, without limitation, including, for example, direct bonding, bonding via an intermediate layer, such as an adhesive or braze joint, mechanical attachment, such as mechanical fastening, frictional attachment, and/or interference fitting.

The configuration illustrated in FIG. 27 may enable selective leaching of portions of superabrasive element 1610 to form a desired leach profile within superabrasive table 1614. For example, a volume of superabrasive table 1614 adjacent to an uncovered region between first at-least-partially-degrading masking layer 1637 and second at-least-partially-degrading masking layer 1647 may be leached to a greater depth than surrounding portions of superabrasive table 1614. As first at-least-partially-degrading masking layer 1637 and second at-least-partially-degrading masking layer 1647 are degraded during leaching, portions of superabrasive table 1614 that were covered by first at-least-partially-degrading masking layer 1637 and second at-least-partially-degrading masking layer 1647 may subsequently be exposed to the leaching agent. Accordingly, volumes of superabrasive table 1614 adjacent to the regions previously covered by first at-least-partially-degrading masking layer 1637 and second at-least-partially-degrading masking layer 1647 may be exposed to the leaching agent upon degradation of first at-least-partially-degrading masking layer 1637 and second at-least-partially-degrading masking layer 1647.

Accordingly, the regions of superabrasive table 1614 that were originally adjacent to first at-least-partially-degrading masking layer 1637 and second at-least-partially-degrading masking layer 1647 may have a shallower leach depth than regions of superabrasive table 1614 that were adjacent to the uncovered region between first at-least-partially-degrading masking layer 1637 and second at-least-partially-degrading masking layer 1647. For example, the configuration illustrated in FIG. 27 may result in a leach profile having a maximum leach depth in the volume of superabrasive table 1614 adjacent to a central portion of chamfer 1624.

According to various embodiments, a charge may be applied to superabrasive element 1610 and electrode 1640 through electrical conductors (e.g., wires or any suitable electrical conductor) 1644 and 1642, respectively. For example, in order to apply a current to a processing solution (e.g., processing solution 72 illustrated in FIG. 9C) for processing superabrasive element 1610, superabrasive element 1610 and electrical conductor 1644 may be positioned in the processing solution (e.g., optionally, with a leaching cup 30 or other protective covering) and a charge may be applied to at least a portion of substrate 1612 (e.g., rear surface 1618) of superabrasive element 1610 through electrical conductor 1644 and an opposite charge may be applied to electrode 1640 through electrical conductor 1642. In at least one embodiment, electrical conductor 1644 may be electrically connected to substrate 1612 by an electrode electrically connected to (e.g., positioned abutting) substrate 1612. In some embodiments, electrical conductor 1644 may be directly connected to superabrasive table 1614 by an electrode electrically connected to (e.g., positioned abutting) superabrasive table 1614.

Electrode 1640 may comprise any suitable size, shape, and/or geometry, without limitation. In some embodiments, electrode 1640 may comprise a circular or non-circular disk shape. For example, electrode 1640 may have a substantially circular outer periphery surrounding a central axis (e.g., central axis 29 shown in FIGS. 1-2). Electrode 1640 may have an outer diameter that is larger than, the same as, or smaller than the outer diameter of element side surface 1615 of superabrasive element 1610, as shown in FIG. 27. When superabrasive element 1610 and electrode 1640 are disposed in the processing solution such that at least a portion of superabrasive table 1614 and electrode 1640 are exposed to the processing solution and a voltage is applied to the processing solution via electrode 1640 and superabrasive table 1614, interstitial materials may be removed from at least a portion of superabrasive table 1614 of superabrasive element 1610 exposed to the processing solution and disposed near electrode 1640. Accordingly, a peripheral region of superabrasive table 1614 defining chamfer 1624 may be leached to a greater depth than a central region of superabrasive table 1614.

Figure 28:
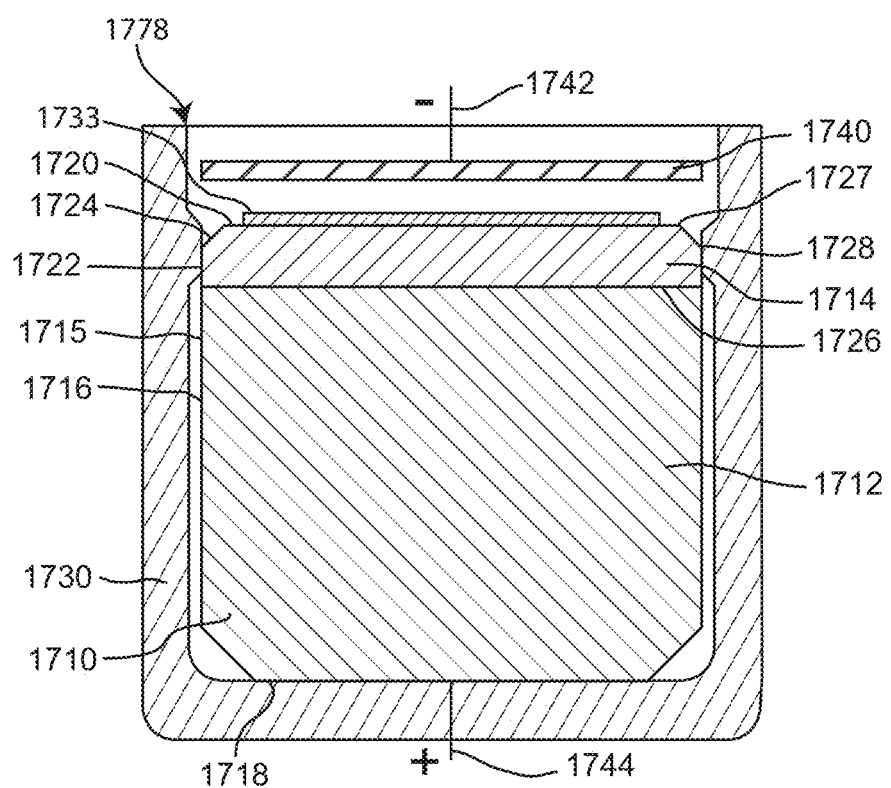
FIG. 28 is a cross-sectional side view of an exemplary superabrasive element coated with a masking layer, positioned within a protective leaching cup, and disposed near an exemplary electrode according to at least one embodiment.

FIG. 28 is a cross-sectional side view of an exemplary superabrasive element 1710 coated with a masking layer and positioned within a leaching cup 1730 according to at least one embodiment. As illustrated in FIG. 28, a masking layer 1733 may be formed on or disposed adjacent to at least a portion of superabrasive face 1720, such as a central portion of superabrasive face 1720 surrounding a central axis (e.g., central axis 29 shown in FIGS. 1-2). According to at least one embodiment, masking layer 1733 may comprise one or more materials that are substantially inert and/or otherwise resistant and/or impermeable to acids, bases, and/or other reactive compounds present in a leaching solution used to leach superabrasive element 1710.

As illustrated in FIG. 28, superabrasive element 1710 may comprise a superabrasive table 1714 affixed to or formed upon a substrate 1712. Superabrasive table 1714 may be affixed to substrate 1712 at interface 1726. Superabrasive element 1710 may comprise a rear surface 1718, a superabrasive face 1720, and an element side surface 1715, which may include a substrate side surface 1716 formed by substrate 1712 and a superabrasive side surface 1722 formed by superabrasive table 1714. Superabrasive element 1710 may also comprise a chamfer 1724 formed by superabrasive table 1714.

As shown in FIG. 28, superabrasive element 1710 may be positioned within protective leaching cup 1730 such that protective leaching cup 1730 surrounds at least a portion of superabrasive element 1710, including substrate 1712. When superabrasive element 1710 is positioned within protective leaching cup 1730, at least a portion of superabrasive element 1710, such as superabrasive table 1714 and/or substrate 1712, may be positioned adjacent to and/or contacting a portion of protective leaching cup 1730. For example, protective leaching cup 1730 may be configured to contact at least a portion of element side surface 1715 of superabrasive element 1710, forming a seal between protective leaching cup 1730 and superabrasive element 1710 that is partially or fully impermeable to various fluids, such as a leaching material (e.g., a leaching solution).

Protective leaching cup 1730 may be formed of any suitable material, without limitation. For example, protective leaching cup 1730 may comprise a flexible, elastic, malleable, and/or otherwise deformable material configured to surround and/or contact at least a portion of superabrasive element 1710. Protective leaching cup 1730 may prevent damage to superabrasive element 1710 when at least a portion of superabrasive element 1710 is exposed to various leaching agents. For example, protective leaching cup 1730 may prevent a leaching solution from chemically contacting and/or damaging certain portions of superabrasive element 1710, such as portions of substrate 1712, portions of superabrasive table 1714, or both, during leaching.

In various embodiments, protective leaching cup 1730 may comprise one or more materials that are substantially inert and/or otherwise resistant to acids, bases, and/or other reactive components present in a leaching solution used to leach superabrasive element 1710. In some embodiments, protective leaching cup 1730 may comprise one or more materials exhibiting significant stability at various temperatures and/or pressures. In some embodiments, protective leaching cup 1730 may include one or more polymeric materials, such as, for example, nylon, polytetrafluoroethylene (PTFE), polyethylene, polypropylene, rubber, silicone, and/or other polymers, and/or a combination of any of the foregoing, without limitation. For example, protective leaching cup 1730 may comprise PTFE blended with one or more other polymeric materials. Protective leaching cup 1730 may be formed using any suitable technique. For example, protective leaching cup 1730 may comprise a polymeric material that is shaped through a molding process (e.g., injection molding, blow molding, compression molding, drawing, etc.) and/or a machining process (e.g., grinding, lapping, milling, boring, etc.).

In at least one embodiment, protective leaching cup 1730 may comprise a material that is configured to conform to an exterior portion of superabrasive element 1710. For example, protective leaching cup 1730 may include a malleable and/or elastically deformable material that conforms to an exterior shape of a portion of superabrasive table 1714 abutting protective leaching cup 1730, such as superabrasive side surface 1722. According to some embodiments, protective leaching cup 1730 may comprise a material, such as a polymeric material (e.g., elastomer, rubber, plastic, etc.), that conforms to surface imperfections of superabrasive side surface 1722 and/or substrate side surface 1716. Heat and/or pressure may be applied to protective leaching cup 1730 to cause a portion of protective leaching cup 1730 abutting superabrasive side surface 1722 to more closely conform to superabrasive side surface 1722. Accordingly, a seal between superabrasive side surface 1722 and a portion of protective leaching cup 1730 abutting superabrasive side surface 1722 may be improved, thereby inhibiting passage of a leaching agent between superabrasive element 1710 and protective leaching cup 1730.

When superabrasive element 1710 is positioned within protective leaching cup 1730, at least a portion of superabrasive element 1710, such as superabrasive table 1714 and/or substrate 1712, may be positioned adjacent to and/or contacting a portion of protective leaching cup 1730. For example, at least a portion of a seal region of protective leaching cup 1730 may be configured to contact at least a portion of element side surface 1715 of superabrasive element 1710, forming a seal between protective leaching cup 1730 and superabrasive element 1710 that is partially or fully impermeable to various fluids, such as a leaching agent. As shown in FIG. 28, superabrasive element 1710 may be positioned within protective leaching cup 1730 so that at least a portion of the seal region of protective leaching cup 1730 contacts and forms a seal with at least a portion of element side surface 1715, such as at least a portion of superabrasive side surface 1722 and/or at least a portion of substrate side surface 1716.

According to various embodiments, a charge may be applied to superabrasive element 1710 and electrode 1740 through electrical conductors (e.g., wires or any suitable electrical conductor) 1744 and 1742, respectively. For example, in order to apply a current to a processing solution (e.g., processing solution 72 illustrated in FIG. 9C) for processing superabrasive element 1710, superabrasive element 1710 and electrical conductor 1744 may be positioned in the processing solution (e.g., optionally, with a leaching cup 30 or other protective covering) and a charge may be applied to at least a portion of substrate 1712 (e.g., rear surface 1718) of superabrasive element 1710 through electrical conductor 1744 and an opposite charge may be applied to electrode 1740 through electrical conductor 1742. In at least one embodiment, electrical conductor 1744 may be electrically connected to substrate 1712 by an electrode electrically connected to (e.g., positioned abutting) substrate 1712. In some embodiments, electrical conductor 1744 may be directly connected to superabrasive table 1714 by an electrode electrically connected to (e.g., positioned abutting) superabrasive table 1714.

Electrode 1740 may comprise any suitable size, shape, and/or geometry, without limitation. In some embodiments, electrode 1740 may comprise a circular or non-circular disk shape. For example, electrode 1740 may have a substantially circular outer periphery surrounding a central axis (e.g., central axis 29 shown in FIGS. 1-2). Superabrasive element 1710 may comprise any suitable size, shape, and/or geometry, without limitation. For example, superabrasive element 1710 may comprise a substantially cylindrical or non-cylindrical outer surface surrounding a central axis (e.g., central axis 29 shown in FIGS. 1-2) of superabrasive element 1710. Electrode 1740 may have an outer diameter that is larger than, the same as, or smaller than the outer diameter of element side surface 1715 of superabrasive element 1710, as shown in FIG. 28. When superabrasive element 1710 and electrode 1740 are disposed in the processing solution such that at least a portion of superabrasive table 1714 and electrode 1740 are exposed to the processing solution and a voltage is applied to the processing solution via electrode 1740 and superabrasive table 1714, interstitial materials may be removed from at least a portion of superabrasive table 1714 of superabrasive element 1710 exposed to the processing solution and disposed near electrode 1740.

The configuration illustrated in FIG. 28 may enable selective leaching of portions of superabrasive element 1710 to form a desired leach profile within superabrasive table 1714. For example, a volume of superabrasive table 1714 adjacent to an uncovered region between masking layer 1733 and the seal region of protective leaching cup 1730 may be leached to a greater depth than surrounding portions of superabrasive table 1714 covered by masking layer 1733 or the seal region. Leaching such a configuration may result in the formation of leached volumes in portions of superabrasive table 1714 located near chamfer 1724 during leaching.

Figure 29:
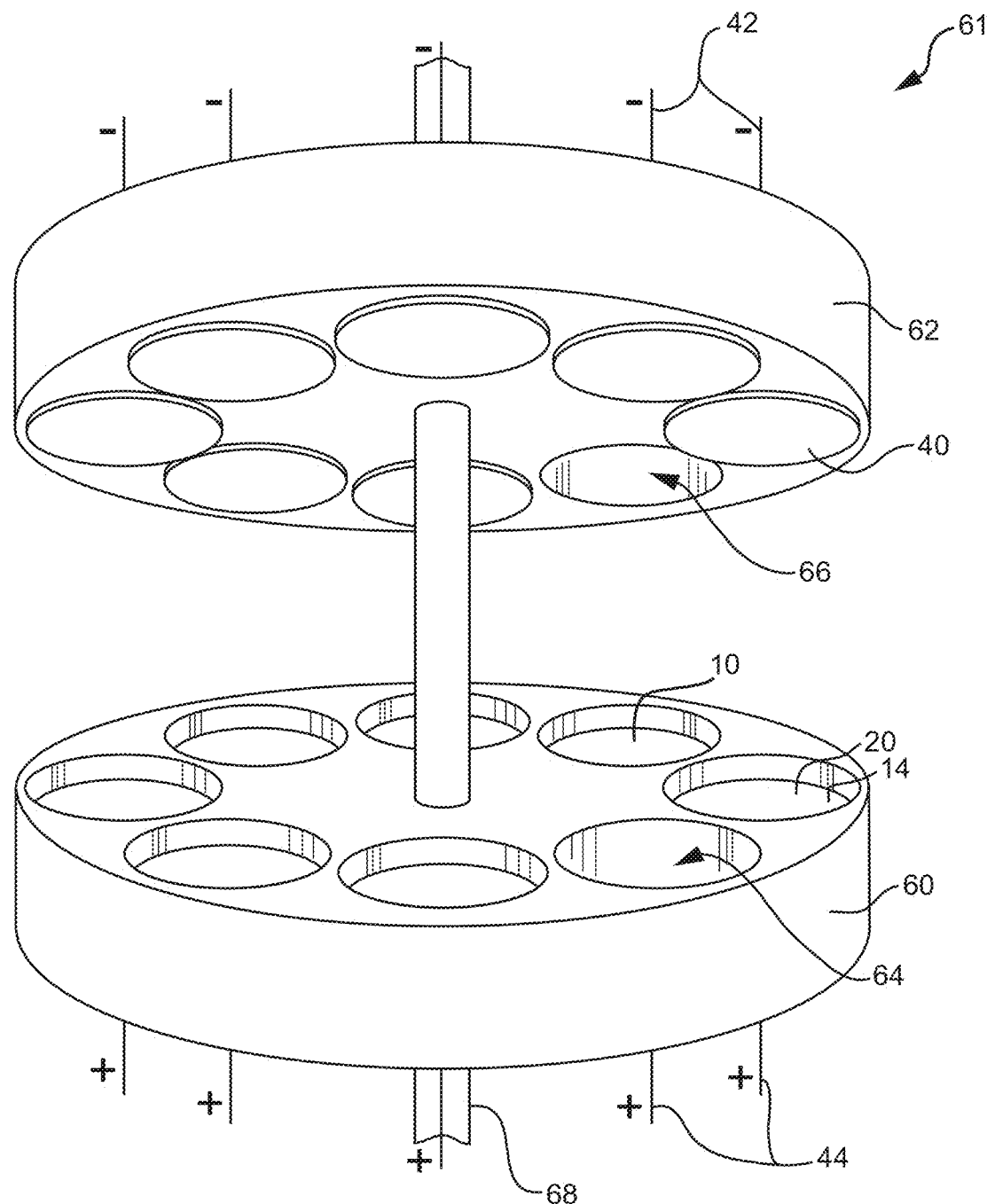
FIG. 29 is a perspective view of an exemplary leaching assembly according to at least one embodiment.

FIG. 29 is a perspective view of an exemplary leaching assembly 61 according to at least one embodiment. As illustrated in FIG. 29, leaching assembly 61 may comprise a lower tray 60 and an upper tray 62. Lower tray 60 and upper tray 62 may comprise any suitable shape, such as, for example, substantially disk-shaped bodies. According to various embodiments, lower tray 60 and upper tray 62 may be connected by a cylindrical shaft 68 supporting lower tray 60 and upper tray 62. At least one of lower tray 60 and upper tray 62 may be movable along shaft 68 such that lower tray 60 and upper tray 62 may be supported adjacent to or separated from each other as desired.

A plurality of holes 64 (not all labeled) may be defined in lower tray 60. In some embodiments, a plurality of holes 66 (not all labeled) may also be defined in upper tray 62. Holes 64 may each be configured to hold a superabrasive element 10. Holes 64 may be configured such that superabrasive elements 10 are recessed in holes 64. Holes 64 may extend partially or fully through lower tray 60. Holes 64 may extend through lower tray 60 such that electrical conductors 44 (not all labeled) may be electrically connected to superabrasive elements 10. Holes 66 defined in upper tray 62 may each be configured to hold an electrode 40 and/or electrical conductor connected to electrode 40. In some embodiments, holes 66 may be configured such that each electrode 40 (not all labeled) is disposed near, but not contacting, a respective superabrasive element 10 when lower tray 60 and upper tray 62 are positioned adjacent to each other. Holes 66 may be configured such that at least a portion of each electrode 40 protrudes from upper tray 62 toward lower tray 60. Holes 66 may extend through upper tray 62 such that electrical conductors 42 (not all labeled) may be electrically connected to electrodes 40.

According to at least one embodiment, leaching assembly 61 may be configured such that a volume of a processing solution 72 (e.g., processing solution 72 illustrated in 10) is disposed in each of holes 64. For example, processing solution 72 may be disposed in each hole 64 such that processing solution 72 contacts and/or surrounds at least a portion of each superabrasive element 10. Accordingly, at least a portion of each superabrasive element 10, such as at least a portion of superabrasive table 14, may be exposed to processing solution 72. Alternatively, lower tray 60 may be at least partially submersed in a processing solution and upper tray 62 may be at least partially submersed in the processing solution.

Upper tray 62 containing electrodes 40 disposed in and/or protruding from holes 66 may be positioned adjacent to lower tray 60 containing superabrasive elements 10 and processing solution 72 in holes 64. Upper tray 62 and lower tray 60 may be positioned such that at least a portion of each electrode 40 is disposed in holes 64 in contact with processing solution 72. According to various embodiments, at least a portion of lower tray 60 and upper tray 62 may be sealed together so as to prevent processing solution 72 from leaking from leaching assembly 61 during processing.

According to various embodiments, a charge may be applied to superabrasive element 10 and electrode 40 through electrical conductors 44 and 42, respectively. For example, in order to apply a current to processing solution 72 for processing superabrasive elements 10, a charge may be applied to at least a portion of each superabrasive element 10 through electrical conductors 44 and an opposite charge may be applied to each electrode 40 through electrical conductors 42.

FIGS. 30-41B show superabrasive elements having exemplary leach profiles that may be obtained by exemplary leach apparatuses disclosed herein.

Figure 30:
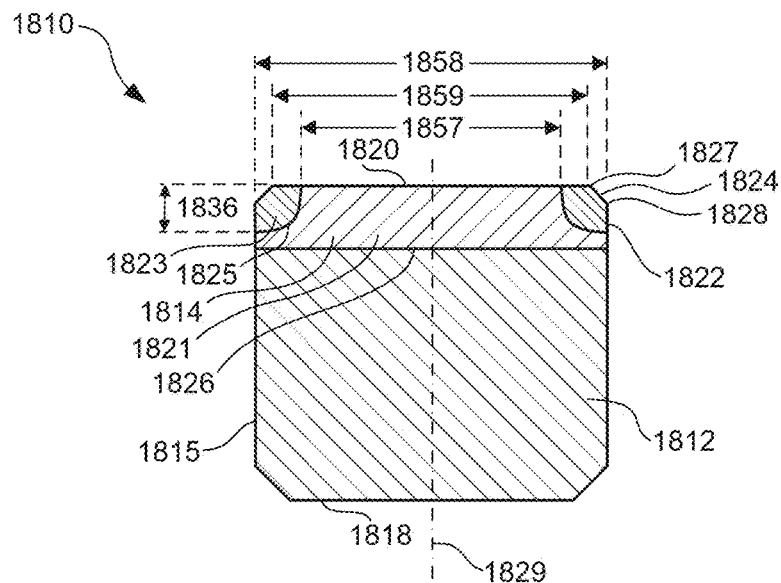
FIG. 30 is a cross-sectional side view of an exemplary superabrasive element according to at least one embodiment.

FIG. 30 shows a cross-sectional side view of an exemplary superabrasive element 1810 according to at least one embodiment. As illustrated in FIG. 30, superabrasive element 1810 may comprise a superabrasive table 1814 affixed to or formed upon a substrate 1812. Superabrasive table 1814 may be affixed to substrate 1812 at interface 1826. Superabrasive element 1810 may comprise a rear surface 1818, a superabrasive face 1820, and an element side surface 1815, which may include a substrate side surface 1816 formed by substrate 1812 and a superabrasive side surface 1822 formed by superabrasive table 1814. Superabrasive element 1810 may also comprise a chamfer 1824 formed by superabrasive table 1814.

As illustrated in FIG. 30, superabrasive table 1814 may include a first volume 1821 comprising an interstitial material and a second volume 1823 having a lower concentration of the interstitial material than first volume 1821. Portions of superabrasive table 1814, such as second volume 1823 may be leached or otherwise processed to remove interstitial materials, such as a metal-solvent catalyst, from the interstitial regions. Second volume 1823 may be created during leaching of superabrasive table 1812 according to any suitable leaching technique. For example, second volume 1823 may be selectively leached by disposing portions of superabrasive table 1814 of superabrasive element 1810 near an electrode during an electrochemical leaching process (e.g., electrochemical leaching referenced in FIG. 9C). In some embodiments, superabrasive element 1810 may first be leached, after which portions of superabrasive element 1810 may be removed to modify the shape of first volume 1821 and/or second volume 1823 according to one or more methods discussed herein.

A transition region 1825 may extend between first volume 1821 and second volume 1823. Transition region 1825 may include amounts of metal-solvent catalyst varying between an amount of metal-solvent catalyst in first volume 1821 and an amount of metal-solvent catalyst in second volume 1823. As illustrated in FIG. 30, first volume 1821 may be located adjacent to a central portion of superabrasive face 1820. For example, first volume 1821 may be disposed about central axis 1829. First volume 1821 may extend between interface 1826 and superabrasive face 1820 with first volume 1821 forming at least a portion of superabrasive face 1820 such that the central portion of superabrasive face 1820 located about central axis 1829 is defined by first volume 1821, as shown in FIG. 30. In some embodiments, first volume 1821 and superabrasive face 1820 may be separated by a thin layer of leached polycrystalline diamond material located adjacent to a central region of superabrasive face 1820.

Second volume 1823 may be formed around at least a portion of first volume 1821. For example, second volume 1823 may comprise an annular volume surrounding at least a portion of first volume 1821 such that an outer portion of superabrasive face 1820 relative to central axis 1829 is defined by second volume 1823. As shown in FIG. 30, second volume 1823 may be located adjacent to superabrasive face 1820 and/or chamfer 1824 so as to at least partially surround a portion of first volume 1821 that is also adjacent to superabrasive face 1820. Second volume 1823 may be located adjacent to element side surface 1815. Second volume 1823 may be separated from interface 1826 between substrate 1812 and superabrasive table 1814 so as to prevent corrosion of substrate 1812 by a leaching solution used to form second volume 1823.

First volume 1821, second volume 1823, and transition region 1825 may be formed to any suitable size and/or shape within superabrasive table 1814, without limitation. For example, transition region 1825 may extend along a generally straight, angular, curved, and/or variable (e.g., zigzag, undulating) profile between first volume 1821 and second volume 1823. In various embodiments, transition region 1825 may comprise a relatively narrow region between first volume 1821 and second volume 1823, while transition region 1825 may optionally comprise a relatively wider region between first volume 1821 and second volume 1823.

As shown in FIG. 30, second volume 1823 may have a depth 1836 from superabrasive face 1820 in a direction substantially perpendicular to superabrasive face 1820. Second volume 1823 may comprise a generally annular-shaped volume defined between a first diameter 1857 and a second diameter 1858 surrounding central axis 1829. The portion of first volume 1821 surrounded by second volume 1823 may be generally defined by first diameter 1857. Second diameter 1858 may represent a diameter of element side surface 1815. Edge 1827 formed at the intersection of chamfer 1824 and superabrasive face 1820 may be located at a third diameter 1859 relative to central axis 1829.

Second volume 1823 may be leached to any suitable depth from superabrasive face 1820, chamfer 1824, and/or superabrasive side surface 1822, without limitation. According to some embodiments, second volume 1823 may have a leach depth greater than or equal to approximately 200 µm as measured in a substantially perpendicular direction from at least one of superabrasive face 1820, chamfer 1824, and/or superabrasive side surface 1822. In various embodiments, second volume 1823 may have a leach depth between approximately 200 µm and approximately 1200 µm (e.g., approximately 200 µm, 250 µm, 300 µm, 350 µm, 400 µm, 450 µm, 500 µm, 550 µm, 600 µm, 650 µm, 700 µm, 750 µm, 800 µm, 850 µm, 900 µm, 950 µm, 1000 µm, 1050 µm, 1100 µm, 1150 µm, or 1200 µm) as measured in a substantially perpendicular direction from at least one of superabrasive face 1820, chamfer 1824, and/or superabrasive side surface 1822. According to at least one embodiment, a depth of second volume 1823 as measured from a center portion of chamfer 1824 may be between approximately 200 µm and 700 µm.

Superabrasive elements 1810 having superabrasive table 1814 comprising first volume 1821 and second volume 1823 may exhibit properties of increased thermal stability, fatigue resistance, strength, and/or wear resistance. Such properties may be enhanced by the shape, size, and/or locations of first volume 1821, second volume 1823, and/or transition region 1825 of superabrasive table 1814. Accordingly, the superabrasive element configuration illustrated in FIG. 30, as well as other configurations illustrated and described herein, may provide significant resistance to undesired spalling, cracking, and/or thermal damage of superabrasive portions, such as superabrasive table 1814, of the superabrasive elements during drilling.

Figures 31, 32:
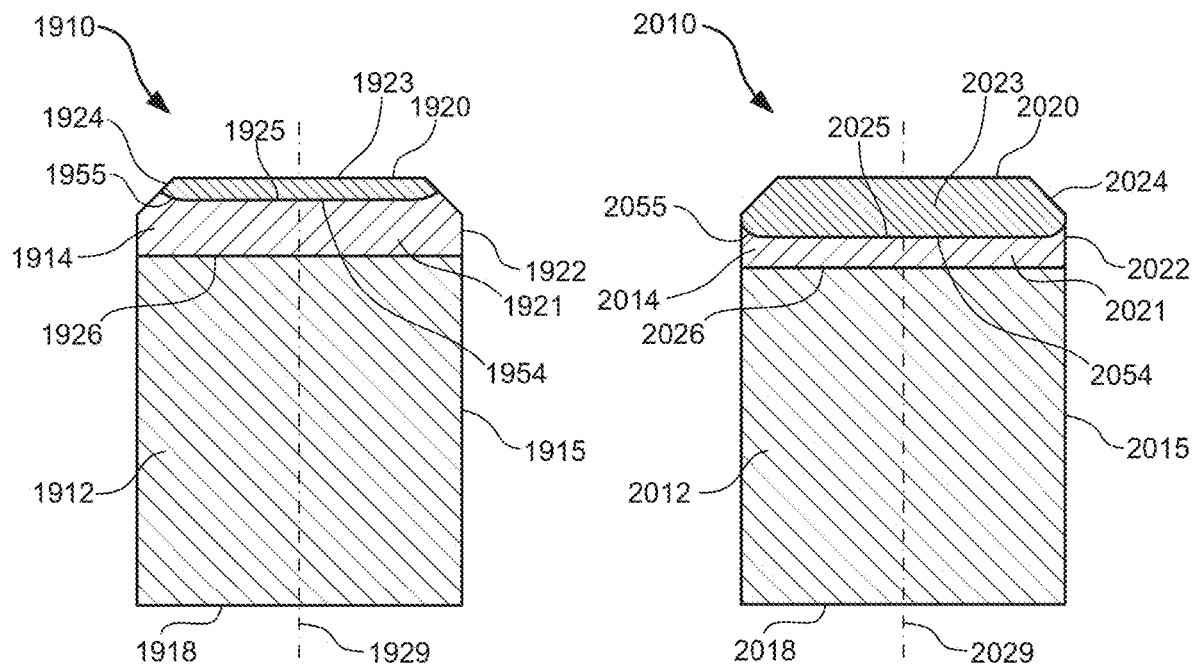
FIG. 31 is a cross-sectional side view of an exemplary superabrasive element according to at least one embodiment.
FIG. 32 is a cross-sectional side view of an exemplary superabrasive element according to at least one embodiment.

FIG. 31 shows a cross-sectional side view of an exemplary superabrasive element 1910 according to at least one embodiment. As illustrated in FIG. 31, superabrasive element 1910 may comprise a superabrasive table 1914 affixed to or formed upon a substrate 1912. Superabrasive table 1914 may be affixed to substrate 1912 at interface 1926. Superabrasive element 1910 may comprise a rear surface 1918, a superabrasive face 1920, and an element side surface 1915, which may include a substrate side surface 1916 formed by substrate 1912 and a superabrasive side surface 1922 formed by superabrasive table 1914. Superabrasive element 1910 may also comprise a chamfer 1924 formed by superabrasive table 1914.

Superabrasive element 1910 may include a first volume 1921 comprising an interstitial material and a second volume 1923 having a lower concentration of the interstitial material than first volume 1921. Portions of superabrasive table 1914, such as second volume 1923, may be leached or otherwise processed to remove interstitial materials, such as a metal-solvent catalyst, from the interstitial regions. A transition region 1925 may extend between first volume 1921 and second volume 1923 so as to border at least a portion of first volume 1921 and second volume 1923. Transition region 1925 may include amounts of an interstitial material varying between an amount of the interstitial material in first volume 1921 and an amount of the interstitial material in second volume 1923. In other embodiments, the boundary may be well defined (i.e., transition region 1925 may be thin compared to a depth of second volume 1923).

Transition region 1925 located between first volume 1921 and second volume 1923 may extend along any suitable profile within superabrasive table 1914. For example, as illustrated in FIG. 31, sloped boundary portion 1955 of transition region 1925 may extend between chamfer 1924 and central boundary portion 1954 along any suitable profile, including, for example, a generally straight, angular, curved, and/or variable (e.g., zigzag, undulating) profile. According to at least one embodiment, superabrasive element 1910 may be processed such that transition region 1925 intersects chamfer 1924 and/or a surface region adjacent to chamfer 1924 (e.g., superabrasive side surface 1922). Accordingly, as shown in FIG. 31, second volume 1923 may be located directly adjacent to a central portion of superabrasive face 1920. For example, second volume 1923 may be disposed about central axis 1929. A portion of first volume 1921, such as a portion adjacent to chamfer 1924, may peripherally surround at least a portion of second volume 1923.

FIG. 32 shows a cross-sectional side view of an exemplary superabrasive element 2010 according to at least one embodiment. As illustrated in FIG. 32, superabrasive element 2010 may comprise a superabrasive table 2014 affixed to or formed upon a substrate 2012. Superabrasive table 2014 may be affixed to substrate 2012 at interface 2026. Superabrasive element 2010 may comprise a rear surface 2018, a superabrasive face 2020, and an element side surface 2015, which may include a substrate side surface 2016 formed by substrate 2012 and a superabrasive side surface 2022 formed by superabrasive table 2014. Superabrasive element 2010 may also comprise a chamfer 2024 formed by superabrasive table 2014.

Superabrasive element 2010 may include a first volume 2021 comprising an interstitial material and a second volume 2023 having a lower concentration of the interstitial material than first volume 2021. Portions of superabrasive table 2014, such as second volume 2023, may be leached or otherwise processed to remove interstitial materials, such as a metal-solvent catalyst, from the interstitial regions. A transition region 2025 may extend between first volume 2021 and second volume 2023 so as to border at least a portion of first volume 2021 and second volume 2023. Transition region 2025 may include amounts of an interstitial material varying between an amount of the interstitial material in first volume 2021 and an amount of the interstitial material in second volume 2023. In other embodiments, the boundary may be well defined (i.e., transition region 2025 may be thin compared to a depth of second volume 2023).

In some embodiments, as illustrated in FIG. 32, sloped boundary portion 2055 of transition region 2025 may extend between superabrasive side surface 2022 and central boundary portion 2054 along any suitable profile, including, for example, a generally straight, angular, curved, and/or variable (e.g., zigzag, undulating) profile. According to at least one embodiment, superabrasive element 2010 may be processed such that transition region 2025 intersects superabrasive side surface 2022 below chamfer 2024.

FIGS. 33-41B show cross-sectional views of superabrasive elements comprising superabrasive tables having exemplary leach profiles that may be obtained by exemplary leach apparatuses disclosed herein. While superabrasive elements illustrated in FIGS. 33-41B shown as superabrasive tables without a substrate, the leach profiles illustrated in these figures may also apply to superabrasive elements (e.g., superabrasive element 10 shown in FIGS. 1-2) comprising a superabrasive element bonded to a substrate. According to some embodiments, the superabrasive elements illustrated in FIGS. 33-41B may be formed by leaching a superabrasive element comprising a substrate and a superabrasive table according to any of the techniques described herein and subsequently separating (e.g., by lapping, grinding, wire EDM, etc.) the superabrasive table from the substrate. Alternatively, a superabrasive element may be formed with a substrate, the substrate may be removed, and then the superabrasive table may be leached.

Figure 33:
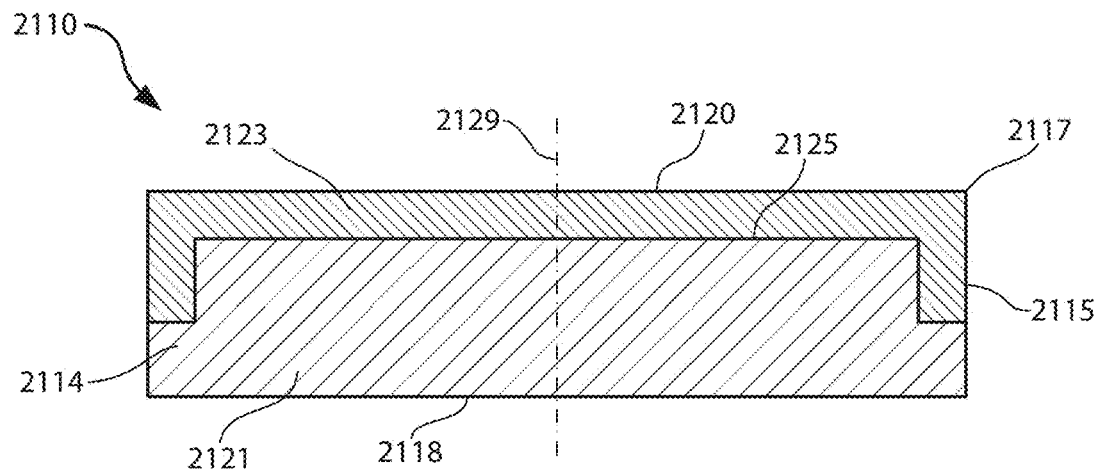
FIG. 33 is a cross-sectional side view of an exemplary superabrasive element according to at least one embodiment.

FIG. 33 shows an exemplary superabrasive element 2110 comprising a superabrasive table 2114 having a rear surface 2118, a superabrasive face 2120, and an element side surface 2115. Superabrasive element 2110 may comprise an edge 2117 (i.e., sloped or angled) and/or any other suitable surface shape at the intersection of element side surface 2115 and superabrasive face 2120, including, without limitation, an arcuate surface (e.g., a radius, an ovoid shape, or any other rounded shape), a sharp edge, multiple chamfers/radii, a honed edge, and/or combinations of the foregoing. Element side surface 2115 of superabrasive element 2110 may radially surround a central axis 2129 of superabrasive element 2110.

Superabrasive element 2110 may include a first volume 2121 comprising an interstitial material and a second volume 2123 having a lower concentration of the interstitial material than first volume 2121. Portions of superabrasive table 2114, such as second volume 2123, may be leached or otherwise processed to remove interstitial materials, such as a metal-solvent catalyst, from the interstitial regions. A transition region 2125 may extend between first volume 2121 and second volume 2123 so as to border at least a portion of first volume 2121 and second volume 2123. Transition region 2125 may include amounts of an interstitial material varying between an amount of the interstitial material in first volume 2121 and an amount of the interstitial material in second volume 2123. In other embodiments, the boundary may be well defined (i.e., transition region 2125 may be thin compared to a depth of second volume 2123).

As shown in FIG. 33, first volume 2121 may extend between rear surface 2118 and transition region 2125. Second volume 2123 may be formed adjacent to a substantial portion of superabrasive face 2120. Transition region 2125 bordering second volume 2123 may extend in a direction generally parallel to superabrasive face 2120. Optionally, a portion of second volume 2123 may extend along at least a portion of element side surface 2115 so as to radially surround at least a portion of first volume 2121. A portion of transition region 2125 may extend in a direction generally parallel to element side surface 2115. According to some embodiments, transition region 2125 may have a substantially consistent thickness along element side surface 2115 and/or along superabrasive face 2120.

Figure 34:
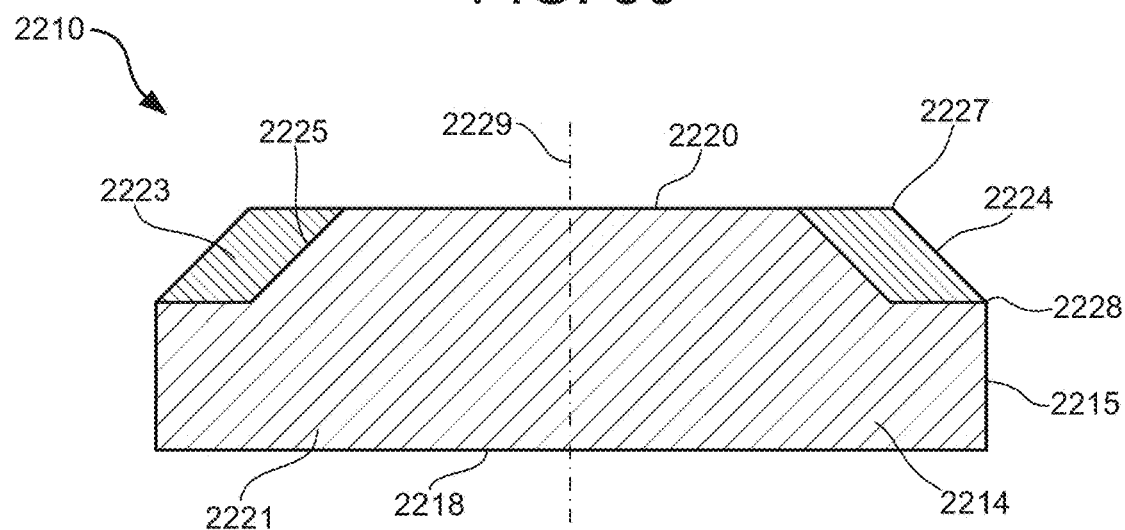
FIG. 34 is a cross-sectional side view of an exemplary superabrasive element according to at least one embodiment.

FIG. 34 shows an exemplary superabrasive element 2210 comprising a superabrasive table 2214 having a rear surface 2218, a superabrasive face 2220, and an element side surface 2215. Superabrasive table 2214 may also form a chamfer 2224 and one or more cutting edges, such as edge 2227 and edge 2228, adjacent to chamfer 2224. Element side surface 2215 of superabrasive element 2210 may radially surround a central axis 2229 of superabrasive element 2210.

Superabrasive element 2210 may include a first volume 2221 comprising an interstitial material and a second volume 2223 having a lower concentration of the interstitial material than first volume 2221. Portions of superabrasive table 2214, such as second volume 2223, may be leached or otherwise processed to remove interstitial materials, such as a metal-solvent catalyst, from the interstitial regions. A transition region 2225 may extend between first volume 2221 and second volume 2223 so as to border at least a portion of first volume 2221 and second volume 2223. Transition region 2225 may include amounts of an interstitial material varying between an amount of the interstitial material in first volume 2221 and an amount of the interstitial material in second volume 2223. In other embodiments, the boundary may be well defined (i.e., transition region 2225 may be thin compared to a depth of second volume 2223).

As shown in FIG. 34, second volume 2223 may be formed adjacent to chamfer 2224 and superabrasive face 2220, and transition region 2225 may extend from superabrasive face 2220 to edge 2228 formed at the intersection of chamfer 2224 and element side surface 2215, with a portion of transition region 2225 extending generally parallel to chamfer 2224.

Figure 35:
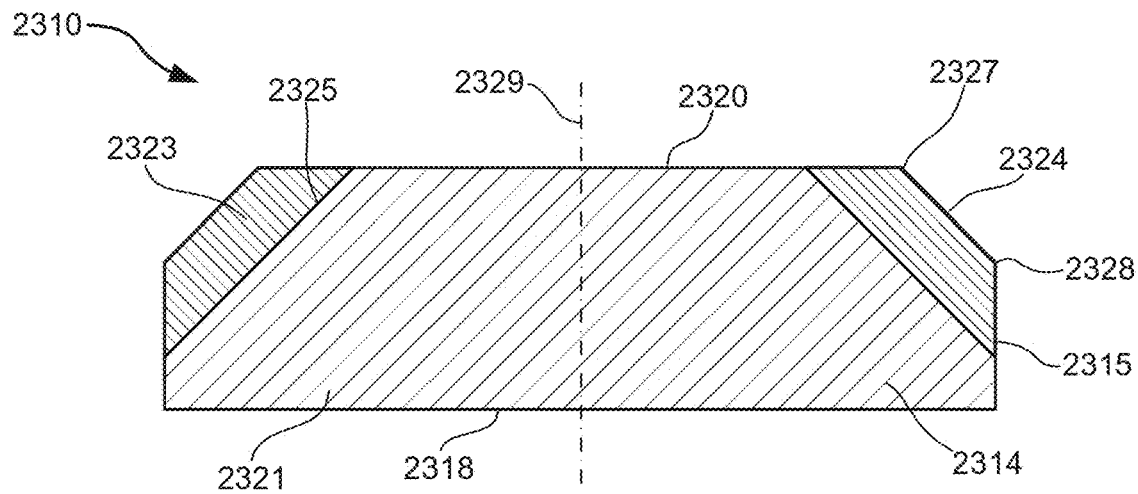
FIG. 35 is a cross-sectional side view of an exemplary superabrasive element according to at least one embodiment.

FIG. 35 shows an exemplary superabrasive element 2310 comprising a superabrasive table 2314 having a rear surface 2318, a superabrasive face 2320, and an element side surface 2315. Superabrasive table 2314 may also form a chamfer 2324 and one or more cutting edges, such as edge 2327 and edge 2328, adjacent to chamfer 2324. Element side surface 2315 of superabrasive element 2310 may radially surround a central axis 2329 of superabrasive element 2310.

Superabrasive element 2310 may include a first volume 2321 comprising an interstitial material and a second volume 2323 having a lower concentration of the interstitial material than first volume 2321. Portions of superabrasive table 2314, such as second volume 2323, may be leached or otherwise processed to remove interstitial materials, such as a metal-solvent catalyst, from the interstitial regions. A transition region 2325 may extend between first volume 2321 and second volume 2323 so as to border at least a portion of first volume 2321 and second volume 2323. Transition region 2325 may include amounts of an interstitial material varying between an amount of the interstitial material in first volume 2321 and an amount of the interstitial material in second volume 2323. In other embodiments, the boundary may be well defined (i.e., transition region 2325 may be thin compared to a depth of second volume 2323).

As shown in FIG. 35, second volume 2323 may be formed adjacent to chamfer 2324, superabrasive face 2320, and element side surface 2315, and transition region 2325 may extend generally parallel to chamfer 2324 from superabrasive face 2320 to element side surface 2315.

Figure 36:
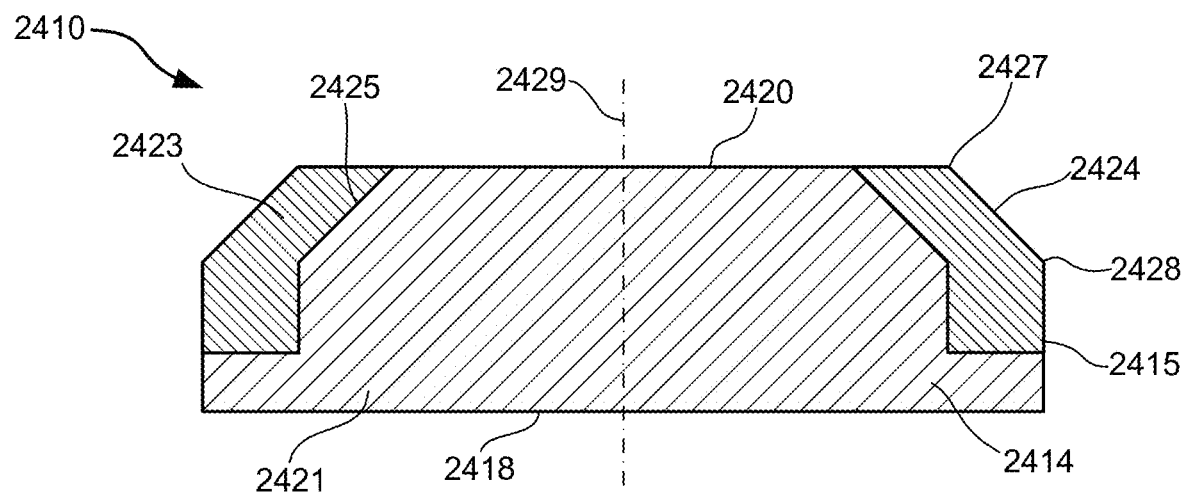
FIG. 36 is a cross-sectional side view of an exemplary superabrasive element according to at least one embodiment.

FIG. 36 shows an exemplary superabrasive element 2410 comprising a superabrasive table 2414 having a rear surface 2418, a superabrasive face 2420, and an element side surface 2415. Superabrasive table 2414 may also form a chamfer 2424 and one or more cutting edges, such as edge 2427 and edge 2428, adjacent to chamfer 2424. Element side surface 2415 of superabrasive element 2410 may radially surround a central axis 2429 of superabrasive element 2410.

Superabrasive element 2410 may include a first volume 2421 comprising an interstitial material and a second volume 2423 having a lower concentration of the interstitial material than first volume 2421. Portions of superabrasive table 2414, such as second volume 2423, may be leached or otherwise processed to remove interstitial materials, such as a metal-solvent catalyst, from the interstitial regions. A transition region 2425 may extend between first volume 2421 and second volume 2423 so as to border at least a portion of first volume 2421 and second volume 2423. Transition region 2425 may include amounts of an interstitial material varying between an amount of the interstitial material in first volume 2421 and an amount of the interstitial material in second volume 2423. In other embodiments, the boundary may be well defined (i.e., transition region 2425 may be thin compared to a depth of second volume 2423).

As shown in FIG. 36, second volume 2423 may be formed adjacent to chamfer 2424, superabrasive face 2420, and element side surface 2415, and transition region 2425 may extend from superabrasive face 2420 to element side surface 2415, with a portion of transition region 2425 extending generally parallel to chamfer 2424 and another portion of transition region 2425 extending generally parallel to element side surface 2415.

Figure 37:
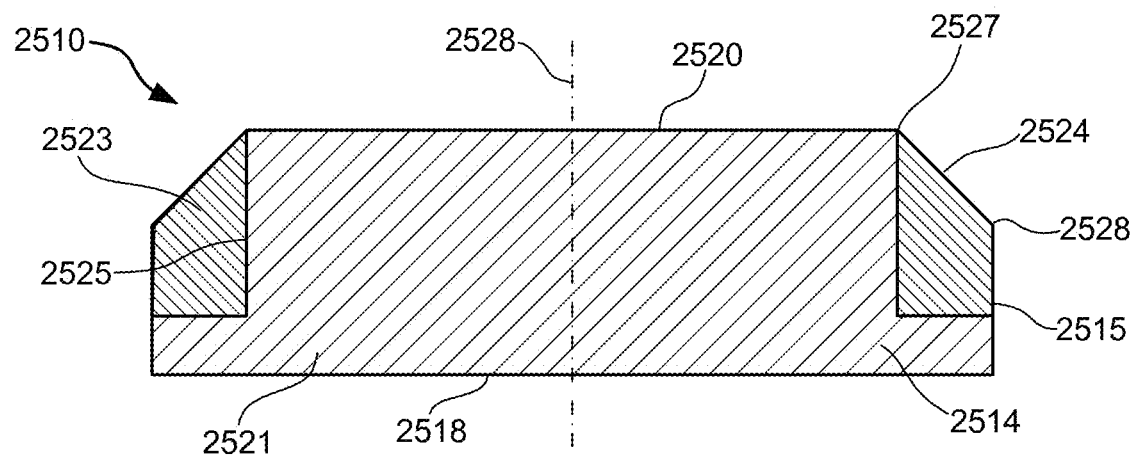
FIG. 37 is a cross-sectional side view of an exemplary superabrasive element according to at least one embodiment.

FIG. 37 shows an exemplary superabrasive element 2510 comprising a superabrasive table 2514 having a rear surface 2518, a superabrasive face 2520, and an element side surface 2515. Superabrasive table 2514 may also form a chamfer 2524 and one or more cutting edges, such as edge 2527 and edge 2528, adjacent to chamfer 2524. Element side surface 2515 of superabrasive element 2510 may radially surround a central axis 2529 of superabrasive element 2510.

Superabrasive element 2510 may include a first volume 2521 comprising an interstitial material and a second volume 2523 having a lower concentration of the interstitial material than first volume 2521. Portions of superabrasive table 2514, such as second volume 2523, may be leached or otherwise processed to remove interstitial materials, such as a metal-solvent catalyst, from the interstitial regions. A transition region 2525 may extend between first volume 2521 and second volume 2523 so as to border at least a portion of first volume 2521 and second volume 2523. Transition region 2525 may include amounts of an interstitial material varying between an amount of the interstitial material in first volume 2521 and an amount of the interstitial material in second volume 2523. In other embodiments, the boundary may be well defined (i.e., transition region 2525 may be thin compared to a depth of second volume 2523).

As shown in FIG. 37, second volume 2523 may be formed adjacent to chamfer 2524 and element side surface 2515, and transition region 2525 may extend from edge 2527 formed at the intersection of chamfer 2524 and superabrasive face 2520 to element side surface 2515, with a portion of transition region 2525 extending generally parallel to element side surface 2515.

Figure 38:
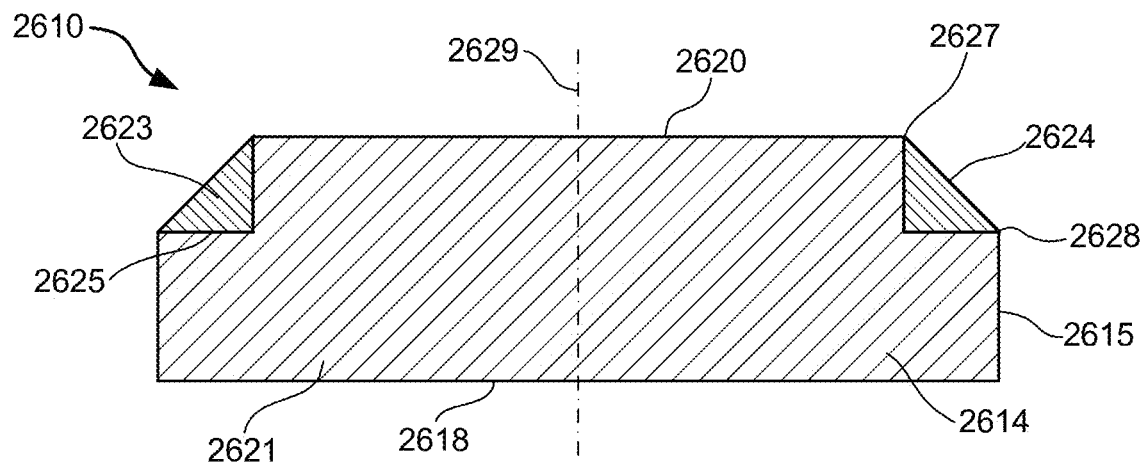
FIG. 38 is a cross-sectional side view of an exemplary superabrasive element according to at least one embodiment.

FIG. 38 shows an exemplary superabrasive element 2610 comprising a superabrasive table 2614 having a rear surface 2618, a superabrasive face 2620, and an element side surface 2615. Superabrasive table 2614 may also form a chamfer 2624 and one or more cutting edges, such as edge 2627 and edge 2628, adjacent to chamfer 2624. Element side surface 2615 of superabrasive element 2610 may radially surround a central axis 2629 of superabrasive element 2610.

Superabrasive element 2610 may include a first volume 2621 comprising an interstitial material and a second volume 2623 having a lower concentration of the interstitial material than first volume 2621. Portions of superabrasive table 2614, such as second volume 2623, may be leached or otherwise processed to remove interstitial materials, such as a metal-solvent catalyst, from the interstitial regions. A transition region 2625 may extend between first volume 2621 and second volume 2623 so as to border at least a portion of first volume 2621 and second volume 2623. Transition region 2625 may include amounts of an interstitial material varying between an amount of the interstitial material in first volume 2621 and an amount of the interstitial material in second volume 2623. In other embodiments, the boundary may be well defined (i.e., transition region 2625 may be thin compared to a depth of second volume 2623).

As shown in FIG. 38, second volume 2623 may be formed adjacent to chamfer 2624 and transition region 2625 may extend from edge 2627 to edge 2628, which are each adjacent to chamfer 2624. Transition region 2625 may extend along any suitable profile between edge 2627 and edge 2628, without limitation. According to some embodiments, transition region 2625 may comprise an angular profile, as illustrated in FIG. 38. A thickness or depth of second volume 2623, as measured perpendicular to a surface of chamfer 2624, may be maximum generally near the center of chamfer 2624.

Figure 39:
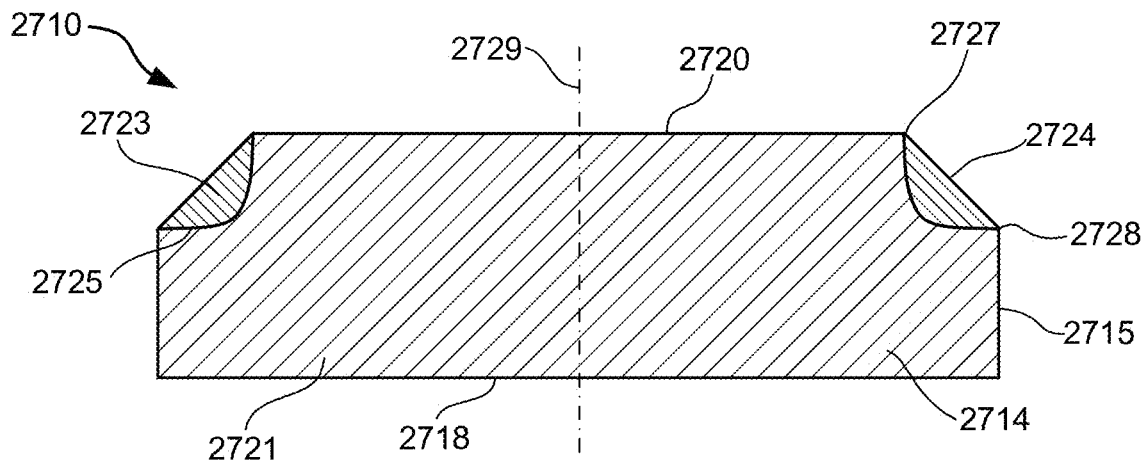
FIG. 39 is a cross-sectional side view of an exemplary superabrasive element according to at least one embodiment.

FIG. 39 shows an exemplary superabrasive element 2710 comprising a superabrasive table 2714 having a rear surface 2718, a superabrasive face 2720, and an element side surface 2715. Superabrasive table 2714 may also form a chamfer 2724 and one or more cutting edges, such as edge 2727 and edge 2728, adjacent to chamfer 2724. Element side surface 2715 of superabrasive element 2710 may radially surround a central axis 2729 of superabrasive element 2710.

Superabrasive element 2710 may include a first volume 2721 comprising an interstitial material and a second volume 2723 having a lower concentration of the interstitial material than first volume 2721. Portions of superabrasive table 2714, such as second volume 2723, may be leached or otherwise processed to remove interstitial materials, such as a metal-solvent catalyst, from the interstitial regions. A transition region 2725 may extend between first volume 2721 and second volume 2723 so as to border at least a portion of first volume 2721 and second volume 2723. Transition region 2725 may include amounts of an interstitial material varying between an amount of the interstitial material in first volume 2721 and an amount of the interstitial material in second volume 2723. In other embodiments, the boundary may be well defined (i.e., transition region 2725 may be thin compared to a depth of second volume 2723).

As shown in FIG. 39, second volume 2723 may be formed adjacent to chamfer 2724 and transition region 2725 may extend from edge 2727 to edge 2728, which are each adjacent to chamfer 2724. Transition region 2725 may extend along any suitable profile between edge 2727 and edge 2728, without limitation. According to some embodiments, transition region 2725 may comprise an arcuate profile, as illustrated in FIG. 39. A thickness or depth of second volume 2723, as measured perpendicular to a surface of chamfer 2724, may be maximum generally near the center of chamfer 2724.

Figure 40A:
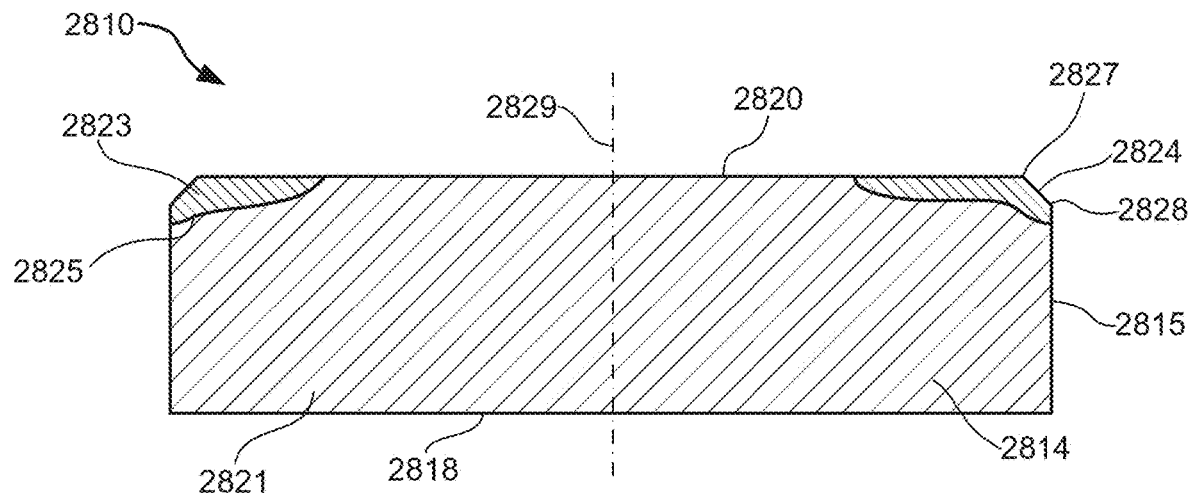
FIG. 40A is a cross-sectional side view of an exemplary superabrasive element according to at least one embodiment.

FIG. 40A shows an exemplary superabrasive element 2810 comprising a superabrasive table 2814 having a rear surface 2818, a superabrasive face 2820, and an element side surface 2815. Superabrasive table 2814 may also form a chamfer 2824 and one or more cutting edges, such as edge 2827 and edge 2828, adjacent to chamfer 2824. Element side surface 2815 of superabrasive element 2810 may radially surround a central axis 2829 of superabrasive element 2810.

Superabrasive element 2810 may include a first volume 2821 comprising an interstitial material and a second volume 2823 having a lower concentration of the interstitial material than first volume 2821. Portions of superabrasive table 2814, such as second volume 2823, may be leached or otherwise processed to remove interstitial materials, such as a metal-solvent catalyst, from the interstitial regions. A transition region 2825 may extend between first volume 2821 and second volume 2823 so as to border at least a portion of first volume 2821 and second volume 2823. Transition region 2825 may include amounts of an interstitial material varying between an amount of the interstitial material in first volume 2821 and an amount of the interstitial material in second volume 2823. In other embodiments, the boundary may be well defined (i.e., transition region 2825 may be thin compared to a depth of second volume 2823).

As shown in FIG. 40A, second volume 2823 may be formed adjacent to chamfer 2824 and transition region 2825 may extend from superabrasive face 2820 to element side surface 2815. Transition region 2825 may extend along any suitable profile between superabrasive face 2820 and element side surface 2815, without limitation. Transition region 2825 may comprise, for example, a profile that generally slopes between superabrasive face 2820 and element side surface 2815. For example, transition region 2825 may extend from a region of element side surface 2815 near edge 2828 to a region of superabrasive face 2820 disposed apart from edge 2827. According to some embodiments, as shown in FIG. 40A, the generally annular-shaped second volume 2823 may comprise a generally ring-shaped volume that is not perfectly symmetric but is irregular in one or more dimensions. For example, second volume 2823 may vary in leach depth and/or profile shape, as defined by transition region 2825, at different peripheral regions about central axis 2829.

Figure 40B:
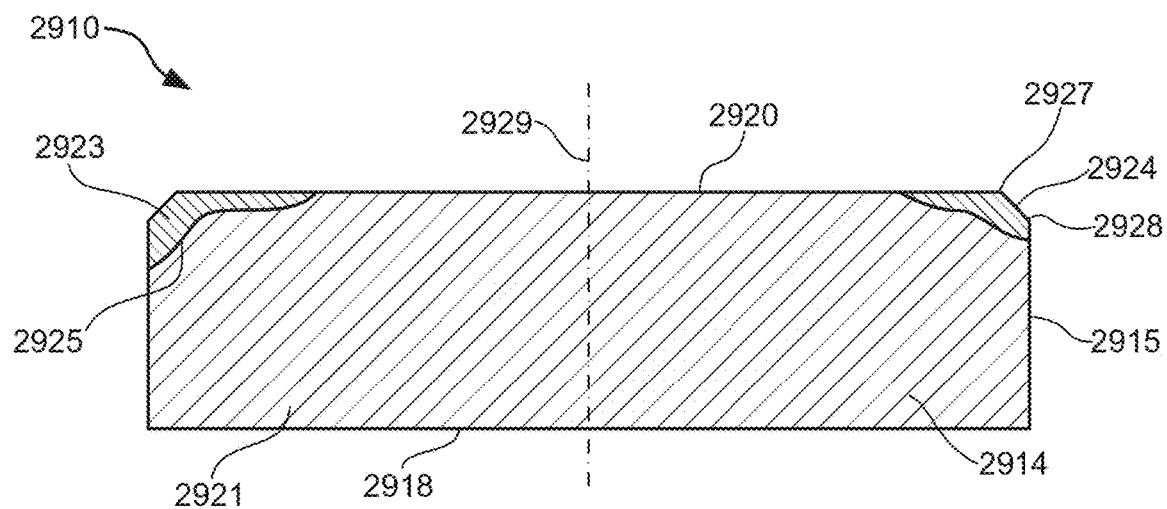
FIG. 40B is a cross-sectional side view of an exemplary superabrasive element according to at least one embodiment.

FIG. 40B shows an exemplary superabrasive element 2910 comprising a superabrasive table 2914 having a rear surface 2918, a superabrasive face 2920, and an element side surface 2915. Superabrasive table 2914 may also form a chamfer 2924 and one or more cutting edges, such as edge 2927 and edge 2928, adjacent to chamfer 2924. Element side surface 2915 of superabrasive element 2910 may radially surround a central axis 2929 of superabrasive element 2910.

Superabrasive element 2910 may include a first volume 2921 comprising an interstitial material and a second volume 2923 having a lower concentration of the interstitial material than first volume 2921. Portions of superabrasive table 2914, such as second volume 2923, may be leached or otherwise processed to remove interstitial materials, such as a metal-solvent catalyst, from the interstitial regions. A transition region 2925 may extend between first volume 2921 and second volume 2923 so as to border at least a portion of first volume 2921 and second volume 2923. Transition region 2925 may include amounts of an interstitial material varying between an amount of the interstitial material in first volume 2921 and an amount of the interstitial material in second volume 2923. In other embodiments, the boundary may be well defined (i.e., transition region 2925 may be thin compared to a depth of second volume 2923).

As shown in FIG. 40B, second volume 2923 may be formed adjacent to chamfer 2924 and transition region 2925 may extend from superabrasive face 2920 to element side surface 2915. Transition region 2925 may extend along any suitable profile between superabrasive face 2920 and element side surface 2915, without limitation. Transition region 2925 may comprise, for example, a profile that generally slopes between superabrasive face 2920 and element side surface 2915. For example, transition region 2925 may extend from a region of element side surface 2915 near edge 2928 to a region of superabrasive face 2920 disposed apart from edge 2927. According to some embodiments, as shown in FIG. 40B, the generally annular-shaped second volume 2923 may comprise a generally ring-shaped volume that is not perfectly symmetric but is irregular in one or more dimensions. For example, second volume 2923 may vary in leach depth and/or profile shape, as defined by transition region 2925, at different peripheral regions about central axis 2929.

Figure 41A:
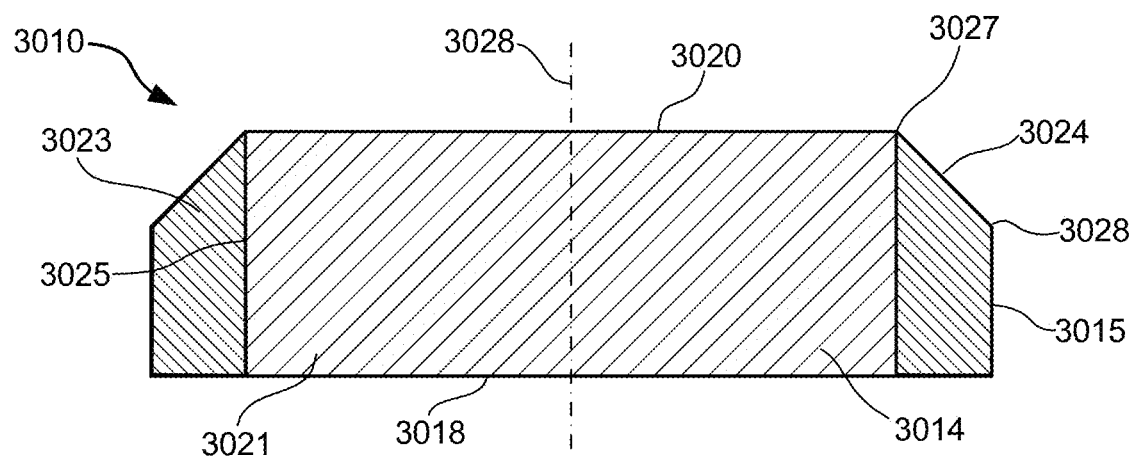
FIG. 41A is a cross-sectional side view of an exemplary superabrasive element according to at least one embodiment.

FIG. 41A shows an exemplary superabrasive element 3010 comprising a superabrasive table 3014 having a rear surface 3018, a superabrasive face 3020, and an element side surface 3015. Superabrasive table 3014 may also form a chamfer 3024 and one or more cutting edges, such as edge 3027 and edge 3028, adjacent to chamfer 3024. Element side surface 3015 of superabrasive element 3010 may radially surround a central axis 3029 of superabrasive element 3010.

Superabrasive element 3010 may include a first volume 3021 comprising an interstitial material and a second volume 3023 having a lower concentration of the interstitial material than first volume 3021. Portions of superabrasive table 3014, such as second volume 3023, may be leached or otherwise processed to remove interstitial materials, such as a metal-solvent catalyst, from the interstitial regions. A transition region 3025 may extend between first volume 3021 and second volume 3023 so as to border at least a portion of first volume 3021 and second volume 3023. Transition region 3025 may include amounts of an interstitial material varying between an amount of the interstitial material in first volume 3021 and an amount of the interstitial material in second volume 3023. In other embodiments, the boundary may be well defined (i.e., transition region 3025 may be thin compared to a depth of second volume 3023).

As shown in FIG. 41A, second volume 3023 may be formed adjacent to chamfer 3024, superabrasive face 3020, and element side surface 3015, and transition region 3025 may extend from superabrasive face 3020 to rear surface 3018 (or to an interface between superabrasive table 3014 and an adjacent substrate), with transition region 3025 extending generally parallel to element side surface 3015.

Figure 41B:
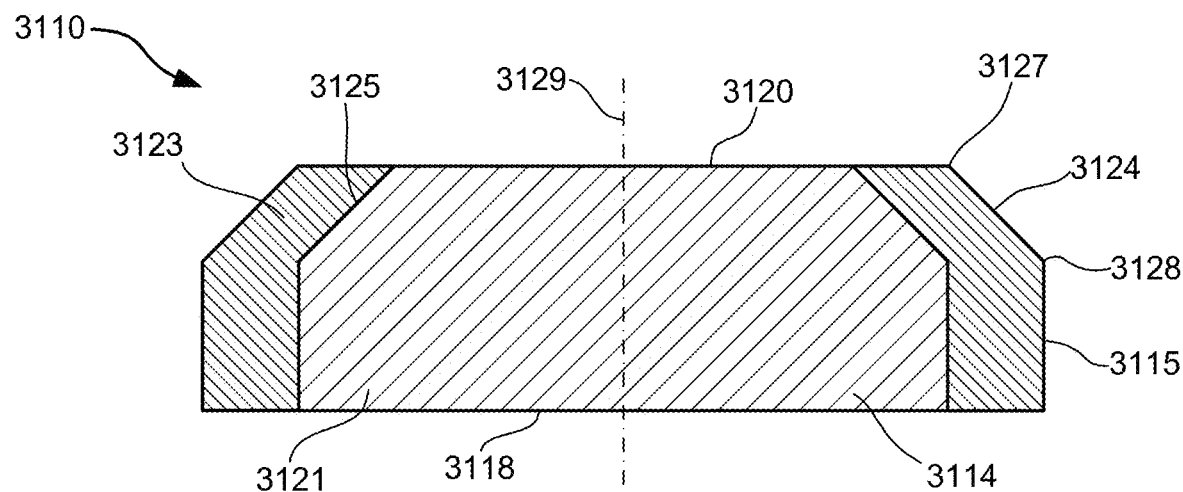
FIG. 41B is a cross-sectional side view of an exemplary superabrasive element according to at least one embodiment.

FIG. 41B shows an exemplary superabrasive element 3110 comprising a superabrasive table 3114 having a rear surface 3118, a superabrasive face 3120, and an element side surface 3115. Superabrasive table 3114 may also form a chamfer 3124 and one or more cutting edges, such as edge 3127 and edge 3128, adjacent to chamfer 3124. Element side surface 3115 of superabrasive element 3110 may radially surround a central axis 3129 of superabrasive element 3110.

Superabrasive element 3110 may include a first volume 3121 comprising an interstitial material and a second volume 3123 having a lower concentration of the interstitial material than first volume 3121. Portions of superabrasive table 3114, such as second volume 3123, may be leached or otherwise processed to remove interstitial materials, such as a metal-solvent catalyst, from the interstitial regions. A transition region 3125 may extend between first volume 3121 and second volume 3123 so as to border at least a portion of first volume 3121 and second volume 3123. Transition region 3125 may include amounts of an interstitial material varying between an amount of the interstitial material in first volume 3121 and an amount of the interstitial material in second volume 3123. In other embodiments, the boundary may be well defined (i.e., transition region 3125 may be thin compared to a depth of second volume 3123).

As shown in FIG. 41B, second volume 3123 may be formed adjacent to chamfer 3124, superabrasive face 3120, and element side surface 3115, and transition region 3125 may extend from superabrasive face 3120 to rear surface 3118 (or to an interface between superabrasive table 3114 and an adjacent substrate).

Figure 42:
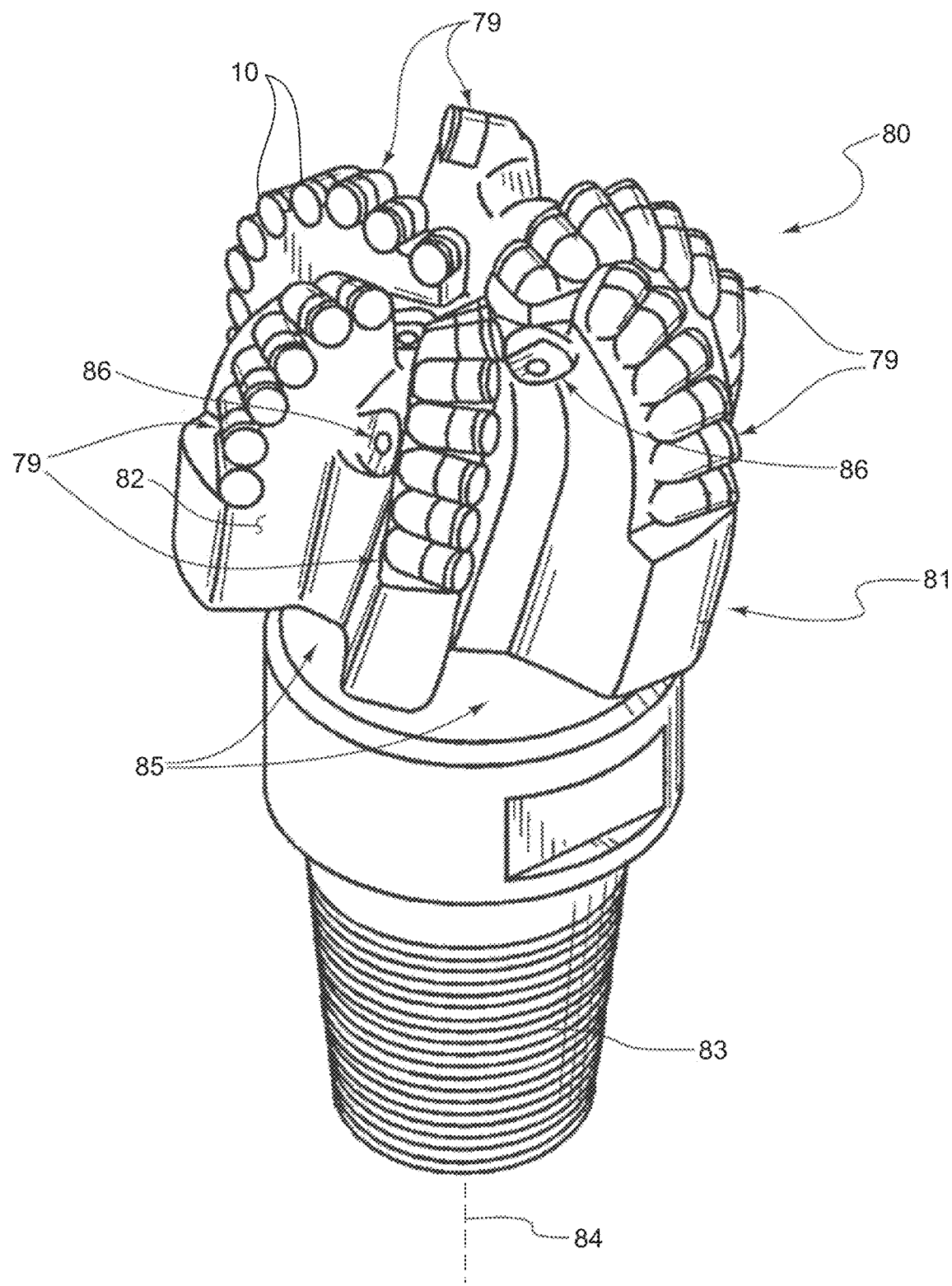
FIG. 42 is a perspective view of an exemplary drill bit according to at least one embodiment.

FIG. 42 is a perspective view of an exemplary drill bit 80 according to at least one embodiment. Drill bit 80 may represent any type or form of earth-boring or drilling tool, including, for example, a rotary drill bit. As illustrated in FIG. 42, drill bit 80 may comprise a bit body 81 having a longitudinal axis 84. Bit body 81 may define a leading end structure for drilling into a subterranean formation by rotating bit body 81 about longitudinal axis 84 and applying weight to bit body 81. Bit body 81 may include radially and longitudinally extending blades 79 with leading faces 82 and a threaded pin connection 83 for connecting bit body 81 to a drill string.

At least one superabrasive element according to any of the embodiments disclosed herein may be coupled to bit body 81. For example, as shown in FIG. 42, a plurality of superabrasive elements 10 may be coupled to blades 79. Drill bit 80 may utilize any of the disclosed superabrasive elements 10 as cutting elements. Circumferentially adjacent blades 79 may define so-called junk slots 85 therebetween. Junk slots 85 may be configured to channel debris, such as rock or formation cuttings, away from superabrasive elements 10 during drilling. Drill bit 80 may also include a plurality of nozzle cavities 86 for communicating drilling fluid from the interior of drill bit 80 to superabrasive elements 10.

FIG. 42 depicts an example of a drill bit 80 that employs at least one cutting element 10. Drill bit 80 may represent any number of earth-boring tools or drilling tools, including, for example, core bits, roller-cone bits, fixed-cutter bits, eccentric bits, bicenter bits, reamers, reamer wings, and/or any other downhole tools comprising superabrasive cutting elements and/or discs, without limitation. Superabrasive elements 10 disclosed herein may also be utilized in applications other than cutting technology. For example, embodiments of superabrasive elements 10 disclosed herein may also form all or part of heat sinks, wire dies, bearing elements, cutting elements, cutting inserts (e.g., on a roller cone type drill bit), machining inserts, or any other article of manufacture, as known in the art. According to some examples, superabrasive elements 10, as disclosed herein, may be employed in medical device applications, including, without limitation, hip joints, back joints, or any other suitable medical joints. Thus, superabrasive elements 10, as disclosed herein, may be employed in any suitable article of manufacture. Other examples of articles of manufacture that may incorporate superabrasive elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

In additional embodiments, a rotor and a stator, such as a rotor and a stator used in a thrust bearing apparatus, may each include at least one superabrasive element according to the embodiments disclosed herein. By way of example, U.S. Pat. Nos. 4,410,054; 4,560,014; 5,364,192; 5,368,398; and 5,480,233, the disclosure of each of which is incorporated herein, in its entirety, by this reference, disclose subterranean drilling systems that include bearing apparatuses utilizing superabrasive elements 10 as disclosed herein.

Figure 43:
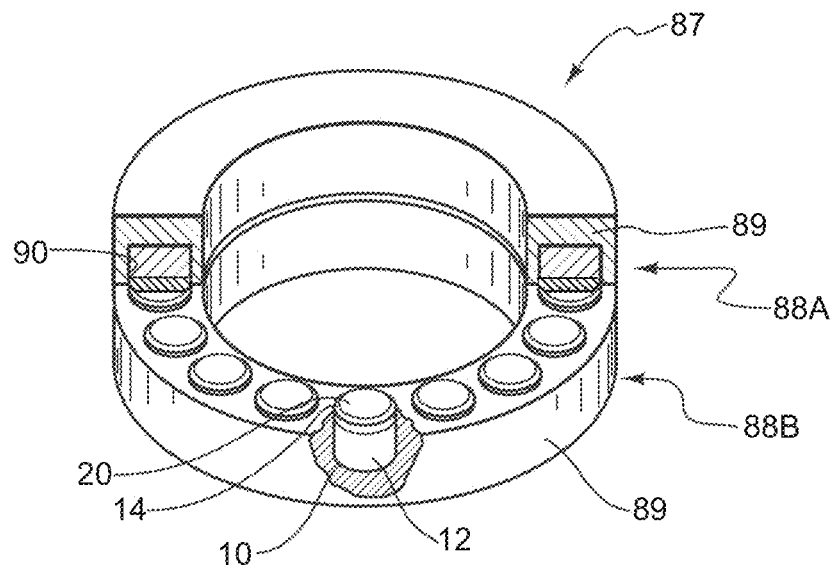
FIG. 43 is a partial cut-away perspective view of an exemplary thrust bearing apparatus according to at least one embodiment.

FIG. 43 is partial cross-sectional perspective view of an exemplary thrust-bearing apparatus 87 according to at least one embodiment. Thrust-bearing apparatus 87 may utilize any of the disclosed superabrasive elements 10 as bearing elements. Thrust-bearing apparatus 87 may also include bearing assemblies 88A and 88B. Each of bearing assembly 88A and 88B may include a support ring 89 fabricated from a material, such as steel, stainless steel, or any other suitable material, without limitation.

Each support ring 89 may include a plurality of recesses 90 configured to receive corresponding superabrasive elements 10. Each superabrasive element 10 may be mounted to a corresponding support ring 89 within a corresponding recess 90 by brazing, welding, press-fitting, using fasteners, or any another suitable mounting technique, without limitation. In at least one embodiment, one or more of superabrasive elements 10 may be configured according to any of the superabrasive element embodiments described herein. For example, each superabrasive element 10 may include a substrate 12 and a superabrasive table 14 comprising a PCD material. Each superabrasive table 14 may form a superabrasive face 20 that is utilized as a bearing surface.

Superabrasive faces 20 of bearing assembly 88A may bear against opposing superabrasive faces 20 of bearing assembly 88B in thrust-bearing apparatus 87, as illustrated in FIG. 43. For example, bearing assembly 88A of thrust-bearing apparatus 87 may be termed a "rotor." The rotor may be operably coupled to a rotational shaft. Bearing assembly 88B of thrust-bearing apparatus 87 may be held substantially stationary relative to the bearing assembly 88A and may be termed a "stator."

Figure 44:
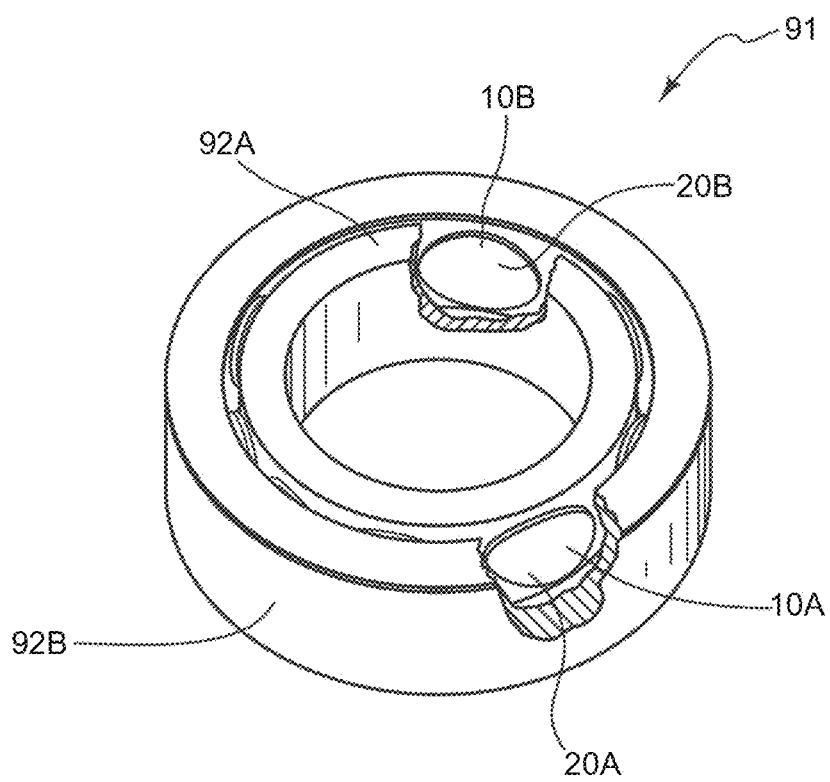
FIG. 44 is a partial cut-away perspective view of an exemplary radial bearing apparatus according to at least one embodiment.

FIG. 44 is a perspective view of a radial bearing apparatus 91 according to another embodiment. Radial bearing apparatus 91 may utilize any of the disclosed superabrasive element embodiments as bearing elements 10A and 10B. Radial bearing apparatus 91 may include an inner race 92A positioned generally within an outer race 92B. Inner race 92A may include a plurality of bearing elements 10A affixed thereto, and outer race 92B may include a plurality of corresponding bearing elements 10B affixed thereto. One or more of bearing elements 10A and 10B may be configured in accordance with any of the superabrasive element embodiments disclosed herein.

Inner race 92A may be positioned generally within outer race 92B. Thus, inner race 92A and outer race 92B may be configured such that bearing surfaces 20A defined by bearing elements 10A and bearing surfaces 20B defined by bearing elements 10B may at least partially contact one another and move relative to one another as inner race 92A and outer race 92B rotate relative to each other. According to various embodiments, thrust-bearing apparatus 87 and/or radial bearing apparatus 91 may be incorporated into a subterranean drilling system.

Figure 45:
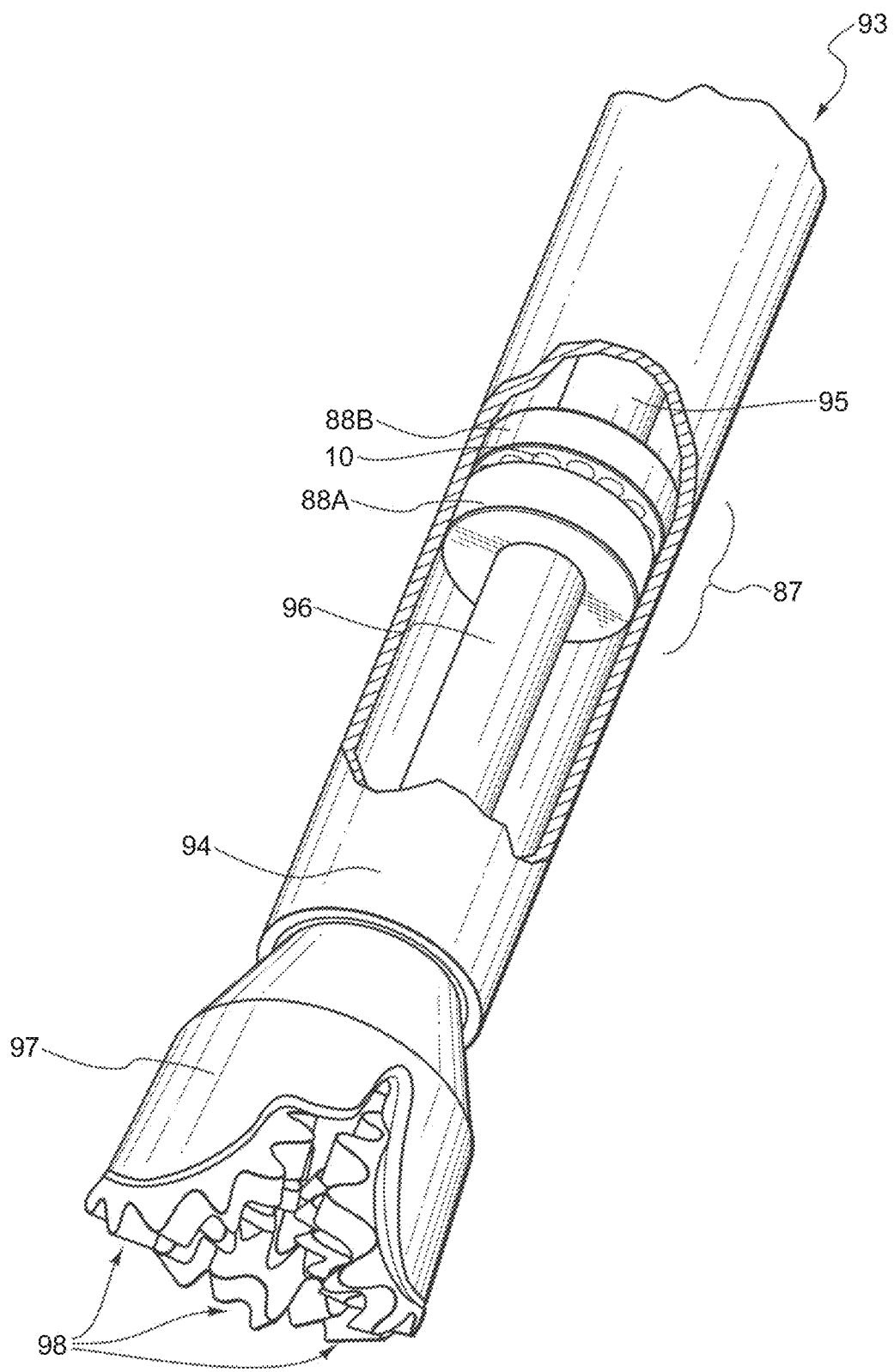
FIG. 45 is a partial cut-away perspective view of an exemplary subterranean drilling system according to at least one embodiment.

FIG. 45 is a partial cross-sectional perspective view of an exemplary subterranean drilling system 93 that includes a thrust-bearing apparatus 87, as shown in FIG. 43, according to at least one embodiment. The subterranean drilling system 93 may include a housing 94 enclosing a downhole drilling motor 95 (i.e., a motor, turbine, or any other suitable device capable of rotating an output shaft, without limitation) that is operably connected to an output shaft 96.

The thrust-bearing apparatus 87 shown in FIG. 43 may be operably coupled to downhole drilling motor 95. A rotary drill bit 97, such as a rotary drill bit configured to engage a subterranean formation and drill a borehole, may be connected to output shaft 96. As illustrated in FIG. 45, rotary drill bit 97 may be a roller cone bit comprising a plurality of roller cones 98. According to additional embodiments, rotary drill bit 97 may comprise any suitable type of rotary drill bit, such as, for example, a so-called fixed-cutter drill bit. As a borehole is drilled using rotary drill bit 97, pipe sections may be connected to subterranean drilling system 93 to form a drill string capable of progressively drilling the borehole to a greater depth within a subterranean formation.

A thrust-bearing assembly 88A in thrust-bearing apparatus 87 may be configured as a rotor that is attached to output shaft 96 and a thrust-bearing assembly 88B in thrust-bearing apparatus 87 may be configured as a stator. During a drilling operation using subterranean drilling system 93, the rotor may rotate in conjunction with output shaft 96 and the stator may remain substantially stationary relative to the rotor.

According to various embodiments, drilling fluid may be circulated through downhole drilling motor 95 to generate torque and effect rotation of output shaft 96 and rotary drill bit 97 attached thereto so that a borehole may be drilled. A portion of the drilling fluid may also be used to lubricate opposing bearing surfaces of superabrasive elements 10 on thrust-bearing assemblies 88A and 88B.

Figure 46:
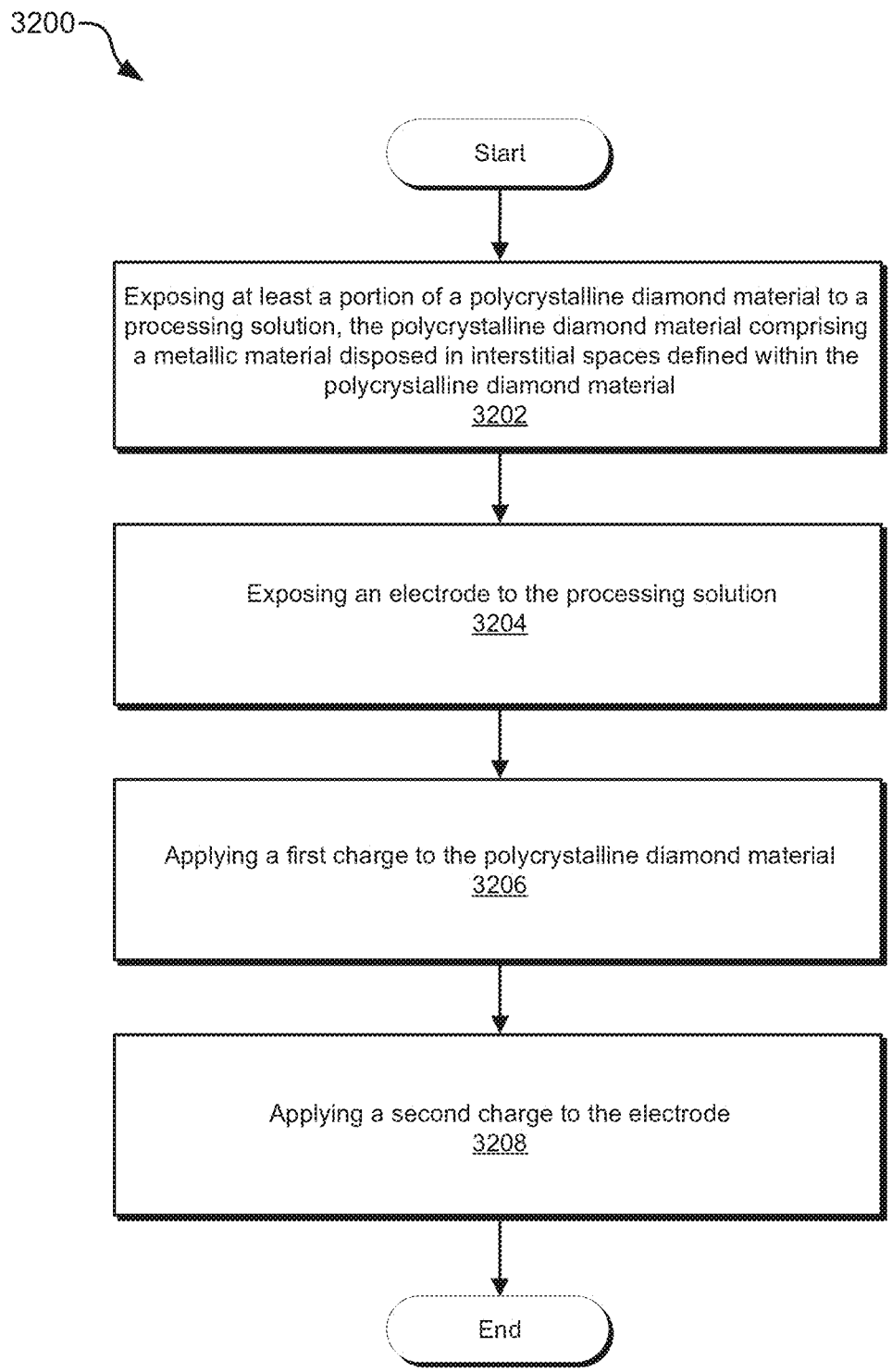
FIG. 46 is a flow diagram of an exemplary method of processing a polycrystalline diamond element according to at least one embodiment.

FIG. 46 illustrates an exemplary method 3000 for processing a polycrystalline diamond element according to at least one embodiment. As shown in FIG. 46, at least a portion of a polycrystalline diamond material may be exposed to a processing solution, the polycrystalline the polycrystalline diamond material comprising a metallic material disposed in interstitial spaces defined within the polycrystalline diamond material (process 3202). In some embodiments, for example, a superabrasive element 10 comprising a superabrasive table 14 and a substrate 12 may be disposed in a protective leaching cup 30 such that the protective leaching cup surrounds substrate 12 and/or at least a portion of superabrasive table 14. Superabrasive element 10 and protective leaching cup 30 may be disposed in a cavity 76 of a processing vessel 70 such that a processing solution 72 contacts at least a portion of superabrasive element 10 as illustrated in FIG. 9C.

An electrode may be exposed to the processing solution (process 3204). For example, as shown in FIG. 9C, an electrode 40 may be disposed in processing vessel 70 such that electrode 40 and superabrasive element 10 surrounded by protective leaching cup 30 are at least partially submerged in processing solution 72. Electrode 40 may be exposed to processing solution 72 such that processing solution 72 contacts at least a portion of electrode 40.

A first charge may be applied to the polycrystalline diamond material (process 3206). For example, as shown in FIG. 9C, a charge may be applied to superabrasive element 10 through an electrical conductor 44. In some embodiments, a positive charge may be applied to at least a portion of substrate 12 (e.g., rear surface 18) of superabrasive element 10 through electrical conductor 44. In at least one embodiment, electrical conductor 44 may be electrically connected to substrate 12 by an electrode electrically connected to (e.g., positioned abutting) substrate 12. In some embodiments, electrical conductor 44 may be directly connected to superabrasive table 14 by an electrode electrically connected to (e.g., positioned abutting) superabrasive table 14.

A second charge may be applied to the electrode (process 3208). For example, as shown in FIG. 9C, a charge may be applied to electrode 40 through an electrical conductor 42. In some embodiments, an opposite charge (e.g., a negative charge) may be applied to electrode 40 through electrical conductor 42.

Figure 47:
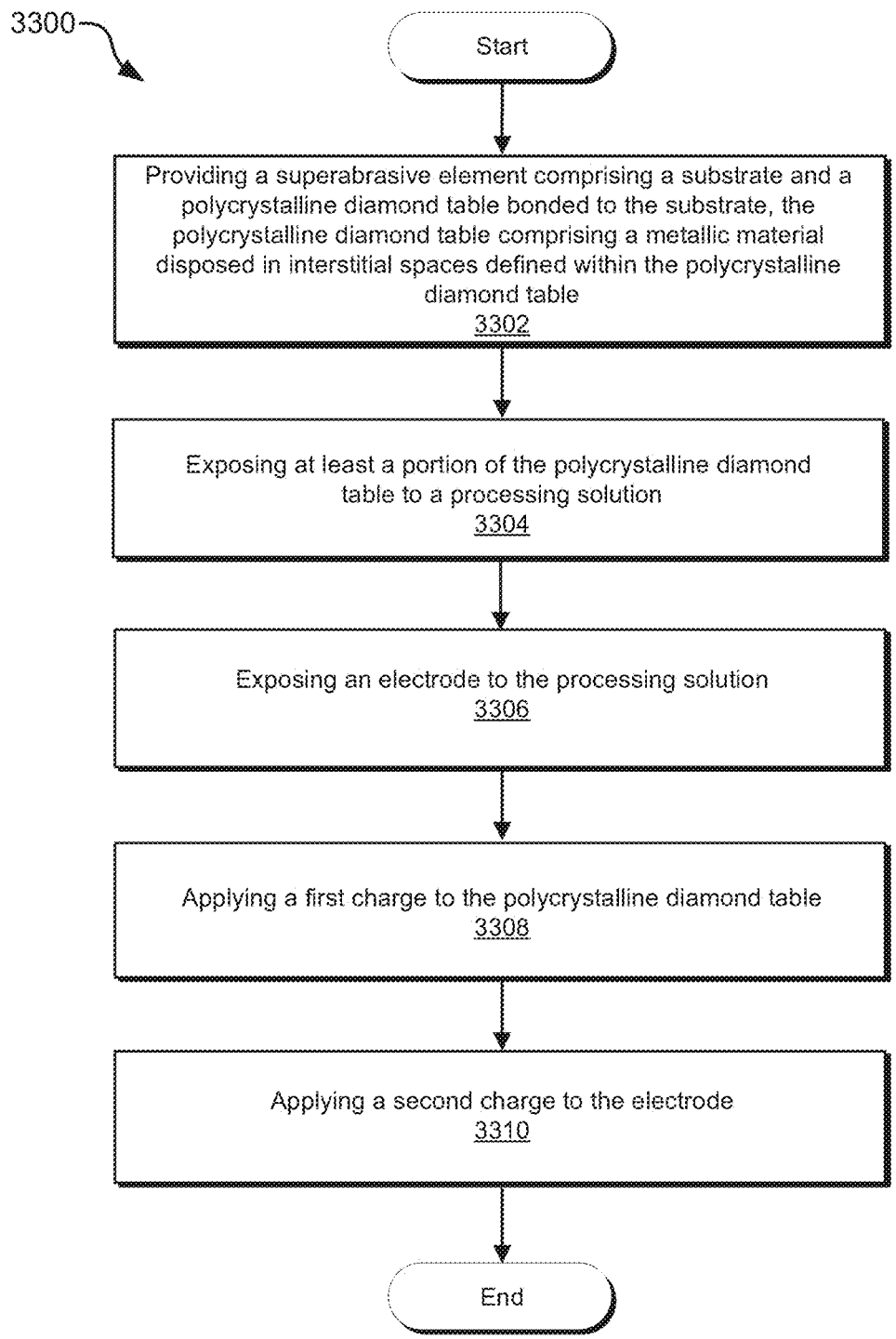
FIG. 47 is a flow diagram of an exemplary method of processing a polycrystalline diamond element according to at least one embodiment.

FIG. 47 illustrates an exemplary method 3300 for processing a polycrystalline diamond element according to at least one embodiment. As shown in FIG. 47, a superabrasive element may be provided, the superabrasive element comprising a substrate and a polycrystalline diamond table bonded to the substrate, the polycrystalline diamond table comprising a metallic material disposed in interstitial spaces defined within the polycrystalline diamond table (process 3302). For example, as shown in FIGS. 1 and 2, a superabrasive element 10 comprising a substrate 12 bonded to a superabrasive table 14 may be provided. Superabrasive table 14 may comprise a polycrystalline diamond table with metal-solvent catalyst and/or other materials (e.g. interstitial material 39) disposed in interstitial spaces (e.g. interstitial regions 36) defined within the polycrystalline diamond table, as illustrated in FIGS. 5-6.

At least a portion of the polycrystalline diamond table may be exposed to a processing solution (process 3304). In some embodiments, for example, a superabrasive element 10 may be disposed in a protective leaching cup 30 such that the protective leaching cup surrounds substrate 12 and/or at least a portion of superabrasive table 14. Superabrasive element 10 and protective leaching cup 30 may be disposed in a cavity 76 of a processing vessel 70 such that a processing solution 72 contacts at least a portion of superabrasive element 10 as illustrated in FIG. 9C.

An electrode may be exposed to the processing solution (process 3306). For example, as shown in FIG. 9C, an electrode 40 may be disposed in processing vessel 70 such that electrode 40 and superabrasive element 10 surrounded by protective leaching cup 30 are at least partially submerged in processing solution 72. Electrode 40 may be exposed to processing solution 72 such that processing solution 72 contacts at least a portion of electrode 40.

A first charge may be applied to the metallic material (process 3308). For example, as shown in FIG. 9C, a charge may be applied to superabrasive element 10 through an electrical conductor 44.

A second charge may be applied to the electrode (process 3310). For example, as shown in FIG. 9C, an opposite charge may be applied to electrode 40 through an electrical conductor 42.

The following examples set forth various methods used to form superabrasive elements as disclosed herein. The following examples provide further detail in connection with the specific embodiments described above.

EXAMPLE 1

Cutting elements, each comprising a PCD table attached to a tungsten carbide substrate, were formed by HPHT sintering diamond particles in the presence of cobalt. The sintered-polycrystalline-diamond tables included cobalt and tungsten within the interstitial regions between the bonded diamond grains.

The PCD tables were leached using an aqueous processing solution having a molar concentration of 0.29 M citric acid. The processing solution for processing each cutting element contacted both the PCD table and a corresponding disk-shaped copper electrode disposed near the PCD table. A negative charge was applied to each electrode and a positive charge was applied to the substrate of each cutting element such that a voltage of 0.8 V was generated in the processing solution. The PCD tables were leached at a temperature of approximately 75° C. and atmospheric pressure for between 24 and 168 hours. Following leaching, leached depths of the PCD tables were determined for various portions of the PCD tables, including leached depths measured from the cutting faces, side surfaces, and chamfered cutting edges of the PCD tables, and the leached depths were averaged.

Following 24 hours of leaching, a first PCD table included a leached depth of approximately 167 µm.

Following 72 hours of leaching, a second PCD table included a leached depth of approximately 308 µm.

Following 168 hours of leaching, a third PCD table included a leached depth of approximately 611 µm.

EXAMPLE 2

Cutting elements, each comprising a PCD table attached to a tungsten carbide substrate, were formed by HPHT sintering diamond particles in the presence of cobalt. The sintered-polycrystalline-diamond tables included cobalt and tungsten within the interstitial regions between the bonded diamond grains.

The PCD tables were leached using an aqueous processing solution having a citrate buffer comprising a molar concentration of 0.24 M sodium citrate and 0.05 M citric acid and having a pH of 6.5. The processing solution for processing each cutting element contacted both the PCD table and a corresponding disk-shaped copper electrode disposed near the PCD table. A negative charge was applied to each electrode and a positive charge was applied to the substrate of each cutting element such that a voltage of 0.8 V was generated in the processing solution. The PCD tables were leached at a temperature of approximately 75° C. and atmospheric pressure for between 24 and 72 hours. Following leaching, leached depths of the PCD tables were determined for various portions of the PCD tables, including leached depths measured from the cutting faces, side surfaces, and chamfered cutting edges of the PCD tables, and the leached depths were averaged.

Following 24 hours of leaching, a first PCD table included a leached depth of approximately 120 µm.

Following 72 hours of leaching, a second PCD table included a leached depth of approximately 250 µm.

EXAMPLE 3

Cutting elements, each comprising a PCD table attached to a tungsten carbide substrate, were formed by HPHT sintering diamond particles in the presence of cobalt. The sintered-polycrystalline-diamond tables included cobalt and tungsten within the interstitial regions between the bonded diamond grains.

The PCD tables were each leached in one of a plurality of aqueous processing solutions having a molar concentration of 0.29 M citric acid and various concentrations of cobalt chloride. The processing solutions for processing each cutting element contacted both the PCD table and a corresponding disk-shaped copper electrode disposed near the PCD table. A negative charge was applied to each electrode and a positive charge was applied to the substrate of each cutting element such that a voltage of 0.8 V was generated in the processing solution. The PCD tables were leached at a temperature of approximately 75° C. and atmospheric pressure for 72 hours. Following leaching, leached depths of the PCD tables were determined for various portions of the PCD tables, including leached depths measured from the cutting faces, side surfaces, and chamfered cutting edges of the PCD tables, and the leached depths were averaged.

Following leaching in a processing solution containing no cobalt chloride, a first PCD table included a leached depth of approximately 188 µm.

Following leaching in a processing solution having a molar concentration of 0.05 M cobalt chloride, a first PCD table included a leached depth of approximately 219 µm.

Following leaching in a processing solution having a molar concentration of 0.1 M cobalt chloride, a first PCD table included a leached depth of approximately 233 µm.

EXAMPLE 4

Cutting elements, each including a PCD table attached to a tungsten carbide substrate, were formed by HPHT sintering diamond particles in the presence of cobalt. The sintered polycrystalline diamond tables included cobalt and tungsten within the interstitial regions between the bonded diamond grains.

The PCD tables were each leached in one of a plurality of aqueous processing solutions having a molar concentration of 0.58M citric acid, with and without 0.2M magnesium chloride, and with 5% by weight concentrated (85%) phosphoric acid The processing solutions for processing each cutting element contacted both the PCD table and a corresponding disk-shaped copper electrode disposed near the PCD table. A negative charge was applied to each electrode and a positive charge was applied to the substrate of each cutting element such that a voltage of 0.8 V was generated in the processing solution. The PCD tables were leached at a temperature of approximately 75° C. and atmospheric pressure for one, two and three weeks. Following leaching, leached depths of the PCD tables were determined for various portions of the PCD tables, including leached depths measured from the cutting faces, side surfaces, and chamfered cutting edges of the PCD tables, and the leached depths were averaged.

Figure 48:
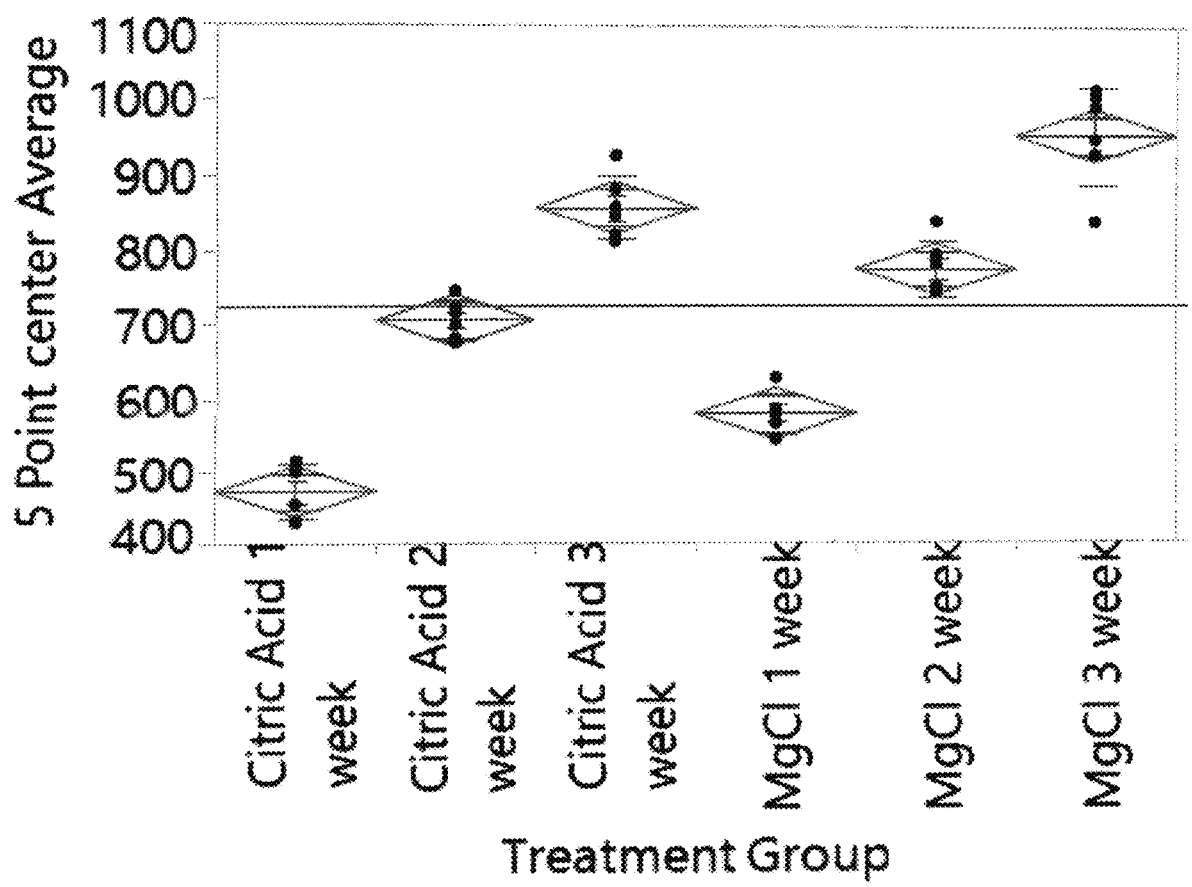
FIG. 48 is a plot showing leaching depth versus time for a processing solution of the invention, which utilizes an organic acid, in this case a naturally occurring food acid, and a divalent metal salt, in this case a Group II metal salt, compared to an otherwise similar processing solution that does not include the Group II metal salt.

The results of the foregoing experiments are plotted in FIG. 48. Each plotted point represents an average of five data points. For citric acid without the magnesium chloride, the leaching depth reached about 480 microns after one week, about 700 microns after two weeks, and about 860 microns after three weeks. For the combination including citric acid and magnesium chloride, the leaching depth reached about 580 microns after one week, about 780 microns after two weeks, and about 950 microns after three weeks. In all cases, the use of magnesium chloride resulted in a significant improvement in leaching depth.

EXAMPLE 5

Samples of the same cutting elements used in Example 4 were tested for leaching depth using a) 0.94M cobalt chloride, and b) 0.93M magnesium chloride as stand-alone electrolytes in an aqueous processing solution. Again, the processing solutions for processing each cutting element contacted both the PCD table and a corresponding disk-shaped copper electrode disposed near the PCD table. A negative charge was applied to each electrode and a positive charge was applied to the substrate of each cutting element such that a voltage of 0.8 V was generated in the processing solution. The PCD tables were leached at a temperature of approximately 75° C. and atmospheric pressure for one, two and three weeks. Following leaching, leached depths of the PCD tables were determined for various portions of the PCD tables, including leached depths measured from the cutting faces, side surfaces, and chamfered cutting edges of the PCD tables, and the leached depths were averaged.

Figure 49:
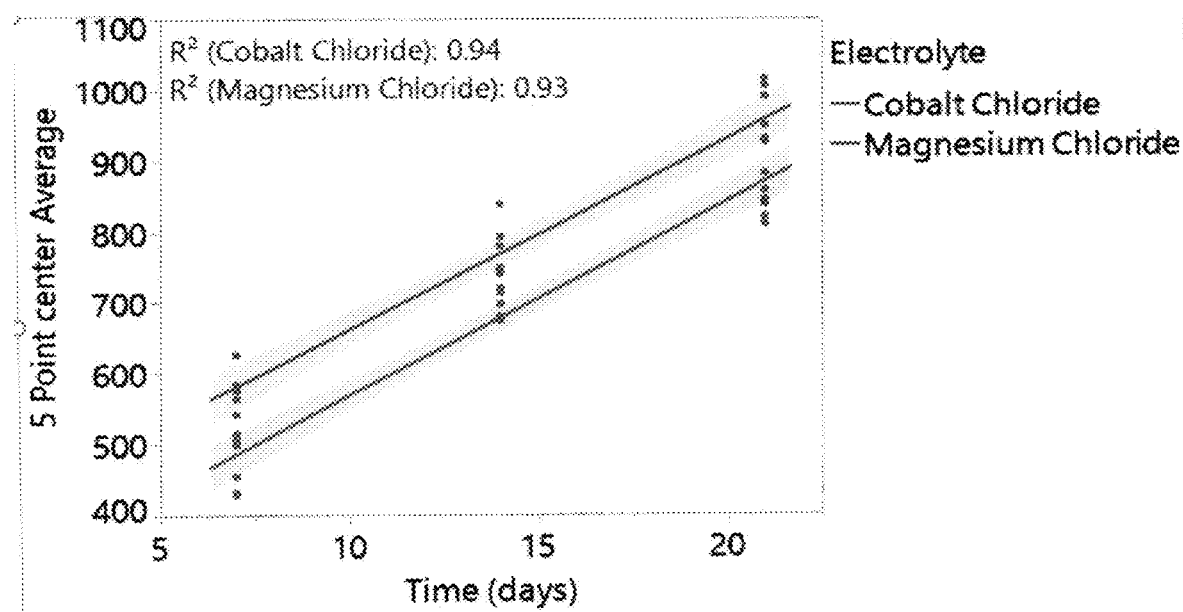
FIG. 49 is a plot showing leaching depth versus time when a Group II metal salt is used as the primary electrolyte in the processing solution, compared with leaching depth versus time when a conventional metal salt is used as the primary electrolyte.

The results of the foregoing experiments are plotted in FIG. 49. For cobalt chloride, the leaching depth reached about 480 microns after one week, about 680 microns after two weeks, and about 870 microns after three weeks. For magnesium chloride, the leaching depth reached about 580 microns after one week, about 770 microns after two weeks, and about 950 microns after three weeks. The improved performance of magnesium chloride compared to cobalt chloride when used alone, may help explain why the inclusion of magnesium chloride with citric acid improves the leaching performance compared to citric acid alone. The magnesium ion may interact with citric acid in a way that amplifies or accelerates the performance of the processing solution measured in terms of leaching depth.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A superabrasive element comprising:
   a polycrystalline diamond table comprising:
     a metallic material disposed in interstitial spaces defined within the polycrystalline diamond table;
     an unleached volume including the metallic material disposed in the interstitial spaces defined within the polycrystalline diamond table; and
     a leached volume where at least some of the metallic material disposed in the interstitial spaces defined within the polycrystalline diamond table has been removed with a leaching process,
   wherein at least a portion of a cobalt material has been removed from the metallic material in the interstitial spaces in the leached volume of the polycrystalline diamond table while a tungsten material remains in the interstitial spaces in the leached volume of the polycrystalline diamond table, and
   wherein the metallic material in the interstitial spaces in the leached volume of the polycrystalline diamond table includes a ratio of the cobalt material relative to the tungsten material that is greater than a ratio of a cobalt material relative to a tungsten material in the unleached volume of the polycrystalline diamond table.

2. The superabrasive element of claim 1, wherein the cobalt material in the interstitial spaces in the leached volume of the polycrystalline diamond table has been substantially removed from the metallic material.

3. The superabrasive element of claim 1, wherein an amount of the tungsten material in the interstitial spaces in the leached volume of the polycrystalline diamond table is similar to another amount of tungsten material in the interstitial spaces in the unleached volume of the polycrystalline diamond table.

4. The superabrasive element of claim 1, wherein the metallic material from a portion of the polycrystalline diamond table has been leached to a first depth relative to a superabrasive face of the superabrasive element, and wherein the metallic material from an external side region of the polycrystalline diamond table has been leached to a second depth relative to the superabrasive face of the superabrasive element, the second depth being greater than the first depth.

5. The superabrasive element of claim 1, wherein the leaching process comprises:
   exposing at least a portion of the polycrystalline diamond table to a processing solution; and
   applying a charge to the processing solution to generate a voltage between the polycrystalline diamond table and an electrode via the processing solution.

6. The superabrasive element of claim 5, wherein processing solution includes an organic acid and a divalent metal salt.

7. The superabrasive element of claim 6, wherein the divalent metal salt comprises a Group II metal salt selected from the group consisting of fluoride, chloride, bromide, and iodide salts of beryllium, magnesium, calcium, strontium and barium, and combinations thereof.

8. The superabrasive element of claim 1, wherein the interstitial spaces in the leached volume of the polycrystalline diamond table substantially lacks the cobalt material while the tungsten material remains in the interstitial spaces in the leached volume of the polycrystalline diamond table.

9. The superabrasive element of claim 1, further comprising a substrate attached to the polycrystalline diamond table.

10. The superabrasive element of claim 9, further comprising a protective layer surrounding at least the substrate.

11. A superabrasive element comprising:
  a polycrystalline diamond table comprising:
    a metallic material disposed in interstitial spaces defined within the polycrystalline diamond table;
    an unleached volume including the metallic material disposed in the interstitial spaces defined within the polycrystalline diamond table; and
    a leached volume where at least some of the metallic material disposed in the interstitial spaces defined within the polycrystalline diamond table has been removed with a leaching process,
  wherein at least a portion of a cobalt material has been removed from the metallic material in the interstitial spaces in the leached volume of the polycrystalline diamond table while a tungsten material remains in the interstitial spaces in the leached volume of the polycrystalline diamond table, and
  wherein:
    an amount of the tungsten material in the interstitial spaces in the leached volume of the polycrystalline diamond table is similar to another amount of tungsten material in the interstitial spaces in the unleached volume of the polycrystalline diamond table; or
    the metallic material from a portion of the polycrystalline diamond table has been leached to a first depth relative to a superabrasive face of the superabrasive element, and wherein the metallic material from an external side region of the polycrystalline diamond table has been leached to a second depth relative to the superabrasive face of the superabrasive element, the second depth being greater than the first depth.

12. The superabrasive element of claim 11, wherein at least a portion of the polycrystalline diamond table has been exposed to a charged processing solution including an organic acid and a divalent metal salt in the leaching process.

13. The superabrasive element of claim 11, further comprising a substrate having a protective layer attached to the polycrystalline diamond table.

14. A superabrasive element comprising:
  a polycrystalline diamond table comprising:
    a metallic material disposed in interstitial spaces defined within the polycrystalline diamond table;
    an unleached volume including the metallic material disposed in the interstitial spaces defined within the polycrystalline diamond table; and
    a leached volume where at least some of the metallic material disposed in the interstitial spaces defined within the polycrystalline diamond table has been removed with a leaching process,
  wherein at least a portion of a cobalt material has been removed from the metallic material in the interstitial spaces in the leached volume of the polycrystalline diamond table while a tungsten material remains in the interstitial spaces in the leached volume of the polycrystalline diamond table;
  wherein the leaching process comprises:
    exposing at least a portion of the polycrystalline diamond table to a processing solution; and
    applying a charge to the processing solution to generate a voltage between the polycrystalline diamond table and an electrode via the processing solution; and
  wherein the processing solution includes an organic acid and a divalent metal salt.

15. The superabrasive element of claim 14, wherein the divalent metal salt comprises a Group II metal salt selected from the group consisting of fluoride, chloride, bromide, and iodide salts of beryllium, magnesium, calcium, strontium and barium, and combinations thereof.

16. The superabrasive element of claim 14, wherein an amount of the tungsten material in the interstitial spaces in the leached volume of the polycrystalline diamond table is similar to another amount of tungsten material in the interstitial spaces in the unleached volume of the polycrystalline diamond table.

17. The superabrasive element of claim 14, wherein the metallic material from a portion of the polycrystalline diamond table has been leached to a first depth relative to a superabrasive face of the superabrasive element, and wherein the metallic material from an external side region of the polycrystalline diamond table has been leached to a second depth relative to the superabrasive face of the superabrasive element, the second depth being greater than the first depth.

18. A superabrasive element comprising:
  a polycrystalline diamond table comprising:
    a metallic material disposed in interstitial spaces defined within the polycrystalline diamond table;
    an unleached volume including the metallic material disposed in the interstitial spaces defined within the polycrystalline diamond table; and
    a leached volume where at least some of the metallic material disposed in the interstitial spaces defined within the polycrystalline diamond table has been removed with a leaching process,
  wherein at least a portion of a cobalt material has been removed from the metallic material in the interstitial spaces in the leached volume of the polycrystalline diamond table while a tungsten material remains in the interstitial spaces in the leached volume of the polycrystalline diamond table; and
  wherein the interstitial spaces in the leached volume of the polycrystalline diamond table substantially lacks the cobalt material while the tungsten material remains in the interstitial spaces in the leached volume of the polycrystalline diamond table.

19. A superabrasive element comprising:
  a polycrystalline diamond table comprising:
    a metallic material disposed in interstitial spaces defined within the polycrystalline diamond table;
    an unleached volume including the metallic material disposed in the interstitial spaces defined within the polycrystalline diamond table; and
    a leached volume where at least some of the metallic material disposed in the interstitial spaces defined within the polycrystalline diamond table has been removed with a leaching process;

a substrate attached to the polycrystalline diamond table; and a protective layer surrounding at least the substrate, wherein at least a portion of a cobalt material has been removed from the metallic material in the interstitial spaces in the leached volume of the polycrystalline diamond table while a tungsten material remains in the interstitial spaces in the leached volume of the polycrystalline diamond table.

20. The superabrasive element of claim 19, wherein the metallic material in the interstitial spaces in the leached volume of the polycrystalline diamond table includes relatively less of the cobalt material than the metallic material in the interstitial spaces in the unleached volume of the polycrystalline diamond table.

* * * * *